United States Patent [19]

Lane et al.

[11] Patent Number: 5,377,051

[45] Date of Patent: Dec. 27, 1994

[54] DIGITAL VIDEO RECORDER COMPATIBLE RECEIVER WITH TRICK PLAY IMAGE ENHANCEMENT

[75] Inventors: Frank A. Lane, Medford Lakes; Jill M. Boyce, Manalapan; Jack S. Fuhrer, Princeton Junction; John G. N. Henderson, Princeton, all of N.J.; Michael A. Plotnick, Southampton, Pa.

[73] Assignee: Hitachi America, Ltd., Tarrytown, N.Y.

[21] Appl. No.: 3,889

[22] Filed: Jan. 13, 1993

[51] Int. Cl.$^5$ ............................................. H04N 5/78
[52] U.S. Cl. ..................... 360/33.1; 360/10.1; 360/10.3
[58] Field of Search ............ 360/33.1, 10.1–10.2, 360/10.3, 32, 38.1, 48, 53; 358/312, 188, 335, 310, 22, 339, 331

[56] References Cited

U.S. PATENT DOCUMENTS

| | | | |
|---|---|---|---|
| 3,934,268 | 1/1976 | Uemura | 360/101 |
| 4,031,548 | 6/1977 | Kato et al. | 360/33.1 |
| 4,139,867 | 2/1979 | Foerster | 360/10 |
| 4,193,098 | 3/1980 | Bixby et al. | 360/10 |
| 4,263,623 | 4/1981 | Woo et al. | 360/10 |
| 4,290,087 | 9/1981 | Bixby et al. | 360/33 |
| 4,339,775 | 7/1982 | Lemke et al. | 360/10 |
| 4,355,324 | 10/1982 | Reitmeier | 358/312 |
| 4,504,869 | 3/1985 | Warren | 358/312 |
| 4,510,583 | 4/1985 | Sato et al. | 360/84 |
| 4,541,020 | 9/1985 | Kimura | 360/22 |
| 4,558,376 | 12/1985 | Heitmann | 360/10.1 |
| 4,584,613 | 4/1986 | Amari et al. | 358/310 |
| 4,636,874 | 1/1987 | Hoogendoorn et al. | 360/10.2 |
| 4,636,879 | 1/1987 | Narita et al. | 360/72.2 |
| 4,668,998 | 5/1987 | Aoki | 360/10.3 |
| 4,783,707 | 11/1988 | Nemoto et al. | 360/105 |
| 4,807,053 | 2/1989 | Heijnemans | 358/335 |
| 4,825,301 | 4/1989 | Pape et al. | 358/335 |
| 4,887,169 | 12/1989 | Bannai et al. | 358/335 |
| 4,910,605 | 3/1990 | Sasaki et al. | 358/310 |
| 4,985,781 | 1/1991 | Hirasawa | 358/324 |
| 5,027,235 | 6/1991 | Furuyama | 360/77.16 |
| 5,047,869 | 9/1991 | Aoki et al. | 358/341 |
| 5,050,014 | 9/1991 | Maeda et al. | 360/75 |
| 5,097,363 | 3/1992 | Takei et al. | 360/10.3 |
| 5,119,208 | 6/1992 | Fujimoto | 358/310 |
| 5,126,852 | 6/1992 | Nishino et al. | 358/335 |
| 5,132,807 | 7/1992 | Takimoto et al. | 358/335 |

(List continued on next page.)

OTHER PUBLICATIONS

"Design Considerations for the D-2 NTSC Composite DVTR", Richard Brush, pp. 182–193, SMPTE Journal, Mar. 1988.

Robert Rast, Joseph Glaab, General Instrument Corporation, "Interoperability Considerations for Digi Cipher HDTV", Oct. 1, 1992.

(List continued on next page.)

*Primary Examiner*—Aristotelis Psitos
*Assistant Examiner*—Jennifer Pearson
*Attorney, Agent, or Firm*—Kenyon & Kenyon

[57] ABSTRACT

A video recorder compatible receiver for receiving video data from a video recorder such as a video tape recorder ("VTR"). The receiver includes an error concealment circuit, a digital VTR port adapted for coupling to a VTR and/or a tuner module. The receiver receives digital video data from the VTR by either the digital VTR port or the tuner module. VTR commands may also be received from a VTR. Upon receiving a VTR command indicating that the VTR is operating in trick play mode or upon detecting video data that is indicative of VTR trick play operation, the error concealment circuit of the receiver disables normal play error concealment and enables trick play error concealment. The error concealment circuit may perform temporal and spatial filtering on the video data received from the VTR when trick play error concealment is enabled.

27 Claims, 25 Drawing Sheets

U.S. PATENT DOCUMENTS

| | | | |
|---|---|---|---|
| 5,134,464 | 7/1992 | Basile et al. | 358/143 |
| 5,136,391 | 8/1992 | Minami | 358/310 |
| 5,136,394 | 8/1992 | Haikawa et al. | 358/335 |
| 5,140,417 | 8/1992 | Tanaka et al. | 358/133 |
| 5,140,437 | 4/1990 | Yonemitsu et al. | 358/342 |
| 5,144,425 | 9/1992 | Joseph | 358/133 |
| 5,146,337 | 9/1992 | Grubbs | 358/188 |
| 5,148,272 | 9/1992 | Acampora et al. | 358/135 |
| 5,212,549 | 5/1993 | Ng et al. | 358/135 |
| 5,218,449 | 6/1993 | Ko et al. | 358/310 |
| 5,255,946 | 7/1993 | Uchiumi | 360/10.3 |
| 5,282,049 | 1/1994 | Hatakenaka et al. | 358/335 |
| 5,291,343 | 3/1994 | Goto | 360/33.1 |

OTHER PUBLICATIONS

J. Lee, J. Seo, Y. Park, D. Youn, T. Oh, IEEE Transactions on Consumer Electronics, "A Study on New DCT-Based Bit Rate Reduction Algorithm and Variable Speed Playback for a Home-Use Digital VCR", vol. 38, No. 3, Aug. 1992, pp. 236–241.

Advanced Television Research Consortium, "Advanced Digital Television, Prototype Hardware Description", Feb. 12, 1992.

David Sarnoff Research Center, Philips Laboratories, "Advanced Digital Television, System Description", Jan. 20, 1992.

I.S.O. MPEG (Moving Pictures Expert Group), "Coding of Moving Pictures and Associated Audio for Digital Storage Media at up to about 1.5 Mbit/s, Part 2 Video", 2–11172 rev 1, Nov. 23, 1991.

Zenith, AT&T, "Technical Details, Digital Spectrum Compatible", Sep. 23, 1991.

C. Yamamitsu, A. Ide, M. Nishino, T. Juri, H. Ohtaka, IEEE Transactions on Comsumer Electronics, "A Study on Trick Plays for Digital VCR", vol. 37, No. 3, Aug. 1991, pp. 261–266.

S. Inoue, H. Kaneko, H. Takao, T. Fujii, M. Ishibashi, IEEE Transactions on Comsumer Electronics, "New Method for Variable Speed Playback for High Definition VCRs", vol. 37, No. 3, Aug. 1991, pp. 244–251.

General Instrument Corporation Videocipher Division, "Digicipher HDTV System Description", Document No. 62004, Aug. 22, 1991.

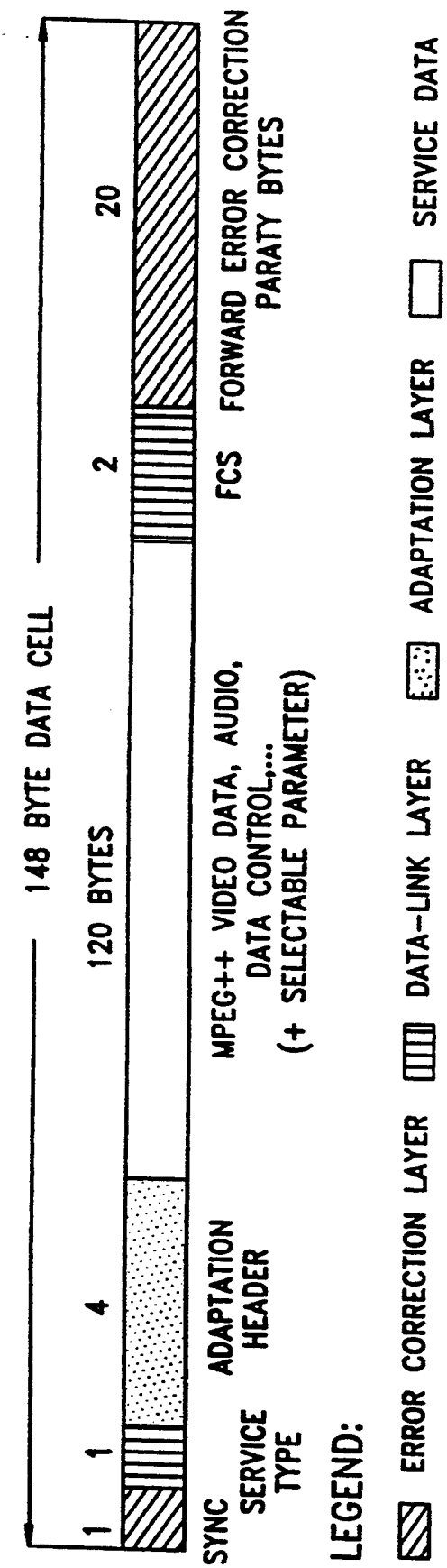
FIG. 7 — STRUCTURE OF A TRANSPORT CELL
PRIOR ART

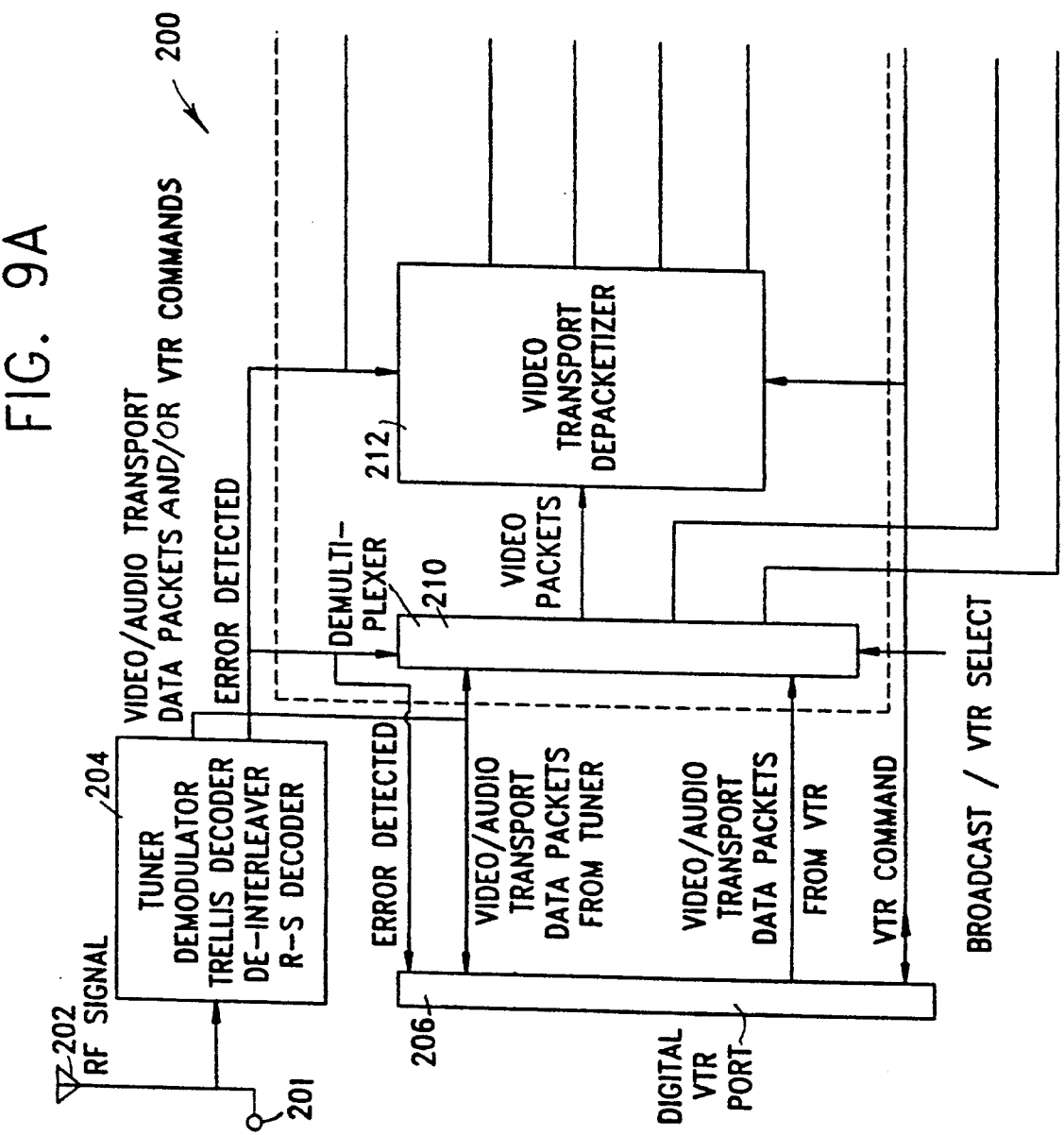

DIGITAL VIDEO RECORDER COMPATIBLE RECEIVER WITH TRICK PLAY IMAGE ENHANCEMENT

FIELD OF THE INVENTION

The present invention relates to video receivers and, more particularly, video receivers that are capable of receiving commands and/or detecting trick play modes of recorder operation and performing, e.g., error concealment operations in response to the received commands or detected mode of trick play recorder operation.

BACKGROUND OF THE INVENTION

A VTR can receive and store images (and sounds) received as signals from various sources, for example, a television tuner, an antenna or a cable. The VTR stores the received signal information, i.e. the data, by recording the data on a magnetic tape, such as a video cassette tape. The VTR can also reproduce images (and sounds) that are stored on a tape as data by reading the data on the tape and generating a signal from the data which can then be provided to a display device such as a television monitor.

To facilitate fast forward, search, and reverse capabilities, VTRs normally provide a limited number of playback speeds in both forward and reverse direction in addition to the VTR's standard playback speed which is used during normal playback operation.

VTR systems for recording and reproducing analog video signals are well known in the art. Such systems commonly use rotary head, helical scan recording methods to record data on a tape. In such systems, record/playback heads are mounted on a rotary head cylinder. The rotary head cylinder is inclined relative to the lengthwise portion of a magnetic tape which surrounds the rotary head cylinder for approximately 180°.

During normal operation of such video recording devices, the tape moves in a lengthwise direction while the record/playback heads rotate along with the inclined rotary head cylinder in a circular direction. As the record/playback heads rotate with the head cylinder they contact the moving tape in a manner which permits the recording or reading of data from the tape along evenly spaced tracks located diagonally relative to the length of the tape. A servo mechanism is used to control head positioning relative to the tape's position to insure that the heads contact the tape along the diagonals which form each track of data.

FIG. 1(a) is a top view of a conventional two head video recording system. As illustrated in FIG. 1(a), first and second record/playback heads HA 2 and HB 3 are mounted opposite each other on a rotary head cylinder 4. To reduce crosstalk between adjacent tracks written by heads HA 2 and HB 3, the heads are of mutually different azimuth angles.

A tape 1 surrounds the rotary head cylinder 4 for approximately 180°. The tape moves relative to the rotary head cylinder as indicated by $V_T$. Similarly, the rotary drum, and thus the record playback heads HA 2 and HB 3, rotates as indicated by $V_H$. As the rotary head cylinder 4 rotates, the tape moves in a lengthwise direction as illustrated in FIG. 1(a). The rotating record/playback heads HA 2, HB 3 contact the tape in a manner which permits reading or writing, i.e. scanning, of data along diagonal tracks as illustrated in FIG. 1(b).

In the two head system of FIG. 1(a), a single head, either HA 2 or HB 3, contacts the tape 1 during each 180° period of head cylinder rotation. During this period of tape contact, during standard operation, each head reads or writes one normal play track of data. Each track comprises a plurality of tape segments. Each tape segment may contain one or more blocks of data. The data on the tape forms a series of parallel tracks as illustrated in FIG. 1(b). The gaps between the tracks are shown only for the purpose of clarity. Accordingly, there are normally no actual gaps between tracks recorded on a tape. The slope of the tracks depends on the speed of the tape when the tracks are recorded. References to data tracks or normal play data tracks are hereinafter to data tracks written with a slope corresponding to the slope of data tracks written during standard record mode, i.e., data tracks written when the tape is moving at a standard speed for normal play operations.

In order to aid in the differentiation between tracks, data in each individual track is written at a mutually different azimuth from the preceding track. This results in a series of data tracks containing data written at alternating azimuths which correspond to the mutually different azimuths of the first and second heads HA 2, HB 3. The slanted lines within each data track of FIG. 1b are used to indicate the azimuth at which the data in each track was written.

The heads HA 2 and HB 3 can only read data written at an azimuth corresponding to the head's own particular azimuth. Thus, HA 2 and HB 3 are limited to reading data from tracks containing data written at the same azimuth as the particular head HA 2 or HB 3 with neither head being able to read the data contained in the tracks written by the other head since the data is positioned at an azimuth corresponding to the other head's azimuth.

Data tracks are normally written on the tape along diagonals which correspond to the diagonals traced by the heads across the width of the tape during normal, i.e., standard record/playback mode. During modes of operation such as playback during reverse or fast forward, referred to as trick play modes, the tape velocity is different than the tape velocity during standard record/playback mode. In trick play modes the tape speed is a function of the selected fast forward or reverse speed.

Because the tape moves relative to the record/playback heads at a speed other than the standard tape speed during trick play mode, the heads will trace over the tape along a diagonal path different than the path traced during the standard record/playback mode. In fast forward mode, the heads will trace over the tracks created during standard record/playback mode at a shallower angle than the angle of the data tracks. In reverse mode, the heads will trace across the tracks recorded during standard mode at an angle opposing the angle of the tracks recorded during standard record/playback mode. Accordingly, during VTR operation in trick play mode, the VTR's heads may cross over several different tracks of data during each pass across the width of the tape, e.g., during each 180° period of head cylinder rotation, with the angle at which the tracks are crossed being a function of tape speed.

FIG. 1(c) illustrates the paths traced out by the record/playback heads HA 2, HB 3 across the magnetic tape 1 during trick play mode operation at three times (3×) the standard playback tape speed (hereinafter referred to as 3× playback operation). In FIG. 1c reference numerals 1-A through 12-B are used to indicate tracks on the magnetic tape 1. Odd numbered tracks 1-A through 11-A contain data written at an azimuth corresponding to the azimuth of head HA 2 while even numbered tracks 2-B through 12-B contain data written at an azimuth corresponding to the azimuth of head HB 3.

During 3× playback operation, heads HA 2, HB 3 trace across the tracks on the tape 1 at a shallower angle than during standard playback operation. As illustrated in FIG. 1(c), head HA 2 traces across paths 13 and 15 while head HB 3 traces across paths 14 and 16. As described above, each head can only read data written at an azimuth corresponding to the head's own azimuth. Thus, during 3× playback operation, head HA 2 can only read the portions of data which the head passes over in the odd numbered tracks, i.e. the areas of the odd numbered tracks indicated by the letters a, b, e and f. Similarly, during 3× playback operation, head HB 3 can only read the portions of data which it passes over in the even numbered tracks, i.e. the areas of the even numbered tracks indicated by the letters c, d, g, and h.

As FIG. 1(c) shows, during fast forward playback and other trick play modes of operation where the tape moves at a speed faster than the standard tape speed, it will not be possible for a two head video tape recorder to read all the data contained in each track because there will be areas of track that the heads do not pass over at all. The amount of track that is covered by the heads when the tape speed exceeds the standard tape speed is only a fraction of the total track area with the track area covered being directly proportional to the ratio of the standard tape speed to the actual tape speed. For example, in a two head VTR system, during 3× playback operation, the heads will pass over approximately ⅓ of the tape area comprising the recorded tracks which are used during standard playback operation. At 9× playback, the heads will pass over approximately 1/9 of the tape area comprising the recorded tracks.

Furthermore, as discussed above, during trick play mode in a two head VTR, the heads pass over track areas where they can not read the recorded data because it was recorded by a head having a different azimuth from the azimuth of the head passing over the track during trick play mode. As illustrated in FIG. 1c, single heads can read only approximately fifty percent of the data which they pass over during trick play mode, thus greatly reducing the amount of data that can be read during trick play modes.

To increase the amount of data that can be read during trick play modes additional record/playback heads may be used. There are two approaches for using additional record/playback heads to increase the amount of data that is read during trick play mode. The first approach is to use pairs of co-located heads. The second approach is to add additional pairs of non-collocated heads to the rotary head cylinder, each head in a pair of non-collocated heads being mounted 180° from the other head in the pair. These two approaches may be used independently to increase the amount of data that can be read during trick play mode. Alternatively, they can be combined to provide for maximum data recovery.

The first approach which may be used to permit the reading of virtually all data in tracks passed over by a head during trick play mode requires that single heads be replace with co-located heads, i.e. pairs of heads arranged at mutually different azimuths, in such a manner that each track area passed over by the heads is passed over by at least one head of each possible azimuth. Because of the physical proximity of each head in a pair of co-located heads, both heads pass over the same data on the tape. Thus, by using pairs of co-located heads it is possible to read all data passed over by the co-located heads with each head in the pair reading data from each alternating track which has data written at the same azimuth as the head doing the read operation.

Since this approach requires the use of pairs of heads as opposed to single read/write heads, this doubles the number of heads required to implement a VTR using co-located heads as opposed to individual heads. For example, instead of having a two head VTR system with two heads spaced 180° apart, a similar VTR with co-located heads would comprise 2 pairs of co-located heads spaced 180° apart resulting in a four head VTR system.

FIG. 2(a) illustrates a four head VTR system comprising two pairs of co-located heads. As illustrated, a first and second pair of co-located heads HA-HB 20, 30 are mounted 180° apart on a rotary head cylinder 25. The magnetic tape 1 wraps around the rotary head cylinder 25 for approximately 180° contacting one pair of the co-located heads HA-HB 20, 30 at any given time.

FIG. 2(b) illustrates the paths traced out by the pairs of co-located heads HA-HB 20, 30 across the tape 1 during 3× playback operation. In FIG. 2(b), as in FIG. 1(c), reference numerals 1-A through 12-B are used to indicate tracks on tape 1. Odd numbered tracks 1-A through 11-A contain data written at an azimuth corresponding to the azimuth of head HA while even numbered tracks 2-B through 12-B contain data written at an azimuth corresponding to the azimuth of head HB.

During 3× playback operation, the first pair of co-located heads HA-HB 20 traces across paths 33 and 35 while the second pair of co-located heads HA-HB traces across paths 34 and 36. Because co-located heads are used instead of individual heads, the data which is passed over by either pair of co-located heads can be read by one of the heads in the pair regardless of the azimuth at which the data is written. For example, head HA of the first pair of co-located heads HA-HB 20 reads the data in track portions a, b, e, and f of FIG. 2 while head HB of the first pair of co-located heads HA-HB 20 reads the data in track portions i and k. Similarly, head HA of the second pair of co-located heads HA-HB 30 reads the data in track portions j and l while head HB of the second pair of co-located heads HA-HB 30 reads the data in track portions c, d, g, and h. Thus, by using pairs of co-located heads virtually all the data in paths 33, 34, 35, and 36 which are traced by the heads during trick play mode operation can be read.

The second approach to increase the amount of data that is read during trick play mode also requires the use of additional heads beyond the two heads used in a basic VTR system. In accordance with this second approach N heads, where N>1, may be arranged so that the N heads are equally distributed over the range of the rotary head cylinder used to read/write a track of data, i.e. a 180° portion of the rotary cylinder head. Accordingly, the total number of heads in such a system is 2N since there are N heads on each 180° portion of the rotary head cylinder.

In such a system, there are N heads in contact with the tape at any given time. During standard playback operation, N−1 heads provide redundant information which can be used for error checking or other purposes. However, during trick play modes where the tape moves at a speed faster than the standard speed, each of the N heads will pass over a different portion of the tracks and read some data not read by the other heads. When the tape moves at N times the standard speed, during NX playback operation for example, each one of the N heads will pass over a different $1/N^{th}$ of a track written on the magnetic tape so that at least one of the N heads will pass over each section of the track. Thus, by using additional heads in this manner, additional data may be read during trick play operation.

Referring now to FIG. 3(a) there is illustrated an 8 head VTR system having four heads distributed evenly over each 180° portion of a rotary head cylinder 40. Thus, in the illustrated system N=4. As illustrated in FIG. 3a, in a system where N=4, there are four heads in contact with the tape 1 at any given time.

When the system of FIG. 3(a) is operated in 4× playback operation the tape 1 moves at 4 times the standard tape speed. In such a case, during each pass, at least one of four heads will trace over each ¼ section of a track. Thus, as illustrated in FIG. 3(b), the heads of the 8 head VTR of FIG. 3(a) will trace over all sections of the tape's tracks as the heads trace over one track after another during 4× playback operation.

Thus, if each head in the VTR system of FIG. 3(a) could read all of the data over which it passes, all the data on the tape could be read during 4× playback operation. However, as described above in regard to two head VTR systems, data in alternating tracks in a VTR system using helical scanning methods are written on the tape by heads with different azimuths. Accordingly, each one of the N heads in a system, having N heads on each 180° portion of a rotary head cylinder such as the system of FIG. 3(a), will only be able to read data in tracks written using a head having the same azimuth as the head attempting to read the data. Thus, while all portions of the tracks will be traced over by one of the N heads while operating in NX trick play mode, not all the data, i.e. only about ½ of the data, will be read because each head will only be able to read data from every other track written at a standard speed due to the fact that the data in alternating tracks were written by heads having different azimuths.

In order to read all the data passed over by the individual heads, pairs of co-located heads can be substituted for each of the N individual heads on each 180° portion of a rotary head cylinder. The use of N pairs of co-located heads equally spaced from each other on each 180° portion of a rotary head cylinder provides a VTR system capable of reading almost all of the data during NX playback operation. Such a system generally requires 4N heads to implement. Thus, for example, in order to read virtually all the data from tracks during 4× playback speed requires a sixteen head VCR.

While known VTRs are primarily directed to recording of analog signals, current advances in technology enable images to be encoded and decoded in digital form and transmitted as a digital data stream. Accordingly, VTRs must be able to store and retrieve images that can be represented in digital form.

The digital representation of images, especially moving images with accompanying sound, requires a high digital data rate. Thus, digital television signals require a high data rate. High Definition Television ("HDTV") which include systems capable of displaying higher resolution images with greater clarity than are possible with the current National Television Systems Committee (NTSC) standard, will require an even higher digital data rate to represent video images than is required to digitally represent images of a similar quality to those transmitted in accordance with the current NTSC standard.

In order to provide the high data rate needed to support HDTV recording and playback, VTRs capable of recording two data channels per track may be used. Referring now to FIG. 4(a), there is illustrated a 2 channel, 4 head VTR system. As illustrated, a 2 channel VTR uses a pair of heads to write to or read from each track of data. Each pair of heads $HA_1$-$HB_1$, $HA_2$-$HB_2$, in a 2 channel VTR comprises two heads HA, HB of mutually different azimuths mounted on a rotary head cylinder 4 in such a manner that the heads in each pair of heads are capable of simultaneously writing to, or reading from, the two channels of a track on the tape 1. Thus, in such a system, the data rate that the VTR can support is nearly double the data rate a single channel VTR can support. As illustrated in FIG. 4(b), the tracks, T1 through T6, written by a 2 channel VTR each comprise a first and second data channel, channel A and channel B, respectively.

Compression and decompression techniques may be used to reduce the amount of digital data needed to represent images and sound. Accordingly, such techniques are important in reducing the amount of digital data which must be transmitted for television signals and the amount of data which must be recorded by VTRs. However, even with such data compression, HDTV will still require large amounts of digital data to be transmitted at high data rates to achieve HDTV picture and sound quality. For example, one proposed HDTV system requires 24 million bits per second of digital data to be transmitted to achieve HDTV picture and sound quality.

The International Standards Organization has set a standard for compression which includes the use of motion compensation principles. The standard is referred to as the ISO-MPEG (International Standards Organization-Moving Picture Experts Group) standard. MPEG compression uses an adaptive motion-compensated Discrete Cosine Transform (DCT) that perceptually optimizes picture encoding on a block-by-block basis. The MPEG motion compression technique has both unidirectional and bidirectional prediction capabilities (both forward and backward in time) to accurately predict frames. This allows more bytes to be used for picture detail.

In accordance with the MPEG standard, analog video signals are digitized, matrixed and filtered to produce an internal format used for the compression process. The compression process performs compression using the MPEG compression algorithm.

In summary, the MPEG compression operations that are implemented in the compression process include motion compensated predictive coding and adaptive Discrete Cosine Transform (DCT) quantization. MPEG utilizes data structures known as frames. A frame contains picture information and defines one complete video picture. For example, a frame of video can consist of an array of luminance pixels (Y) and two arrays of chrominance pixels (Cr, Cb).

According to the MPEG compression algorithm, frames are classified into one of three types: intracoded-frames (I-frames), predictively coded frames (P-frames) and bidirectionally coded frames (B-frames). I-frames use purely spatial compression, and are processed independently of other frames. Thus, I-frames are processed entirely by intra-frame operations. A complete picture can be generated from an I-frame alone.

P-frames are coded using the previous I- or P-frames. The compression of P-frames relies on temporal prediction from previous I- or P-frames. Only forward motion estimation/compensation is used in the temporal prediction. While P-frames may contain some intra-coded data, a complete picture, of the same quality as a picture which can be generated from an I-frame, cannot be generated from a P-frame alone because of the use of forward motion estimation/compensation in a P-frame.

B-frames are coded by a bidirectional motion compensated predictive encoder using the two adjacent I- or P-frames. B-frames are temporally predicted from two adjacent anchor frames. Both I- frames and P-frames serve as anchor (or reference frames) to the motion compensation of other frames. The B-frame temporal prediction uses motion compensation in forward and/or backward directions. B-frames are never used to predict other frames. Because of the dependence of B-frames on the two adjacent anchor frames, B-frames alone do not contain sufficient data from which to generate a recognizable picture.

The above three types of frames differ in their use of motion estimation. Motion estimation refers to the process of computing the spatial displacement of blocks of pixels due to motion. The resultant motion vectors are used in motion-compensated predictive coding. MPEG uses both forward motion estimation (in which the estimation is of the future referenced to the past), and backward motion estimation (in which the estimation is of the past referenced to the future). Forward and backward motion estimation are also combined to produce bidirectional motion estimation.

In accordance with the MPEG proposal, frames are arranged in ordered groups. A typical group is a series of frames containing, e.g., in the order of their being displayed, one I-frame, two B-frames, a P-frame, two B-frames, a P-frame and then two B-frames. FIG. 5 illustrates a typical Group of Pictures in the order they are displayed and the temporal prediction relationship between the various frames which comprise the group.

A group of pictures is intended to assist random access into the sequence. In the stored bit stream, the first coded frame in the group is normally an I-frame.

In accordance with the MPEG proposal, after the analog video signals are digitized, the digital data is organized into macroblocks. A macroblock is the unit of motion compensation and adaptive quantization. A number of macroblocks comprise a frame. Each macroblock defines a predetermined spatial region in a picture, and contains luminance and chrominance information.

The MPEG proposal provides for the arrangement of macroblocks into slices. A slice is an integer number of consecutive macroblocks from a raster of macroblocks. A slice represents the boundary within which differential coding of macroblock parameters, e.g. DC coefficients of a DCT, and motion vectors, is performed. Each slice has its own header information and can be independent of other slices. Each slice contains at least one macroblock. Slices do not overlap and there are no gaps between slices. The position of slices may change from picture to picture. The first slice starts with the first macroblock in the picture and the last slice ends with the last macroblock in the picture. The first macroblock in a slice has its macroblock parameters, e.g. DC coefficients of a DCT (if intra-coded) and motion vectors, differentially coded from a constant value. Each subsequent macroblock in a slice has its macroblock parameters measured as an offset from the previous macroblock in the slice. Accordingly, the size of the slice is the minimum size for which a piece of data can be recovered and correctly decoded. If part of a slice is lost, it may not be possible to decode the differences in motion vectors and DC coefficients contained in the remaining part of the slice.

FIG. 6 illustrates a macroblock in accordance with the MPEG proposal which may be used, e.g. for HDTV signals. As illustrated in FIG. 7, a macroblock comprises four $8 \times 8$ luminance blocks (Y0, Y1, Y2, Y3) and two $8 \times 8$ color difference blocks (Cr and Cb). The four luminance blocks (Y0, Y1, Y2, Y3) and two color difference (Cr, Cb) blocks, which form a single macroblock are used to encode a $16 \times 16$ picture element array covering the same spatial region in a picture. As described above, a macroblock serves as the unit of motion compensation and adaptive quantization.

In accordance with the MPEG proposal, motion-compensated predictive coding is carried out by calculating motion vectors for every macroblock in a P-frame or B-frame. MPEG compression encodes motion vectors on a macroblock basis, but does not specify the technique for computing them. Thus, a variety of different motion estimation techniques can be implemented consistent with the MPEG standard. One technique, for example, is to compute motion vectors from the frame-to-frame correlation of blocks of pixels in the luminance signal, resulting in a motion vector for the luminance component of the macroblock.

The best mode for encoding each macroblock is selected. Within a given picture, each macroblock is coded in one of several different modes. The intraframe coding mode refers to macroblock coding in which only spatial information is used. Conversely, the interframe coding modes (forward motion, backward motion and bi-directional motion) refer to macroblock coding in which information from frames other than the current frame is used in the coding, typically for temporal prediction in motion-compensated predictive coding. For I-frame macroblocks, only intraframe coding mode is available.

P-frame macroblocks are first checked to determine if interframe coding without motion compensation is appropriate. This decision is made by computing the luminance energy of a forward prediction residual for the macroblock that results from an interframe coding without motion compensation, and comparing it to a threshold value. If the residual energy is below the threshold, then the macroblock will be coded using interframe coding without motion compensation. Otherwise, the residual macroblock from interframe coding with forward motion compensation will be derived and used in the final step of the coding mode selection.

B-frame macroblocks are similarly processed to determine whether interframe coding is appropriate. Since B-frames may be bidirectionally coded, interframe coding can be either forward or backward, based on the preceding and following anchor (i.e., I- or P-) frames. It may also be based on the average of those macroblocks from the preceding and the following anchor frames. In interframe coding using motion compensation, there are three possible modes: forward, backward, and bidirectional. The choice of coding mode for B-frame macroblocks is also determined on the basis of luminance prediction residual energy.

The final step in the coding mode selection for both P- and B-frame macroblocks is to choose between interframe coding and intraframe coding. Generally, P-frames and B-frames are encoded using interframe encoding. This selection is made by comparing the luminance energy of the original macroblock to the energy of the luminance interframe (with or without motion compensation) prediction residual macroblock. If the original macroblock has less energy than the prediction residual macroblock, the intraframe coding mode is selected.

After the motion vectors have been calculated, each macroblock is transform encoded. In summary, the macroblocks are transformed from pixel domain to the DCT coefficient domain. The picture information in each frame (i.e., pixel values for I-frames, and residual error after prediction for B and P-frames) is transformed using the DCT and then adaptively quantized. For the purpose of performing the DCT, a frame picture is divided, for example, into blocks of values (i.e., arrays of DCT coefficients). Each quantized DCT coefficient along with other MPEG-specific data is variable length encoded by the video encoder module to form MPEG codewords.

The DCT process generates blocks of DCT coefficients in a zigzag scanned format (i.e., the low-frequency coefficients are followed by the higher frequency coefficients). This zigzag scan arrangement facilitates the subsequent run-length coding process. The DCT coefficient for which the frequency is zero in both dimensions is called the DC coefficient.

Next, adaptive quantization is performed on each block of DCT coefficients. After adaptive quantization has been applied to the DCT coefficients, the coefficients undergo further compression involving such known techniques as differential coding, run-length coding and variable length coding. As a result, the video compression encoder module produces encoded data, in the form of variable length codewords, and information concerning the number of header and coded data bits per macroblock. The header provides, inter alia, a mechanism for dynamic specification of the picture size, in terms of pixels per line and a pixel aspect ratio. The video compression encoder module also outputs information that states which frame the encoded data represents and which macroblock and slice the encoded data represents.

The codewords are then further encoded by, for example, a transport encoder, to provide reliable delivery of the variable length encoded compressed video.

The MPEG compression standard also produces D-pictures, also referred to as D-frames. A D-picture is coded using only intraframe encoding. Of the DCT coefficients in the coded representation of a D-picture, only the DC coefficients are present. Thus, D-pictures comprise the DC coefficient of each DCT block in the frame. D-pictures are not used in sequences containing frame types, such as I-, P-, or B-frames.

D-pictures are thus stored separately from the normal MPEG bitstream and must appear in a separate picture sequence that cannot contain any other type of picture. Furthermore, D-pictures must be encoded and transmitted separately. They must also be decoded using a separate algorithm from the algorithm used to decode the other frames, i.e. the I, P & B-frames. Thus, D-pictures cannot be decoded in conjunction with other MPEG data such as I-frames.

A proposed standard for HDTV using motion compensation compression techniques is the Advanced Digital Television ("AD HDTV") system developed by the Advanced Television Research Consortium. The proposed AD HDTV system is described in the Advanced Television Research Consortium's "Advanced Digital Television, System Description" of Jan. 20, 1992 and in the Advanced Television Research Consortium's "Advanced Digital Television, Prototype Hardware Description" of Feb. 12, 1992 which are both herein expressly incorporated by reference. The proposed AD HDTV system uses a modified data compression technique based on the ISO-MPEG standard, called MPEG++.

MPEG++ compression uses a two-pass encoding system that has the function of adaptively segregating video data produced by the compression processor into a subjectively important high priority ("HP") bit stream and a less important standard priority ("SP") bit stream. The high priority bit stream provides data sufficient to produce a viewable picture and the additional standard priority bit stream provides the additional data need to produce full HDTV quality video.

Separation into high and standard-priority data streams is carried out using an adaptive prioritization algorithm which takes into account, inter alia, the MPEG frame type (i.e., I, B or P), and the relative occupancies of HP and SP rate buffers at the output of the MPEG++ encoding system. Highest priority is given to the MPEG headers that indicate the start of video data blocks (e.g., slices and macroblocks), which are needed to initiate the decoding of received video data. I-frame data and P-frame motion vectors are also given relatively high priority, while most B-frame data is transmitted with standard priority. The adaptive prioritization algorithm outputs the data stream of codewords and a signal representing the priority level for each codeword stream.

The AD HDTV system uses a Prioritized Data Transport (PDT) format to provide reliable delivery of variable length encoded compressed video data. The PDT format supports flexible multiplexing of video, audio and data services without requiring preselection of operating bit rates. The AD HDTV system accordingly formats all data into a sequence of fixed length packets, each with appropriate headers for identification and error recovery. These packets are called transport cells.

The data stream of codewords and the priority level for each code word, i.e. HP or SP, is received and the transport cells are filled with the data as appropriate to its priority. Each transport cell is tagged with an Adaption Header which includes information necessary to restart video decoding if synchronization is lost prior to the current transport cell. This information might include macroblock number, block position within the macroblock, frame number, field or frame coding, quantization level, priority of the data, and a pointer to a data boundary within the cell. Cells at different priority levels, i.e. HP or SP, may have different header information as appropriate to decode data of the given priority level.

As described above, the proposed priority encoder of the AD HDTV system separates a single encoded video codeword stream from the compression processor into two data streams corresponding to two priority levels: the high priority (HP) and the standard priority (SP) data streams. The goal of the priority encoder is to produce a HP codeword stream that represents a viewable picture. This HP codeword stream can be transmitted at a higher power and in a separate frequency range to increase the area of reception for at least the basic video picture.

The proposed AD HDTV system allows different approaches and criteria to be employed in the construction of the HP and SP codeword streams. An allocation process takes place once at the beginning of every frame to determine the fraction of data for that frame that should be transmitted on the high priority channel. This decision is based on the type of frame being transmitted (I-, P- or B-frame), the number of bits generated for that frame (available from the compression processor) and the state of HP and SP buffers. In general, I-frame information tends to be the most important, and is generally transmitted on the high priority channel. There are two reasons for this. First, the effect of transmission error on I-frame data lasts longer than that on a P- or a B-frame because it is the basis of prediction for both P- and B-frames. Second, since there is no temporal prediction for I-frames, errors on DCT coefficients may result in complete loss of picture information for a macroblock.

P- and B-frames, on the other hand, can rely on partial motion information to produce reasonable images, even in the event of complete loss of the DCT coefficients due to transmissions errors. Hence, the general objective is to transmit as large a fraction of the I-frame data as possible on the high priority channel. For P-frames, most if not all motion vector data, and possibly some DCT coefficients are transmitted on the HP channel. More DCT coefficients are transmitted on the HP channel if additional capacity is available. It is important to at least transmit motion information for these frames on the HP channel since the effect of losses tends to propagate until the next I-frame. Finally, B-frames are considered the least important because they are not used for prediction purposes. Therefore, B-frame errors are constrained to a single frame and do not propagate to other frames. In general, the amount of B-frame data that are transmitted on the high priority channel is the smallest among the three types of frames.

While the AD HDTV priority assignment process does not specify exactly what must appear in the HP data stream, the AD HDTV proposal provides general guidelines of priority assignments that can be used for each frame type. The AD HDTV proposal states that for all frame types, the three most important types of information are frame headers, slice headers and macroblock information (addresses, types and quantization). For I-frames, next in priority are (in order) DC DCT coefficients, low frequency DCT coefficients and finally high frequency DCT coefficients. For B- and P-frames, next in priority are (in order) motion vectors, DC DCT coefficients, low frequency DCT coefficients and finally high frequency DCT coefficients. As stated above, the codewords are prioritized into DCT coefficients of increasingly higher spatial frequency.

In the proposed AD HDTV system, the HP data rate is one fourth the SP data rate. Accordingly, the ratio of HP to SP data is 1:4.

FIG. 7 illustrates the structure of a transport cell in accordance with the AD HDTV system proposal. Each cell contains an error correction layer and a prioritized data transport (PDT) format layer. As illustrated in FIG. 7, there are three sublayers within the PDT format layer. They are a data link layer, an MPEG++ adaption layer and the service data layer. The data link layer comprises a service type byte which carries the priority level indicator (HP or SP) and a frame check sequence for error detection. Accordingly, the service type byte allows immediate identification of a transport cell to be either high or standard priority. The service type byte also identifies the data type for video, audio, and auxiliary data and contains a 4-bit continuity counter (CC) component. This counter increments by one for each cell transmitted. The continuity counter allows the receiver buffers to detect cell discontinuity (due to uncorrectable cell errors) for a particular transport service.

The MPEG++ adaption layer allows a decoder to synchronize to variable length codes within the MPEG compressed video service. The first usable entry-point in each cell is identified and stored in an Adaptation Header (AH) of the MPEG++ adaption layer. For high priority data, the AH contains slice entry point information (i.e., a pointer to the first bit of the entry point of the slice in the transport data), frame type information, the frame number and the slice numbers within frame. For low priority data, the AH contains a pointer to the start of a macroblock, frame type information, the frame number and the macroblock number within the frame.

The video service layer of each transport cell contains transport data which may include video, audio and/or control data. The transport data includes video-specific parameters that can be used for resynchronization after a long burst of errors. A record header (RH) appears at the beginning of each slice, and is sent in the high priority transport cells only. Any number of record headers may appear in a cell, but only the first is used as an entry-point in the AH. The entry-point feature in the AH for a HP cell, as stated above, contains information regarding the location of the start of data block (which is always a RH), as well as other information such as the frame type and slice number. The RH can include a priority breakpoint (specifying the break between HP and SP information), a vertical position, a quantization scale factor, and a record header extension.

To summarize, in accordance with the AD HDTV system proposal, each HP cell contains data arranged in slices. Each SP cell contains data arranged in macroblocks. Entry points allow these data blocks to be segmented across cell boundaries. However, the AH information only contains one pointer to the start of the macroblock or slice. There may, however, be more than one macroblock or slice starting in each cell. Thus, at least one of these blocks will not have an entry point recorded in the AH. Alternatively, a macroblock or slice may take up many cells, and thus there is not an entry point for the block in subsequent cells. In the event of a cell loss, the entry point information can be used for the rapid resynchronization of the transport data. In the event of an error leading to the loss of a cell without an entry point, the receiver will restart decoding at the next block with an entry point.

Another proposed standard for HDTV is the DigiCipher system (also referred to as the ATVA-Interlaced system) developed by General Instrument Corporation.

This proposed system is described in General Instrument Corporation's "DigiCipher HDTV System Description" of Aug. 22, 1991 which is hereby expressly incorporated by reference. The DigiCipher system uses transform encoding as the technique of data compression.

The DigiCipher system does not have complete, temporally coincident frames of intra-coded data. Rather, intra-frame data updates an image on a regular basis in vertical columns on the screen.

In the DigiCipher system, a pixel is an 8 bit active video sample (luminance or chrominance) while a block is an image area of 8×8 pixels. A superblock is an image area comprising 4 luminance blocks horizontally by 2 luminance blocks vertically and one associated chrominance block each for U and V values derived from that image area. A macroblock is an image area of eleven horizontally arranged superblocks.

The DigiCipher system transforms a block of pixels into a new block of transform coefficients using the DCT. The transform is applied to each block until the entire image has been transformed.

Next the number of bits required to represent the DCT coefficients is reduced. Accordingly, a coefficient quantization process gives weights to each of the DCT coefficients. Each coefficient is divided by its weighing factor. Then a quantization factor is determined based on scene complexity and perceptual characteristics, and additional scaling takes place by dividing the weighted coefficients by the quantization factor.

The quantization method of the DigiCipher method, however, is not applied to the DC coefficient. The most significant bits of the DC coefficient are always selected, independent of the quantization level.

Next a statistical coding technique, such as a Huffman coding, is used that does not degrade the image. The DCT coefficients are serialized into a sequence and amplitude/run length coded. A codeword is assigned indicating the amplitude of the coefficient and the number of zeros preceding it (runlength).

In addition, the DC coefficient is Huffman coded after it is differentially coded within a superblock. The efficiency of this coding process is heavily dependent on the order in which the coefficients are scanned. By scanning from high amplitude to low amplitude, it is possible to reduce the number of runs of zero coefficients typically to a single long run at the end of the block. The coefficients are zigzag scanned going down first from the DC coefficient.

There is a limit to the amount of compression possible by spatial processing alone. An interframe coder, however, can benefit from temporal correlation as well as spatial correlation. A very high degree of temporal correlation exists whenever there is little movement from one frame to the next.

In the DigiCipher system, the signal is compressed by first predicting how the next frame will appear and then sending the difference between the prediction and the actual image. A reasonable predictor is the previous frame. This sort of temporal differential encoding will perform very well if little movement occurs or if there is little spatial detail. At other times, it will be less effective and occasionally worse than if the next frame had simply been encoded without prediction.

Instead of transform coding an image directly, an estimate of the image is first generated using motion compensation. The difference between this estimate and the actual image is then transform coded and the transform coefficients are then normalized and statistically coded as before. The second of the two frames from which the motion estimates are derived is always the previous frame as it appears after reconstruction by the decoder.

Differential processing in general causes a basic problem for the decoder. When a decoder is tuned to a new channel, it has no "previous frame" information. Acquisition would be delayed until at least one pulse code modulation ("PCM") version of every block is received, which results in an unbounded acquisition time.

Thus, in the DigiCipher system, during each 0.37 second interval, all blocks are processed once in PCM form on a distributed basis. This technique results in a 0.37 second differential pulse code modulation ("DPCM") based acquisition time component, but spreads the resulting increase in channel bits uniformly over time.

The 0.37 second parameter would imply a forced PCM block once every 11 frames, and there is a necessary but nontrivial reduction in the overall compression efficiency. The 0.37 second parameter can be varied to trade off acquisition time versus efficiency.

Thus, the DigiCipher system has very little tolerance for errors or missing information in the data stream. The DigiCipher system will repeat a macroblock from the previous frame when an error is detected. Errors are detected by checking whether all the compressed data is used when a macroblock processing is finished. Because of the variable length encoding of data, resynchronization must take place after an error occurs. There is no place for resynchronization, however, except at the start of the next frame using a next frame pointer.

The above-described systems do not specify the data formats and compression techniques to make the systems suitable for VTR applications. Requirements peculiar to VTRs include the need for the ability to record for normal speed playback as well as fast forward playback at a variety of speeds, reverse playback at "normal" speed and other speeds, slow motion playback and freeze-frame viewing. A VTR must be able to receive data and arrange it so that it can be stored on a tape in a suitable format to allow playback at different speeds and in different modes.

The playback of recorded compressed digital video data is difficult at speeds faster than the normal forward speed and in reverse direction. The reason is that digital compression systems, such as those systems described above (i.e., the AD HDTV system and the DigiCipher system) produce very compact non-redundant descriptions of images. Consequently, the delivery of only a portion of the compressed data (such as occurs at higher than normal playback speeds) results in a playback data stream that is largely incomprehensible to a video decoder.

The use of the MPEG standard for supporting fast play modes in a VTR has been suggested by a report titled "Coding of Moving Pictures and Associated Audio for Digital Storage Media at up to about 1.5 Mbit/s", ISO 2-11172 rev 1, Jun. 10, 1992, hereinafter "the MPEG report", which is hereby expressly incorporated by reference. In the MPEG report, at pp. D-52 to D-54, it is suggested that MPEG D-frames and I-frames, both of which contain only intra-coded material, can be used to support fast forward play.

As described above, MPEG D-frames, which are an extension of the normal MPEG data stream, contain only the DC coefficients of a DCT transform. Therefore, D-frames contain only information encoded using intra-frame processing. In MPEG, D frames are completely independent of the normal bitstream of I-, B- and P-frames and thus must be encoded, transmitted and stored separately from the normal data stream. Furthermore, D-frames must be decoded by a different algorithm which requires the use of a separate decoder circuit from the decoder circuit used to decode I-, B-, and P-frames.

Such requirements of separate encoding, decoding and storage of D-frames adds to the cost and complexity of a VTR which uses D-frames for fast play modes of operation. In addition, the picture quality that can be reproduced using intra-coded D-frames alone is relatively poor compared to pictures which can be reproduced from I-frames, for example.

Further, the MPEG report suggests that the MPEG standard can be used to support fast play if I-frames are appropriately spaced in a sequence. As an example, the MPEG report states that if I-frames were spaced regularly every ten frames, then a decoder might be able to play the sequence at ten times the normal speed by decoding and displaying only I-frames.

While suggesting the above use of I-frames for fast play, the MPEG report recognizes that this concept places considerable burdens on the media and the decoder. To use I-frames as suggested, the media must be capable of speeding up and delivering ten times the data rate and the decoder must be capable of accepting this higher data rate and decoding the I-frames. While the MPEG report recognizes these problems, it fails to teach how to overcome these burdens on the media and decoder so that a VTR can actually be implemented using the suggested approach.

The MPEG report further suggests that the media itself might be used to somehow sort out the I-frames and transmit them to produce a valid MPEG video bitstream during fast play. However, the MPEG report does not suggest how the media might actually implement such a system.

In addition to the problems encountered during fast play, there are several problems associated with reverse play by a VTR which stores information in accordance the MPEG standard or other highly compressed data formats. For a VTR to decode an inter-frame encoded bitstream and play in reverse, the VTR's decoder must decode each group of pictures in the forward direction, store the decoded pictures, then display them in reverse order. This places severe storage requirements on the decoder and further complicates the problem of gaining access to the coded bitstream in the correct order. Furthermore, similar problems to the ones discussed above in regard to fast play arise if reverse playback is to be performed at different speeds.

Accordingly, there are several problems which need to be addressed when the MPEG or similar standards are used for recording video information on a tape by a VTR.

One known VTR which supports high speed playback receives an analog video signal, digitizes the signal, and converts each picture frame in the signal into main information (for rough formation of the whole image during high speed playback) and subinformation (for forming details of the image). The main information and subinformation corresponding to each picture frame are recorded on a single track with each track on a tape storing data corresponding to a different picture frame. Each block of main information, corresponding to a particular frame, is recorded at the center of the recording track which contains all the data corresponding to the particular frame. The subinformation corresponding to the particular frame is recorded on regions on both sides of the center of the track containing the main information belonging to the particular frame. During trick play, the main information is used to generate images which are displayed.

The known VTR does not receive data in a compressed format and, to make its conversion to main and subinformation, requires that the received analog video signal be digitized and encoded before the data can be recorded on tape. Furthermore, the encoding and one frame per track recording processes used support only intra-frame encoding of pictures. Such a system has serious drawbacks where the picture information for an intra-coded frame of video, such as in the case of HDTV, may not be able to be stored in a single tape track because of the large amount of data involved. Furthermore, such a system fails to take advantage or address the use of inter-frame coding techniques to reduce the amount of data which must be stored for a series of frames.

SUMMARY OF THE INVENTION

The present invention provides a digital video recorder compatible receiver. In a representative embodiment, the receiver comprises a digital video tape recorder ("VTR") port and a video decoder including an error concealment circuit. The video decoder receives video data which it decodes and outputs to a display device such as a cathode ray tube or liquid crystal display device.

The digital VTR port is adapted for coupling the receiver to a VTR command and data output of a video tape recorder. The digital VTR port receives from the VTR video data and VTR commands. The VTR commands may indicate, e.g., that the VTR is operating in trick play mode or that particular trick play error concealment operations are to be performed. The video data can comprise, for example, digital video/audio data packets. The VTR commands can be received by the receiver via a separate command line coupled to the digital VTR port or as part of the video/audio data packet stream. Alternatively, the error concealment circuit may detect that the VTR is operating in trick play mode by monitoring the received video data and, e.g., detecting that data for fewer inter-coded frames are being received than would be the case during normal VTR playback operation.

The video decoder including the error concealment circuit is coupled to the digital VTR port. On receiving a VTR command that indicates that the VTR is operating in trick play mode or upon determining from the received data that the VTR is operating in trick play mode, the error concealment circuit disables normal play error concealment performed on the video data and enables trick play error concealment. While there may be a number of error concealment operations that are the same for both normal play error concealment and trick play error concealment, trick play error concealment includes additional error concealment operations which are not performed during normal playback operation. Thus, trick play error concealment includes error concealment operations which are specifically directed to the concealment of errors resulting from trick play VTR operation such as fast forward or reverse playback operation.

The error concealment circuit of the present invention may include a temporal filter and/or a spatial filter for performing temporal filtering and/or spatial filtering, respectively, of the video data when trick play error concealment is enabled. Accordingly, the receiver of the present invention is capable of treating data differently during VTR trick play operation than during normal play operation. This permits a receiver of the present invention to display data supplied from a VTR during trick play mode in a manner that provides higher quality images than would be possible if the receiver operated as if it were receiving normal play data.

One embodiment of the receiver of the present invention further comprises a transport and priority decoder circuit coupled to the digital VTR port and the video decoder. The transport and priority decoder circuit receives the video/audio transport data packets and VTR commands and performs depacketization and priority decoding on the video data to generate video codewords which are supplied to the video decoder for additional processing and error concealment operations prior to display of the video data.

Additionally, in accordance with another feature of the present invention, the digital VTR port and the transport and priority decoder circuit may be coupled to a tuner module. The tuner module receives a signal from a transmitter or other transmission service and performs demodulating, trellis decoding and de-interleaving on this signal to generate video/audio transport data packets. In addition, via the tuner module, the receiver of the present invention can receive a video signal from a VTR. If the signal is from the VTR, the receiver's error concealment circuit and/or video decoder may receive VTR commands via the tuner module along with other video and/or audio data.

Accordingly, the receiver of the present invention can receive data from either a digital VTR port or from radio frequency signals. A signal select device is operated to select either the transport data packets from the tuner module or the transport data packets from the VTR port for transport depacketization and decoding by the transport and priority decoder. Thus, the receiver of the present invention can receive data from a VTR directly or through its tuner module. In either case, if the receiver detects that it is receiving data from a VTR operating in trick play mode or the receiver receives a VTR command indicating that it is receiving data from a VTR operating in trick play mode, trick play error concealment is performed and normal play error concealment is disabled by the receiver in order to provide a series of recognizable images or portions of images to a display device when receiving data from a VTR operating in trick play mode.

BRIEF DESCRIPTION OF THE DRAWINGS

FIG. 7 illustrates the structure of a transport cell in accordance with the AD HDTV system proposal.

DETAILED DESCRIPTION

Figure 1A:
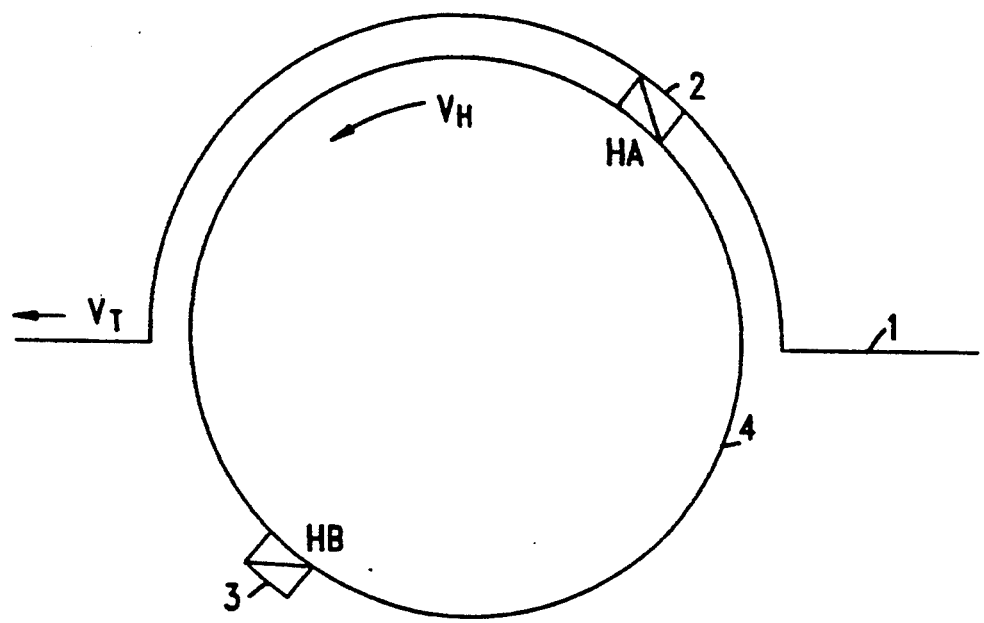
FIG. 1(a) is an illustration of a conventional two head video recording system.
Figure 1B:
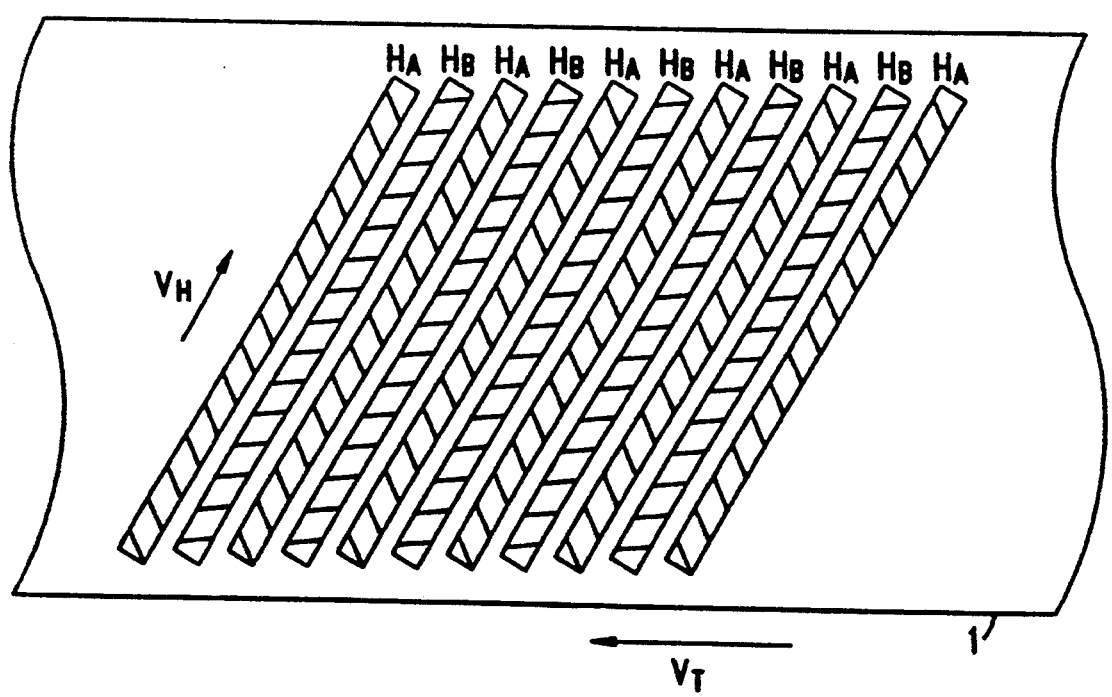
FIG. 1(b) illustrates a portion of a tape, including a series of parallel tracks, written on the tape by the video recording system of FIG. 1(a) wherein track separations are shown only for the purpose of clarity.
Figure 1C:
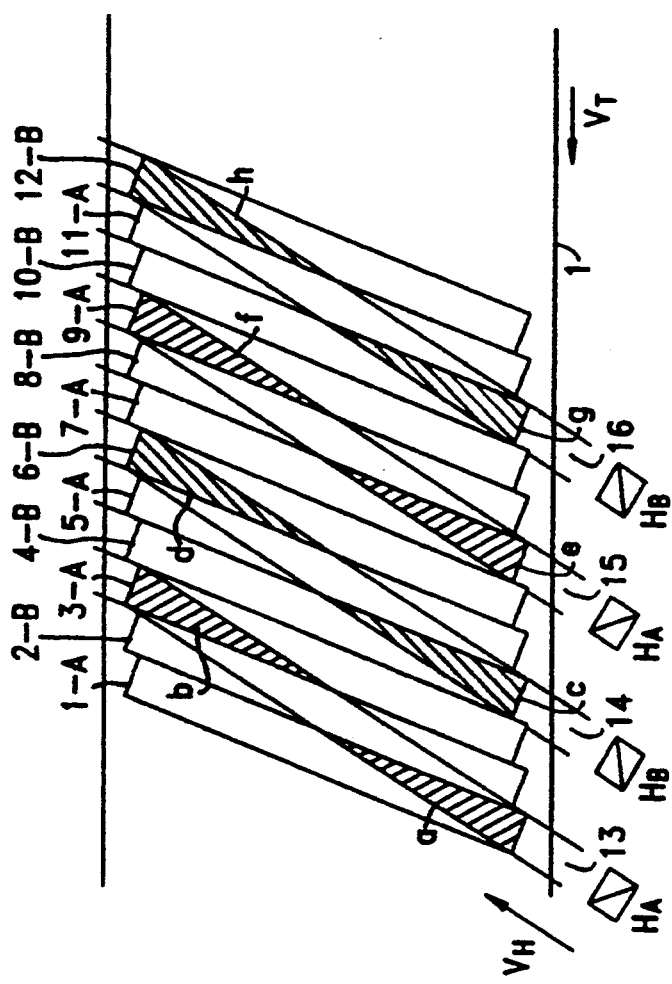
FIG. 1(c) illustrates the paths traced by the record/playback heads of the video recording system of FIG. 1(a), across a portion of the tape during playback operation at three times the standard playback speed.
Figure 2A:
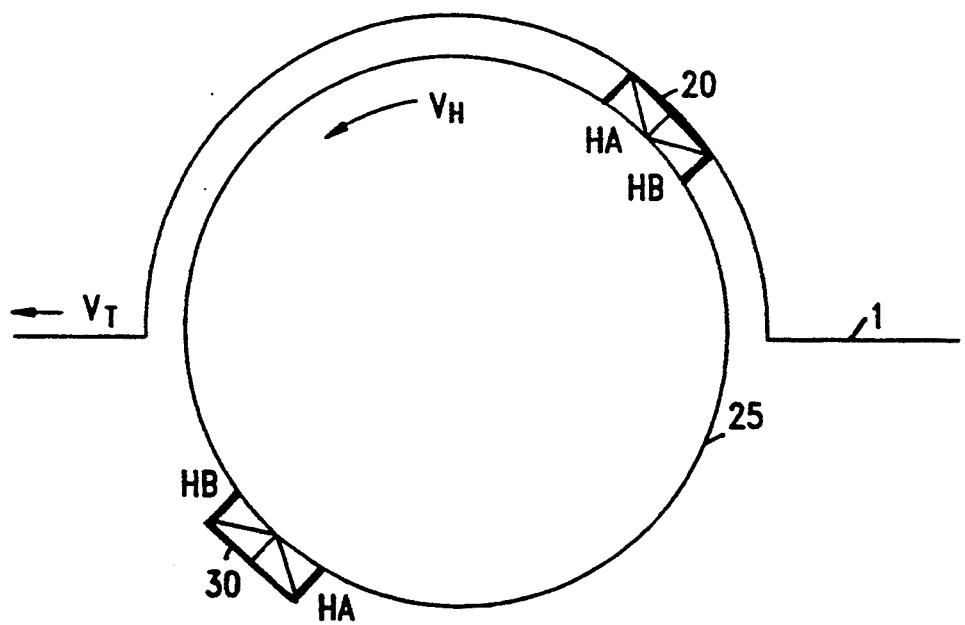
FIG. 2(a) is an illustration of a four head VTR system comprising 2 pairs of co-located heads.
Figure 2B:
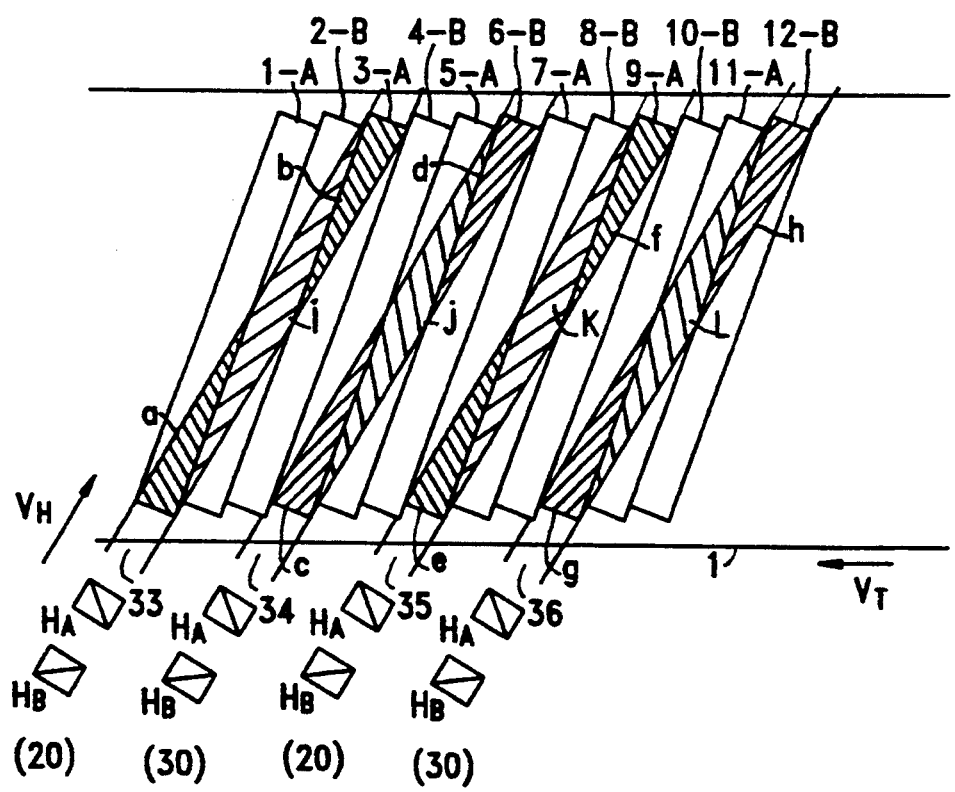
FIG. 2(b) illustrates the paths traced across the tape by the pairs of co-located heads of the VTR system of FIG. 2(a) during playback operation at three times the standard playback speed.
Figure 3A:
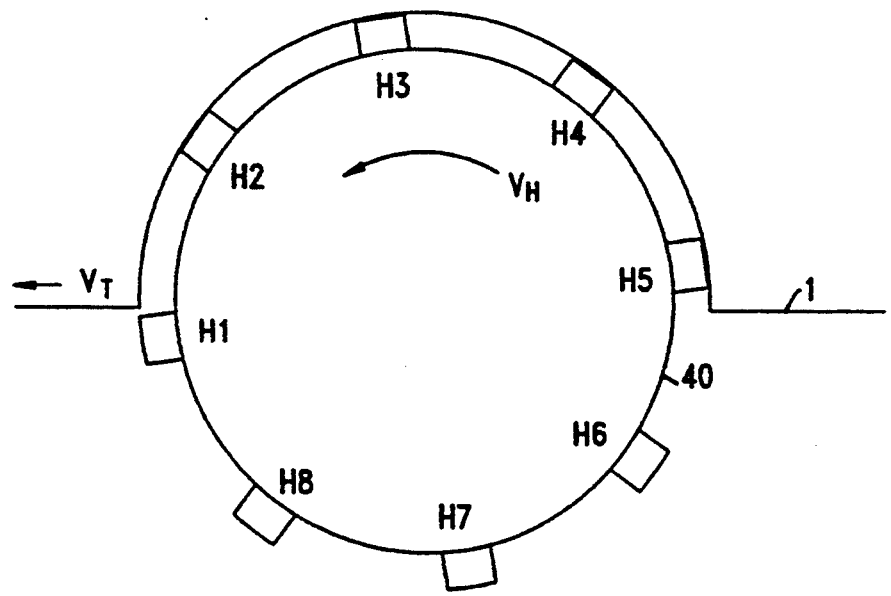
FIG. 3(a) is an illustration of an 8 head VTR system having four heads distributed evenly over each 180° portion of a rotary head cylinder.
Figure 3B:
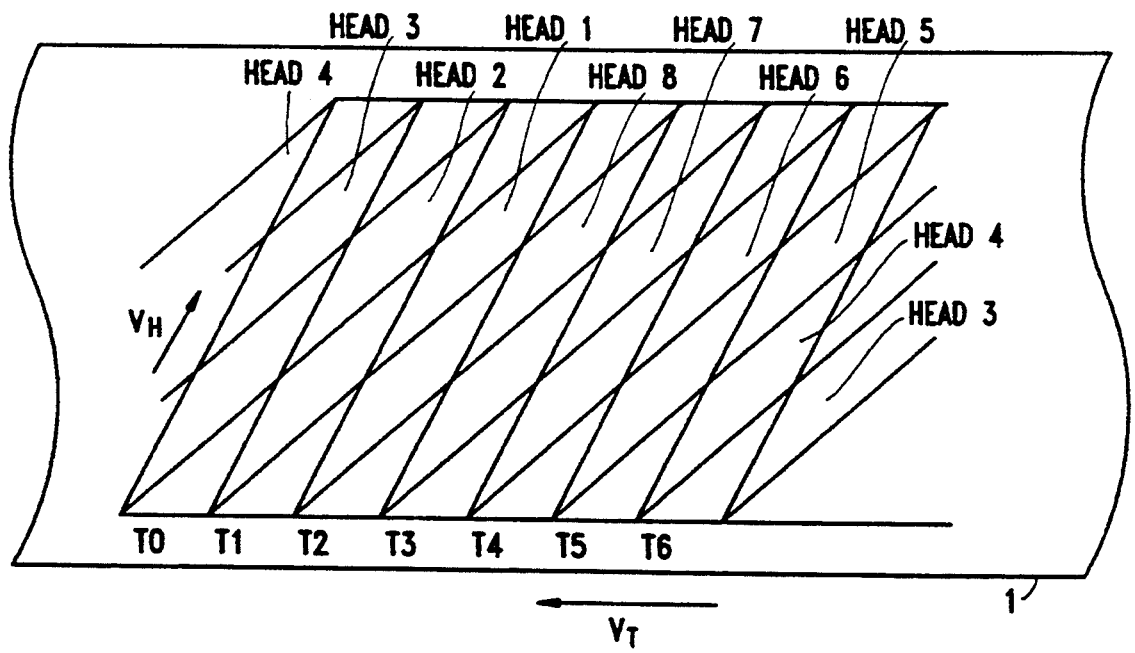
FIG. 3(b) illustrates the paths traced out across the tape by the heads of the VTR of FIG. 3(a) during 4× playback speed operation.
Figure 4A:
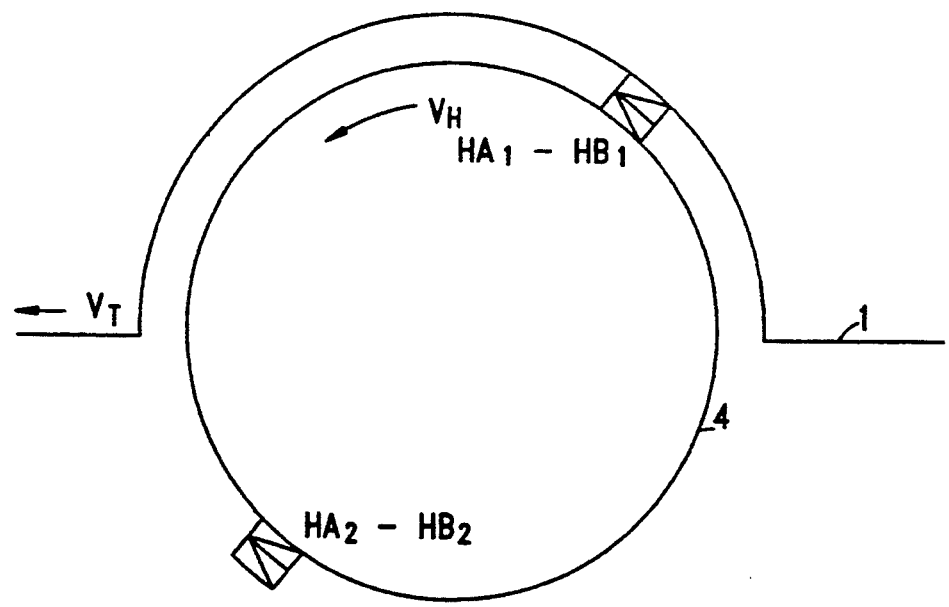
FIG. 4(a) is an illustration of a 2 channel, 4 head VTR system.
Figure 4B:
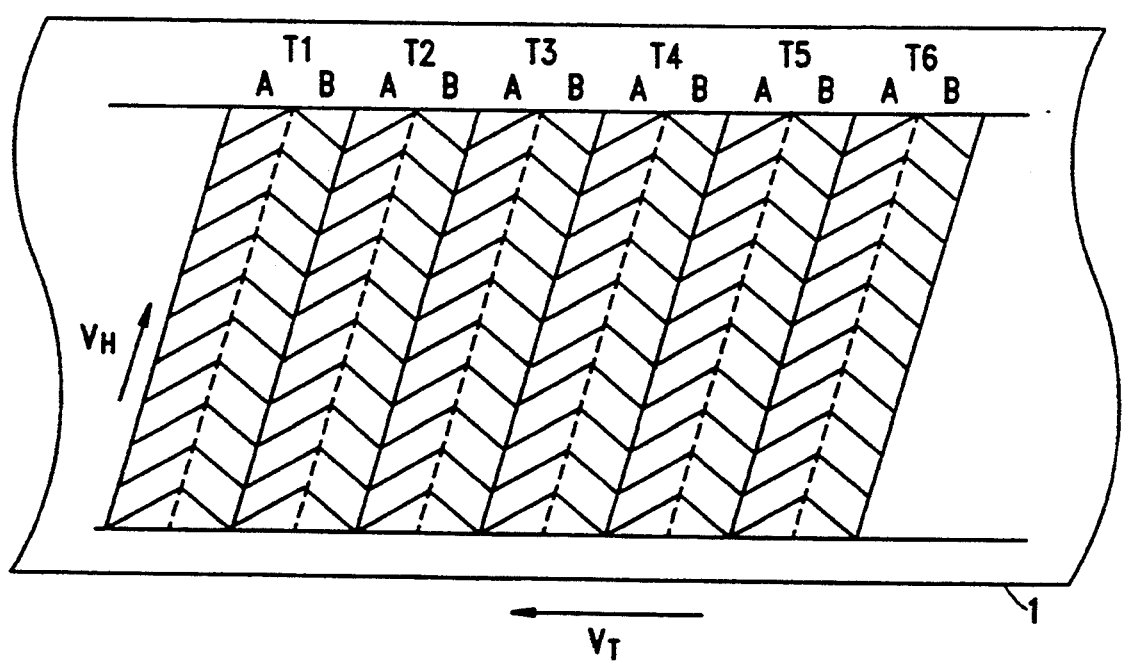
FIG. 4(b) is an illustration of a portion of a tape including a series of 2 channel tracks recorded on the tape by the VTR system of FIG. 4(a).
Figure 5:
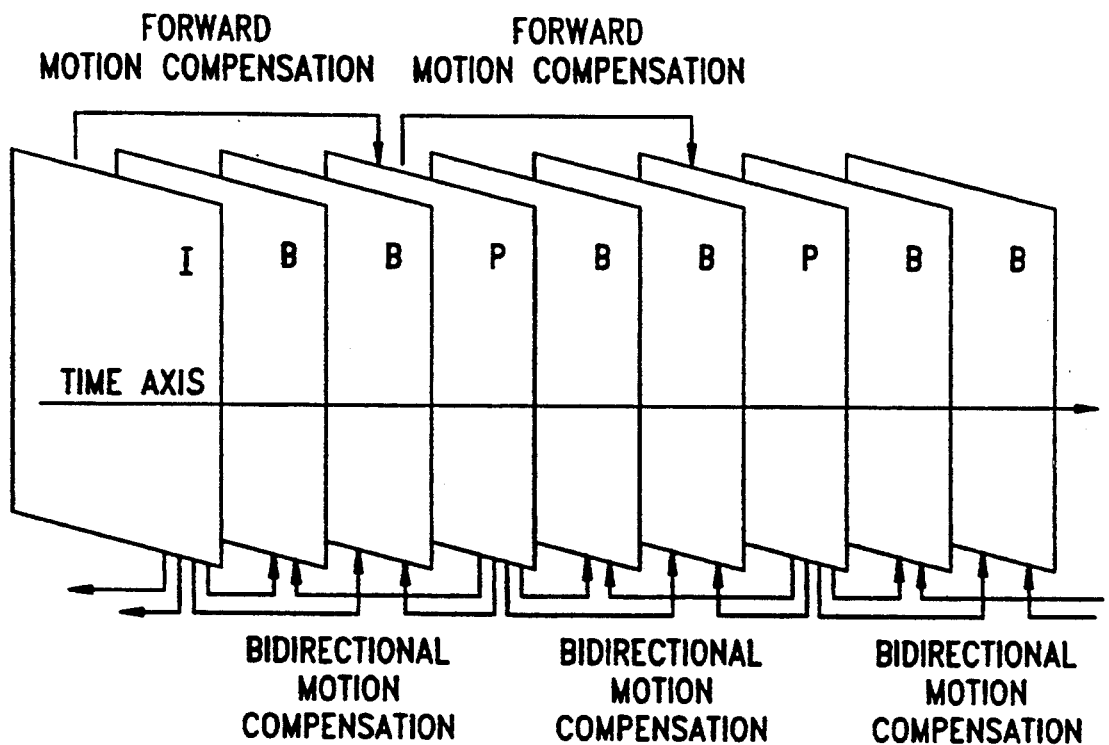
FIG. 5 is an illustration of a typical Group of Pictures in the order they are displayed.
Figure 6:
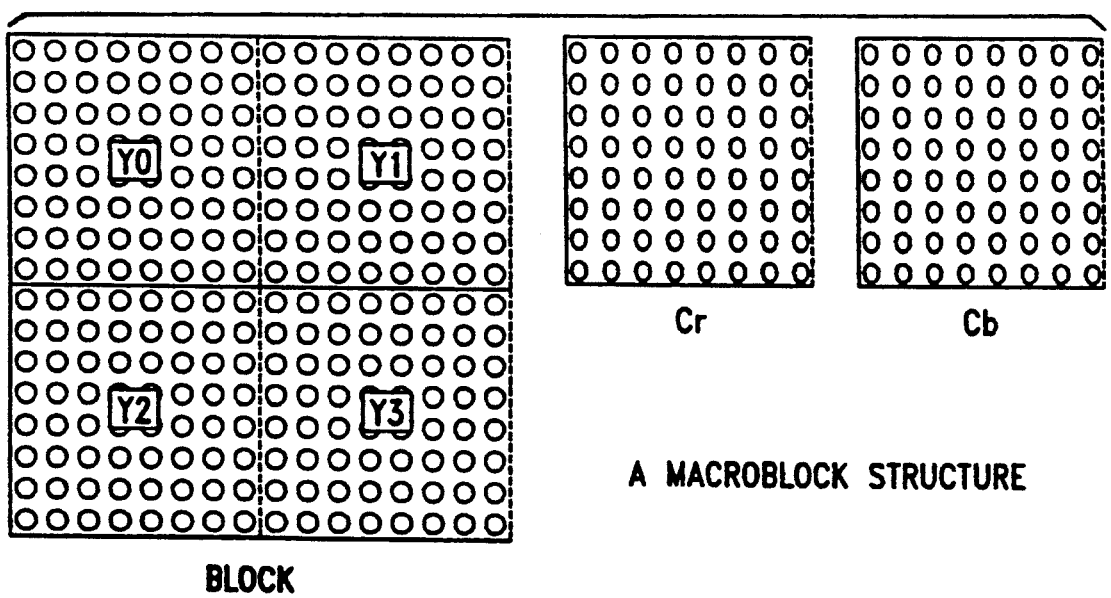
FIG. 6 illustrates a macroblock in accordance with the MPEG proposal which may be used, e.g., for HDTV signals.

One embodiment of the present invention is directed to transmitter circuits, which supply video (and audio) signals to digital video recording devices, e.g., VTRs, for recording and later playback during both normal and trick play operation. Various other embodiments of the present invention are directed to circuits, e.g., VTR record and playback circuits, for recording digital video (and audio) signals for playback during trick play operation. In addition, still other embodiments of the present invention are directed to receiver and display circuits which are capable of receiving and displaying transmitted audio and video signals received from, e.g., a transmission service or a VTR. Various circuits and embodiments of the present invention facilitate VTR trick play operation by, e.g., facilitating the selection of data for recording in tape segments, referred to as trick play tape segments, which are then read during VTR trick play operation.

In accordance with various embodiments of the present invention, a VTR writes data, which is particularly useful for generating recognizable images during trick play operation into trick play tape segments as will be described below. Because trick play segments are of a limited size, the selection of data that is written into such segments becomes important if recognizable images of reasonable quality are to be generated from the limited data read from the trick play segments during trick play operation. The data contained in each trick play segment comprises what are referred to as trick play data blocks. Accordingly various embodiments of the present invention, described below, are directed to circuits which prioritize and sort video data for recording in trick play segments. Furthermore, several features of the present invention support prioritization and sorting of video data by a VTR without requiring the VTR to fully decode the data packets which comprise the video data stream.

The present invention is also directed to circuits which optimize the amount of data that can be read from trick play segments during trick play mode by locating the trick play segments at particular locations on a tape designed to optimize recovery of trick play data during VTR trick play operation. As will be described below, in accordance with one feature of the present invention, trick play segments may be located in a geometric arrangement on a tape so that sufficient trick play data can be recovered at several different trick play speeds and directions of operation to generate an acceptable number of recognizable images or portions of images during trick play operation. As will be described below, the trick play segments in such an embodiment form what is referred to as a "multi-speed" playback track which may run, e.g., parallel to the length of the tape. In another embodiment, trick play segments may be located in such an arrangement that the heads of a VTR pass over an optimum number of trick play segments during operation at a particular trick play speed. In accordance with this embodiment, the trick play segments that are passed over during each pass of a VTR's head across the width of the tape during trick play operation at a particular playback speed and direction of operation, comprise a fast scan track for the particular trick play speed and tape direction.

One particular embodiment of the present invention is directed to a video (and audio) transmission circuit which digitizes, encodes, prioritizes and packetizes video (and audio) signals, for subsequent transmission, in a manner that optimizes the format of the resulting digital data for use by a video recording device, e.g., a VTR. The system of the present invention may be used in conjunction with, e.g., various digital HDTV systems.

As described above, there are various proposals for digital HDTV systems. However, none of the proposed systems include data formats which are fully optimized for VTR compatibility. One embodiment of the present invention is directed to a circuit that optimizes digital video (and audio) data streams for use with VTRs and other digital video recording devices while maintaining compatibility with the compression techniques normally used to create such data streams, e.g., the compression techniques used by the various proposed HDTV systems. Generally, the circuit of the present invention provides for implementation of (1) a VTR optimized data prioritization scheme, (2) packetization of the data in a manner that is reflective of the implemented VTR optimized prioritization scheme, and (3) headers that describe the contents of the data packets and permit the contents to be identified without full decoding of the data packets.

Figure 8A:
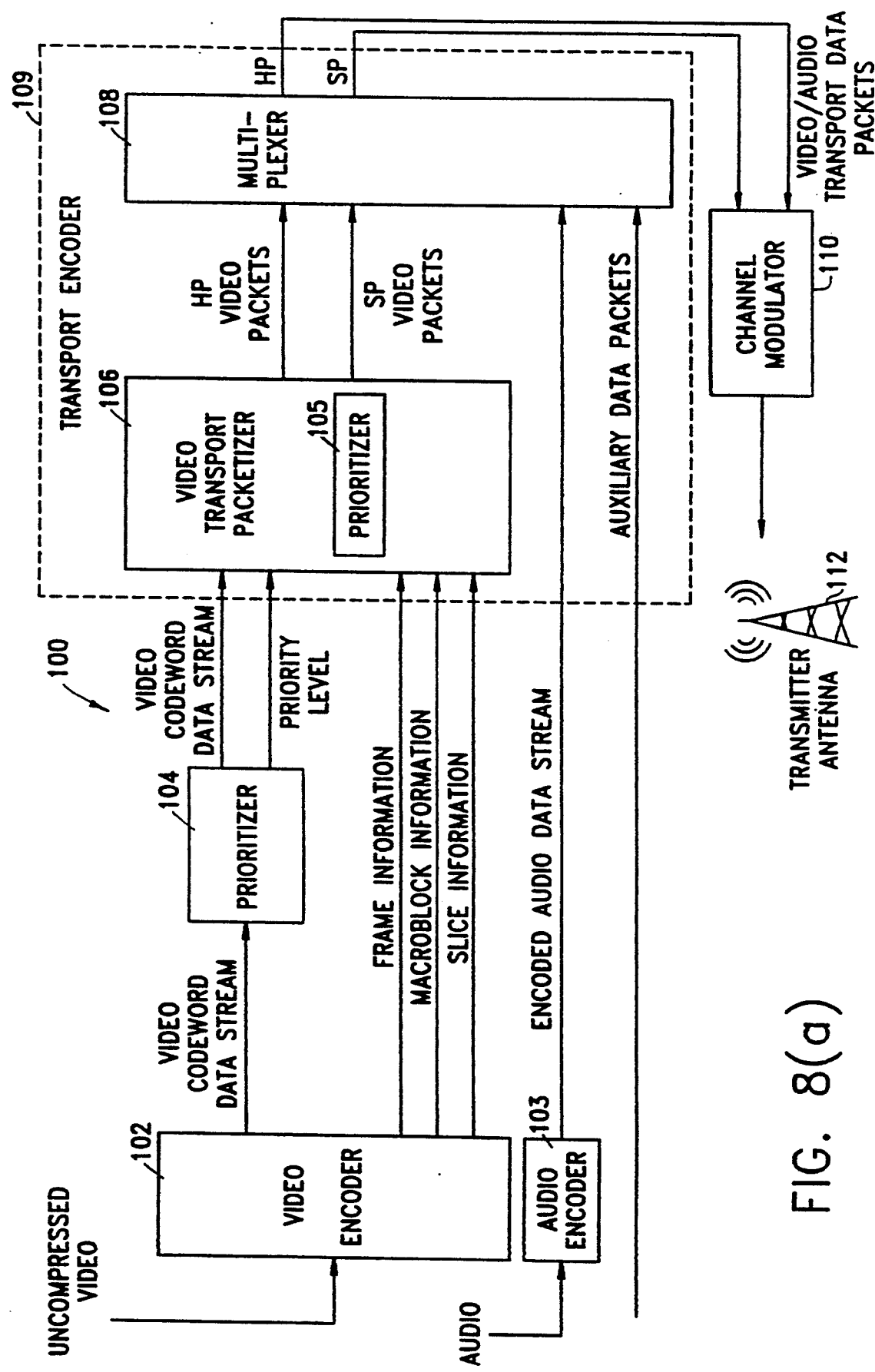
FIG. 8(a) is a block diagram of a video and audio transmission circuit in accordance with one embodiment of the present invention.

Referring now to the drawings, and initially to FIG. 8(a), there is illustrated a block diagram of a video and audio transmission circuit, according to one embodiment of the present invention, generally indicated by the reference numeral 100. The circuit 100 comprises a video encoder 102, an audio encoder 103, a prioritizer 104, a transport encoder 109, a channel modulator 110 and a transmitter/antenna 112.

In one embodiment of the present invention, the video encoder 102 has a video input for receiving an uncompressed analog video signal from a video source such as a video camera. The video encoder 102 digitizes, encodes and compresses the received video signal to produce a stream of encoded video data, e.g., a video codeword data stream. To produce the video codeword data stream, the video encoder 102 may use one or more known encoding and data compression techniques such as motion estimation and/or other MPEG encoding techniques. Accordingly, depending on the encoding technique used, the encoder can output data in the form of codewords corresponding to various types of video data including video frames, superblocks, slices, macroblocks, and various other subsets of video information which the data in the codeword data stream can represent in accordance with various possible data structures and encoding techniques. The video encoder 102 may generate picture headers in addition to codewords, with an individual picture header being associated with the particular codewords that comprise each individual video frame.

The codeword data stream output by the encoder 102 comprises, e.g., a stream of codewords wherein each codeword is represented by a variable number of bits. The codewords are normally recognizable by their position relative to one another and therefore are understood in the context of their order in the codeword data stream. The codewords in the data stream may represent, e.g., picture, slice, and macroblock headers.

The audio encoder 103 receives an audio signal from, e.g., a microphone which can be attached to a video camera which serves as the source of the video signal supplied to the video encoder 102. The audio signal is digitized, encoded, and packetized by the audio encoder 103. The audio encoder 103 outputs packets of encoded audio data via an audio data packet output that is coupled to a corresponding input of the transport encoder's multiplexer 108.

In video transmission systems, such as the proposed AD HDTV system, which transmit portions of the video data over multiple data channels, it is necessary to provide a method of separating the video data stream for transmission over separate data channels based on, e.g. prioritizing the video data. The video data can then be separated according to its relative priority for transmission over the various data channels based on the data's assigned priority level relative to the other data in the data stream. For example, the AD HDTV system proposal requires that the codewords output by the video encoder be divided into two data streams, i.e. a high priority (HP) data stream, which contains data essential for creating viewable images, and a standard priority (SP) data stream which contains the remaining data required to produce images of high definition quality. In the AD HDTV proposal, the HP and SP data streams are transmitted via two separate data channels at a HP to SP data ratio of 1:4.

While the proposed HDTV systems provide for data prioritization and transmission over separate data channels, the proposed prioritization schemes fail to optimize data based on the data's utility to VTR applications.

The prioritizer 104 of the present invention, illustrated in FIG. 8(a), implements a prioritization scheme that is based on the video data's utility to VTR applications such as trick play operation. Thus, video data utility is determined as a function of how useful the data is for generating a recognizable and scaleable image which is useable during trick play operation.

As illustrated in FIG. 8(a), a video codeword data stream output of the video encoder 102 is coupled to a corresponding input of the prioritizer 104. The prioritizer 104 receives the video codeword data stream from the video encoder 102 and prioritizes the codewords in the data stream into different priority levels.

As part of the prioritization process, the prioritizer 104 recognizes sub-sets of various types of digital video data, i.e., types of data contained in the video codewords, that are particularly useful to VTRs. The video codewords in the video codeword data stream are prioritized, i.e. assigned differing priority levels, based on the relative utility of the data in each codeword to VTR applications and in particular, to the data's utility in generating an image during trick play operation.

The prioritizer 104 has two outputs coupled to inputs of the transport encoder 109. The transport encoder 109 comprises a video transport packetizer 106 and a multiplexer 108. The video transport packetizer 106 is responsible for the packetization of the encoded video data, i.e. the video codewords supplied by the prioritizer 104.

The prioritizer 104 of the present invention outputs the video codeword data stream via a video codeword data stream output which is coupled to a corresponding input of the transport encoder's video transport packetizer 106. In addition, a priority level signal output of the prioritizer 104 is coupled to a corresponding input of the transport encoder's video transport packetizer 106. Via this connection, the prioritizer 104 supplies the packetizer 106 with a signal that indicates the assigned priority level of the data in the video codeword data stream.

The video transport packetizer 106, of the transport encoder 109, is also supplied with several signals from the video encoder 102. The video encoder 102 supplies information to the packetizer 106 indicating a correspondence between the video codewords in the codeword data stream and which particular frame, superblock, slice, macroblock or other piece of video information the data represents. Accordingly, FIG. 8(a) shows a frame information output, a macroblock information output and a slice information output each being coupled to a corresponding input of the video transport packetizer 106. It is to be understood that the number of video information connections between the video encoder 102 and the packetizer 106 may vary along with the actual information sent via these connections depending on the particular encoding and packetizing algorithms implemented. However, the video encoder 102 will generally supply the packetizer 106 with information for inclusion in packet headers which the packetizer 106 adds to each video packet it creates.

The video transport packetizer 106 places the video codewords from the prioritizer 104 into video packets and adds headers to each video packet. The packet headers include information necessary to restart video decoding if data synchronization is lost. The information included in the header added by the transport packetizer 106 may include, e.g., macroblock number, superblock position within the macroblock, frame number, field or frame coding, quantization level, the priority level of the data contained in the packet, and a pointer to a data boundary within the video data packet. Different priority packets may be provided with different headers containing information useful in decoding the data of the given level. Appropriately packetizing and identifying the data type and/or the VTR priority level of the packetized video data, using, e.g., packet headers permits a VTR which receives the transmitted packetized data to sort, record, and retrieve the digital information with a minimum amount of decoding.

Figure 8B:
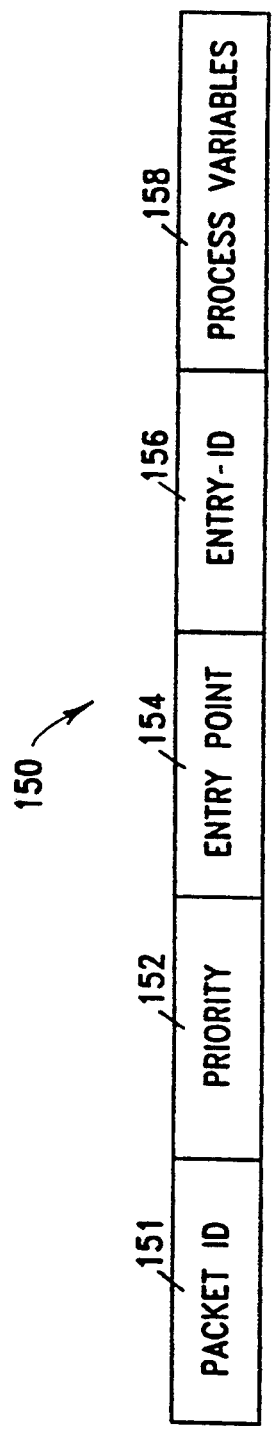
FIG. 8(b) illustrates a representative video packet header which may be attached by the transport packetizer, illustrated in FIG. 8(a), to the data packets generated in accordance with one embodiment of the present invention.

Referring now to FIG. 8(b), there is illustrated a suitable video packet header 150 which can be attached by the transport packetizer 106 to the data packets generated in accordance with the present invention. As illustrated in FIG. 8(b), the packet header 150 comprises a packet ID data block 151, a priority ID data block 152, an entry point data block 154, an entry ID data block 156 and a block of process variables 158. The packet ID data block 151 comprises information identifying the source of the packet, the packets sequence number, etc. The priority ID data block comprises information indicating the priority of the data contained within the particular video data packet. The entry point data block 154 contains a pointer to the next object in the data packet, e.g. a macroblock or superblock header. The entry ID data block 156 contains the ID of the object pointed to by the entry point ID data block 154. In addition, the header 150 also includes a block of process variables 158 which are necessary for decoding and which might be lost during resynchronization. Such process variables may include variables in the video codeword data stream that are global for an entire frame or image sequence.

Video data prioritization and packetization in the above manner facilitates a VTR's identification of data which is important to trick play operation. As will be described below, a VTR in accordance with a feature of the present invention, can selectively record packetized data in particular trick play segments, i.e. geographic areas on a tape from which data can be read during trick play operation. Trick play segments are of a limited size. Thus, a VTR which uses these segments to store data for trick play operation, must be selective in the data that it records in the trick play segments if it is going to be able to generate recognizable images from the limited amount of data recorded therein. In accordance with the present invention, the VTR selects the video data to record in these trick play segments from the video data stream based on how useful the data is for generating a recognizable image during trick play operation. The data is then recorded in the trick play segments on a space available basis with the highest priority data being stored before lower priority data. Prioritization and identification of data particularly useful to trick play mode prior to transmission reduces the burden on a VTR to decode and sort the video data while eliminating the need for the VTR to prioritize the data for trick play operation. Accordingly, prioritizing the video data before transmission permits simpler, cheaper VTRs with trick play capability.

The video codeword data stream which is output by the prioritizer 104 can be packetized and divided into two or more data streams for transmission via multiple transmission channels, e.g. a high priority and a standard priority transmission channel. In such an embodiment, the video transport packetizer 106 divides the video packets into different data streams based on the priority level assigned to the data contained in each particular video packet by the prioritizer 104. Alternatively, a transmission priority scheme which is independent of the VTR utility prioritization scheme of the present invention may be implemented by a transport data channel prioritizer 105 contained within the video transport packetizer 106. However, regardless of the transmission priority scheme implemented, each of the video/audio transport data packets output by the transport encoder 109 of the present invention is identified by the use of headers which permit a VTR to identify the type and priority level of the data contained in each of the video/audio transport data packets to facilitate selection of the data for trick play operation.

Allocating the data which is the most useful for trick play operation to a particular data channel, e.g., a high priority channel, when multiple data transmission channels are being used facilitates a VTR's selection of data to be recorded in trick play segments because the highest priority data for trick play operation is thus segregated to some extent from lower priority data. In such a case, a VTR can initially look to the HP data stream for the data to record in the trick play segments. Then, only when there is not enough data in the high priority data stream to fill the trick play segments does the VTR have to sort the data in the standard priority channel.

In such an embodiment, wherein multiple channels are being used to transmit the video/audio transport data packets, the transport encoder's video transport packetizer 106 performs the operation of separating the video packets into multiple data streams for transmission via separate channels using the transport data channel prioritizer 105.

The AD HDTV system proposal requires that the HDTV data transport cells be divided into two data streams, i.e. a high priority (HP) and a standard priority (SP) data stream for transmission via two separate data channels. Furthermore, the proposed AD HDTV system uses I-, P-, and B-frames characteristic of MPEG video encoding. While the published system descriptions only set forth general guidelines for determining the contents of the HP data stream, the video packetizer 106 implements a scheme for determining the video data contents of the HP data stream based on the relative utility of the video data for VTR applications such as trick play operation.

The video transport packetizer 106 illustrated in FIG. 8(a) is particularly well suited for use with the proposed AD HDTV system because it packetizes and assigns a portion of data to a HP data channel and a portion to a SP data channel. The relative proportion of HP data to SP data in the AD HDTV system proposal is 1:4. Accordingly, over a preselected fixed time period, determined by the amount of time required to fill-up rate buffers contained within the video transport packetizer 106, which are used for sorting data into HP data and SP data, the video transport packetizer 106 assigns the highest priority codewords received from the prioritizer 104 to the HP data stream. The video transport packetizer 106 assigns the remaining data received during the same time period to the SP data stream. The data is thus divided by the packetizer 106 in as close a ratio as possible to the specified ratio of 1 packet of high priority data to 4 packets of standard priority data.

To reduce receiver and VTR data buffering requirements, the video transport packetizer 106 and multiplexer 108 organize the video and audio data packets so that the data contained in each Group of Pictures, output by the encoder 102, will be transmitted in a single time period. The single time period associated with each particular Group of Pictures is of the same or shorter length than the time period required by a receiver to display all the frames in the particular Group of Pictures. While such data synchronization is not required by the MPEG standard, such synchronization has the advantage of reducing receiver and VTR data buffering requirements in certain cases. For example, if the Group of Pictures takes up a fixed maximum amount of time to transmit, and thus comprises a corresponding fixed maximum amount of data, the VTR can be synchronized with another source for dubbing together video sequences at each Group of Pictures' boundary. This allows editing of compressed video data streams while avoiding the possibility of buffer overflow in a video decoder used to edit the data comprising a Group of Pictures. Thus, by transmitting the data contained in each Group of Pictures in a single time period of equal or shorter length than the display time period, data buffers of a predictable maximum size may be used in receivers and VTRs. Thus, by fixing the size of the buffers required to avoid data overflows, large buffers with excess data capacity need not be used to avoid the possibility of a data overflow.

As illustrated in FIG. 8(a), the video transport encoder 106 has an HP video packet output and an SP video packet output coupled to corresponding inputs of the multiplexer 108. In this manner, the multiplexer 108 is supplied with the data packets output by the video transport packetizer 106. The multiplexer 108 also receives as inputs the audio data packets output by the audio encoder 103 and the auxiliary data packets. The multiplexer 108 loads the video, audio, and auxiliary data packets into video/audio transport data packets. It also adds headers to each transport data packet indicating the type or types of data packets contained within each particular transport data packet. The size of the transport data packets will vary depending on the particular transmission system being implemented. For example, in the case of an AD HDTV compatible transmission system, each transport data packet, referred to as a data cell in the AD HDTV system proposal, has a fixed length of 148 bytes.

Generally, to assist in the identification of the various data types, the header which identifies the data type of each video data packet should be attached by the video transport packetizer 106 directly to each video data packet in a predetermined manner or format. Similarly, headers attached by the multiplexer 108 should be attached directly to each video/audio transport data packet. Alternatively, both the video packets and the transport data packets can have their contents identified solely by their position relative to a reference signal within a sequence of video or transport data packets. In such an embodiment, the header need not be directly attached, by the video transport packetizer 106 or multiplexer 108, to the associated data packet, so long as pre-determined timing of the data streams permits a VTR to locate individual video data packets from among the video/audio transport data packets and to identify the type and priority of the data within each packet, without the need for fully decoding the received data stream.

The transport encoder 109 has an HP and an SP video/audio transport data packet output coupled to corresponding inputs of the channel modulator 110. The channel modulator 110 modulates the transport data packets using a modulation method, such as quadrature amplitude modulation, which provides a modulated signal compatible with the selected transmission service, e.g., a cable service or an antenna system. Accordingly, as illustrated in FIG. 8(a), the output of the channel modulator 110 is coupled to the transmission service represented by the transmitter/antenna 112.

The prioritizer 104 of the present invention, described above in regard to the transmission circuit 100, is particularly well suited for use in systems using MPEG data compression techniques, such as the proposed AD HDTV system. However, the prioritizer 104 can also be used with other digital video systems, such as the DigiCipher system, which do not use MPEG data encoding or fully intra-coded video frames.

The prioritizer 104 implements a prioritization scheme which is optimized to assign data to a series of priority levels based on the data's utility for generating a recognizable image or portion of an image during trick play operation. In one embodiment particularly well suited for use with the proposed AD HDTV system, the prioritization scheme implemented by the prioritizer 104 provides for the recognition and assignment of the following encoded video data, listed in their order of utility to video recorder trick play operation, to different priority levels as indicated below:

| Priority Level | Subset of Encoded Video Data Assigned to the Indicated Priority Level |
|---|---|
| 1. | Video codeword headers that contain sequence and picture information for I & P frames, slice headers for I & P frames which contain the position on the screen of slice data, and starting points for DPCM coding. |
| 2. | Macroblock headers of I & P frames which contain information about either: a data block's position within a slice, quantization, the method of coding the blocks. |
| 3. | The DC coefficients of the DCT for I-frames. |
| 4. | Motion vectors for P-frames which provide enough information to predict a frame from the last I frame or P frame. |
| 5. | The dc coefficients of the DCT for P-frames which correct the predicted frame and improve image quality. |
| 6. | A percentage of the higher order DCT coefficients for I frames which can be used to improve the quality of both the I frame and the predicted frame. |
| 7. | A percentage of the higher order DCT coefficients for P frames which can be used to further improve the predicted frame quality. |
| 8. | All other data in the video codeword data stream. |

It should be noted that the above prioritization scheme is the same as the prioritization scheme implemented by a VTR, in accordance with one feature of the present invention when determining which video data to record in trick play segments for later reading and use during trick play operation.

If the prioritization of the encoded video data for VTR applications is done before packetization and transmission, and/or the particular sub-sets of data recognized by the prioritizer 104 are identified by packet headers, then the amount of work the VTR must do to identify the appropriate data for filling trick play storage locations is significantly reduced. On the other hand, without such prioritization and packetization, the VTR may be required to decode the variable length coding of the video data stream and organize the data into the priority levels using a prioritizer of its own. Accordingly, in such an embodiment the VTR must include both a decoder and prioritizer with the VTR's prioritizer being the same as, or similar to, the prioritizer 104 which was described above in regard to the transmitter.

While some of the available data, e.g. P-frame data, may not be used for trick play operation, because of the limited storage space available for trick play data, e.g. in VTRs with few heads or in the case of high playback speeds such as 9× speed, it is still desirable to assign all the data in the video data stream to a particular priority level during prioritization so that the prioritization scheme remains independent of VTR capability. In accordance with the above prioritization scheme which is implemented before data transmission, the prioritization process is independent of a receiving VTR's capabilities.

Prioritization of all the video data in the above manner prior to transmission permits each receiving VTR to allocate data to trick play storage locations depending on each VTR's own particular trick play capability without the need for additional data prioritization. For example, the receiving VTR need only record as much of the highest priority data as it can in the trick play space available on a particular tape. Accordingly, when writing data to be read during trick play operation, the VTR writes all the data from the highest priority level and then each subsequent priority level until it runs out of space on the tape for the trick play data.

While the above list describes the sub-sets of data which are recognized and prioritized by the prioritizer 104 using terms which generally relate to the AD HDTV system proposal, it is to be understood that when applying the above prioritization scheme to other systems, the term I-frames can generally be interpreted as referring to intra-frame coded data segments of a video image, P-frames can be interpreted as referring to inter-frame coded data segments of a video image, and DC-coefficients can be interpreted as referring to the average values across a luminance or chrominance block of video data. In even more general terms, the DC-coefficients of a DCT may be interpreted as corresponding to the decimated low frequency values for any block of video image data. For example, in applying the above prioritization scheme to the data stream produced by a video encoder which operates in accordance with the Digital Spectrum Compatible ("DSC") HDTV System, proposed by the Zenith and AT&T corporations, every frame of DSC data could be treated as comprising intra-coded data.

The basis for the prioritization order of the above data will be described in greater detail below with regard to a discussion of the data's utility for VTR trick play operation.

As described above, for VTR applications, it is useful for the video data to be prioritized prior to data transmission in order to reduce the decoding and prioritization burdens placed on a VTR which selects data to be recorded in specific trick play tape locations. The prioritization scheme implemented by the prioritizer 104, and a VTR in accordance with the present invention when the data is not prioritized prior to transmission, is designed to segregate the encoded video data, i.e., the video codewords, into a series of priority levels.

A subset of encoded video data is assigned to each priority level based on the data's usefulness in generating a recognizable image from a minimum amount of data during trick play operation. Use of additional data from the lower priority levels adds incrementally to the image quality during trick play mode. For example, an image formed from data assigned to priority levels 1, 2, and 3 would be of lower quality than an image formed from the data assigned to priority levels 1, 2, 3 and 4. The video data priority levels are arranged so that the data from each subsequent, i.e., lower priority data level, provides improvement in image quality when data from a subsequent priority level is used with the data from the preceding higher priority levels. Thus, the prioritization scheme seeks to optimize image quality while minimizing the amount of data used to generate the image.

The sub-set of video header data listed as being assigned to priority level 1 in the above prioritization list associated with the prioritizer 104, is essential for the decoding of a picture. Accordingly, this data is assigned to the highest possible priority level by the prioritizer 104. The sub-set of video header data listed as being assigned to priority level 2 is necessary for the decoding of large sections of a picture and is therefore assigned to the second highest priority level. However, if the image to be reproduced during trick play operation is cropped, e.g., because of data constraints, some data assigned to priority level 2 would be unnecessary as it corresponds to the cropped regions and should be assigned to a very low priority level.

The data assigned to priority level 3, the DC coefficients for I-frames, comprise a set of data from which a recognizable image can be generated. Accordingly, this data is very important to trick play operation and is assigned to a relatively high priority level which is higher than all other data except the sub-sets of header data assigned to priority levels 1 and 2. When sections of an image are cropped, the data corresponding to the cropped sections is not needed. However, data corresponding to the sections which are to be displayed will be needed during trick play. Accordingly, only the data corresponding to the cropped sections should be assigned to a low priority level.

The sub-sets of data assigned to priority levels 1, 2 and 3 of the above prioritization list provide a small set of data from which a recognizable image can be generated during trick play operation. However, the addition of the data in the data sub-sets assigned to priority levels 4–7 can greatly improve picture quality during trick play mode. For example, the addition of the data assigned to priority level 4, i.e. motion vectors for P-frames, provides a viewable P-frame during trick play operation. The use of inter-coded data only improves image quality when inter-coded images or portions of images are generated. As used in this application, the term inter-coded is intended to refer to inter-frame and/or interfield coded images. Thus, when only I-frames are displayed during trick play operation, e.g., in 9× fast forward operation, inter-coded data will not improve image quality. However, when inter-coded images such as P-frames are displayed, e.g., during 3× fast forward operation, additional inter-coded data beyond that needed to generate a low quality inter-coded image will improve image quality.

One embodiment of the present invention uses inter-frame coded data, in addition to a limited amount of intra-frame coded data, to produce images during trick play operation. The use of inter-coded data with some intra-frame coded data provides a picture of superior quality to a system which uses the same amount of purely intra-frame coded data, such as the dc-coefficients of a DCT, to produce an image during trick play operation.

The use of P-frame motion vectors and other P-frame data is of little use in generating a recognizable image unless the previous anchor frame, which could be either an I- or a P-frame, is available as a reference for the prediction information. Accordingly, P-frame motion vectors are assigned to a priority level beneath the DC coefficients of the DCT blocks for I frames, i.e., to priority level 4.

The present invention uses the DC coefficients of the DCT of an I-frame and when available, some of the low frequency coefficients of the DCT of an I-frame, to form a rough approximation of a reference I-frame. The VTR of the present invention then uses the generated reference frame and the motion vectors from the P-frame to form a fair quality P-frame which can then serve as the reference frame for generating the next P-frame. This process may be continued with new reference frames being generated from intra-coded data whenever possible, and with P-frames being generated at other times.

Accordingly, if there is enough trick play space available, it is possible to store enough data to produce a low resolution I-frame and a low resolution P-frame during trick play operation corresponding to each I- and P-frame in a group of pictures that would be displayed during normal playback operation. If trick play space is extremely limited, such as for fast playback speeds, e.g., 9× fast forward playback, then fewer frames for each group of pictures would be stored in the trick play space. For example, only enough data for low resolution I-frames corresponding to each I-frame of a group of pictures might be stored for 9× fast forward trick play operation. Another alternative would be to store a section of each I-frame, such as the top half of one frame and the bottom half of the next I-frame, and then update the portion of the screen which corresponds to the stored section. Another option is to store every N$^{th}$ I-frame and repeat the stored I-frames for several frame display times to create a recognizable picture with jerky motion. Several of these methods of selecting trick play data for storing and later playback can be combined to provide enough data to produce a series of recognizable images during trick playback operation despite the data limitations imposed by trick play operation When using motion vectors with a limited amount of data, to generate recognizable video frames as in the case of trick play operation, it is better to use a low resolution estimate of the entire anchor frame over its entire space than to than to use the same amount of data to produce full resolution spatial sections of the anchor frame. Accordingly, in one embodiment, VTRs which operate in accordance with one embodiment of the present invention use the limited amount of data in the fast scan tracks to perform a low resolution update of an entire video frame for each frame display period. This provides a time coherent frame, although of lower quality than during normal play. However, by prioritizing and using the intra-frame coded and inter-frame coded data in the above manner, it is possible to provide more time coherent images from a limited amount of data then would be possible using only the same limited amount of purely intra-frame coded data. Furthermore, the quality of the images is better than when full resolution spatial sections of anchor frames are used. The increased number of time coherent frames made possible by the above approach enhances viewing quality during trick play operation.

Since, P-frame DC DCT coefficients are of no value unless P-frame motion vectors are used, they are assigned to priority level 5 which is just subsequent to priority level 4 which contains P-frame motion vectors. The dc coefficients of the DCT for P-frames, assigned to priority level 5, are useful for correcting and thus improving the image quality of the predicted frame generated using the P-frame motion vectors assigned to priority level 4. The higher order DCT coefficients of the I-frames and P-frames, which are assigned to priority levels 6 and 7, respectively are useful in providing improved images when used with the data from the previous priority levels.

Finally, all the remaining encoded video data, e.g. B-frame data, is assigned to the lowest priority level, level 9, because it is substantially less useful in trick play operation and separating it into further priority levels is of no substantial advantage.

In another embodiment of the present invention, the prioritizer 104 implements a prioritization scheme particularly well suited for use with the proposed DigiCipher system. The prioritizer 104 implements a prioritization scheme which provides for the recognition and assignment of the following encoded video data, listed in their order of utility to VTR trick play operation, to different priority levels as indicated below:

| Priority Level | Subset of Encoded Video Data Assigned to the Indicated Priority Level |
|---|---|
| 1. | Video codeword headers that contain sequence and picture information including the picture and macroblock headers for video frames. |
| 2. | Superblock headers that contain the superblock positions for intra-refresh superblocks. |
| 3. | The DC coefficients of the intra-coded sections of an image including the intra-refresh blocks. |
| 4. | Low frequency coefficients for intra-coded sections of an image. |
| 5. | If available, additional time-coherent intra-coded DC coefficients for sections of an image that are sent as inter-coded sections of an image for normal play. |
| 6. | Motion vectors for inter-coded image sections. |
| 7. | DC coefficients for inter-coded image sections. |
| 8. | All other data in the video codeword data stream. |

The above prioritization scheme, which is particularly well suited for use with the proposed DigiCipher system, is similar to the prioritization scheme that is optimized for use with the AD HDTV system in that headers and DC coefficients of DCTs of intra-coded sections are assigned to the highest priority levels.

However, the prioritization schemes differ on the data assigned to the higher number priority levels indicative of the data's decreasing utility for trick play operation due to the different types of data sent in an AD HDTV data stream as opposed to a DigiCipher data stream. For example, an ADTV codeword data stream includes inter-coded data including distance 3 motion vectors, which are motion vectors calculated over the range of 3 frames, useful for, e.g., generating images during 3× fast forward trick play operation. In the proposed prioritization scheme intended for use with AD HDTV, such data would be assigned to the fourth priority level. A DigiCipher data stream includes only distance 1 motion vectors which are difficult to use to generate images during fast forward trick play operation and which can provide images of only questionable quality. Accordingly, in the above prioritization scheme which is intended for use with DigiCipher codeword data streams, all intra-coded data is assigned to a fourth priority level and is considered to be of greater importance than any inter-coded data. Such inter-coded data, in the case of a DigiCipher data stream, is therefore assigned to a lower number priority level than any inter-coded data in the codeword data stream.

The data assigned to the fifth priority level in accordance with the above prioritization scheme, i.e., time coherent intra-coded DC coefficients for sections of an image which are sent as inter-coded data for normal play, are special trick play data which may be transmitted in addition to the normal play data. Transmission of such temporally coherent image-section data requires fewer bits than would be required to send trick play motion vectors. Furthermore, such intra-coded temporally coherent image sections may be used to generate images of better quality than are possible using only normal play data found in a DigiCipher data stream. Accordingly, when present in a DigiCipher codeword data stream, such data is assigned to a priority level that is higher, i.e., which has a lower number data level, than inter-coded data found in the DigiCipher data stream.

Prioritizing the data normally found in a digital video data stream in the above manner, and then having a VTR select the high priority data for recording in trick play segments, is one approach to the problem of obtaining useful data for VTR trick play operation. Another approach is to transmit trick play data in addition to normal play data. Such an approach could involve the transmission of the trick play data on the same data channel as the normal play data or employ a separate low data rate channel for transmitting trick play data for VTR trick play operation.

Different embodiments of this idea could require approximately 1 Mbits/sec. of data if, e.g., dc coefficients for the intra-coded data of a HDTV signal were sent redundantly. Another useful example of additional information that could be transmitted would be trick-play motion vectors, computed by the video encoder 102, that would span an N number of video frames for VTR use during trick play at N times the normal speed. Such trick-play motion vectors computed by the video encoder 102 are much more accurate for trick play operation than are motion vectors that a VTR could produce by interpolation of the "normal" motion vectors found in the normal play data stream.

The transmission of trick play data along with the normal play data provides the greatest improvement in trick play image quality in systems, such as the DigiCipher system, which do not provide for fully intra-frame coded frames as part of the normal data stream. By providing additional trick play data in such cases, the problem of obtaining trick play data from the normal data stream is reduced or eliminated altogether.

In one embodiment of the transmitter 100 of the present invention, the video encoder 102 computes trick play motion vectors in addition to the normal motion vectors to support improved VTR performance in, e.g., 3× fast forward trick play operation. The encoder 102 is also capable of computing trick play motion vectors for reverse and other trick play speeds. In addition to trick play motion vectors or instead of generating trick play motion vectors, the encoder 102 may generate an intra-coded image for every N frames of normal play inter-coded images. Such trick play intra-coded images, which are particularly useful for generating images during Nx trick playback operation, may be represented by data comprising the low resolution coefficients for every $N^{th}$ video image in the series of normal play images. The trick play motion vectors and trick play intra-coded images generated by the encoder 102 are output by the encoder 102, packetized, and identified with headers along with the rest of the video data transmitted by the transmitter 100.

It is estimated that approximately 0.4 Mbits/sec of data must be transmitted, in addition to the normal play HDTV data, to support one HDTV VTR trick play speed with trick play motion vectors or the transmission of complete low resolution time coherent intra-frame images. However this data rate can be reduced through various data compression techniques such as additional variable length encoding.

While transmission data rate limitations affect the amount of trick play motion vectors and other trick play data that can be supplied to a VTR in addition to normal play data, the pre-recording of tapes avoids such limitations of using only normal play encoded data. By pre-recording tapes, data from a video encoder can be recorded without the use of a data transmission service and the problems associated with obtaining trick play data from the normal play data that is transmitted via such a service. Accordingly, in such a case, all the motion vectors used during fast scan and all the other trick play data may be generated by an encoder specifically for the trick play modes the pre-recorded tape is intended to support. Such an embodiment permits higher quality trick play data to be produced and pre-recorded in the trick play tape segments than is obtainable from the encoded normal play data stream. This is because the trick play data is encoded specifically for trick play operation unlike the case where trick play data is derived from a data stream which is initially encoded only for normal playback operation and for transmission via a data channel having a limited data rate. A VTR playing back the trick play data from the pre-recorded tape could operate in the same manner as during normal trick play operation making such pre-recorded tapes fully compatible with other VTR tapes containing fast scan tracks. However, improved picture quality would result from the higher quality trick-play data that was pre-recorded in the trick-play segments of the pre-recorded tape.

Figure 9B:
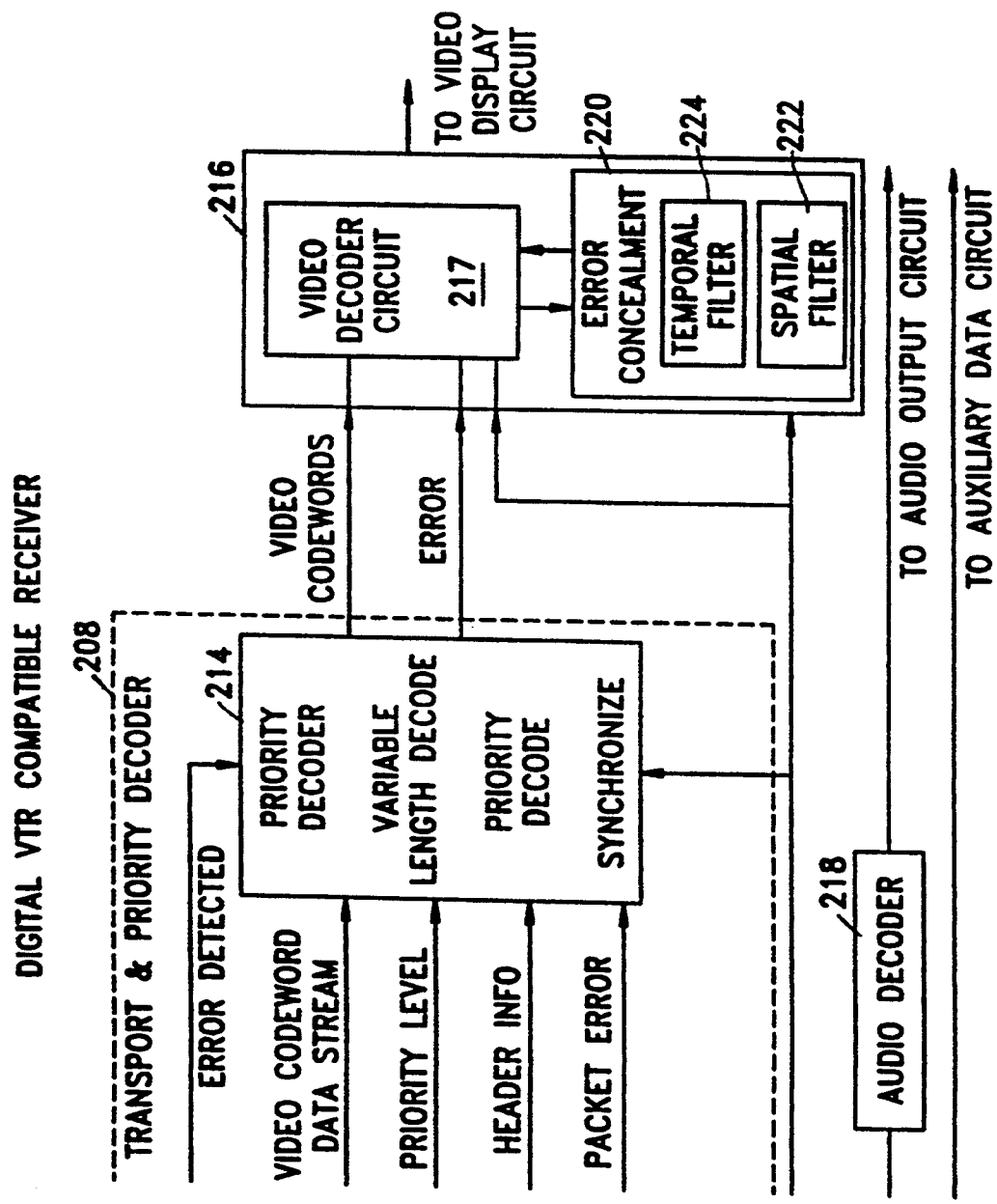
FIG. 9 is a block diagram of a circuit for a digital VTR compatible receiver in accordance with one embodiment of the present invention.

Referring now to FIG. 9, there is illustrated a circuit for a digital VTR compatible television receiver 200, capable of supporting VTR trick play operation, in accordance with the present invention.

For the receiver 200 to support, i.e. be capable of displaying images from the data generated by a VTR during trick mode operation, the receiver 200 must exchange several "handshaking" signals with the VTR. These handshaking signals may be supplied to the receiver 200 via a separate command line between the VTR and the receiver. Alternatively, the VTR may incorporate such handshaking signals directly into the stream of video/audio data supplied to the receiver 200. In such an embodiment, the receiver 200 would obtain the VTR handshaking signals by monitoring the contents of the data stream and detecting the signals.

An important function of the VTR handshaking signals is to notify the receiver 200 that the VTR is operating in trick play mode. The handshaking signals are also used to cause the receiver to perform special functions, e.g., specific error correction and error concealment operations, during trick play operation. For example, the handshaking signals can be used to turn off the normal error concealment operations in the receiver 200 during trick play operation so that the receiver 200 does not try to generate missing video data during trick play operation using its standard error concealment techniques. The handshaking signals can also be used to turn on special error concealment functions in the receiver 200 for trick play operation. Such special error concealment functions could be similar to normal error concealment, but would apply over temporal and spatial ranges appropriate to trick play operation.

The receiver 200 comprises an antenna 202 coupled to an input terminal 201 a tuner/demodulator/trellis decoder/de-interleaver/R-S decoder circuit referred to as a tuner module 204. The tuner module 204 receives a radio frequency television signal from the antenna 202 or another source such as a cable transmission service or a VTR via, e.g., the input terminal 201, and performs filtering, demodulating, trellis decoding, de-interleaving and Reed-Solomon decoding on the received signal to generate a video/audio transport data packet stream. However, inclusion of the R-S decoder in the tuner module 204 is not necessary and is therefore omitted in one embodiment of the present invention.

In the embodiment wherein the R-S decoder is not included in the tuner module 204, the VTR receives the data stream prior to Reed-Solomon decoding. The data is then recorded without Reed-Solomon decoding which requires approximately 20% more tape capacity than recording the data after Reed-Solomon decoding has been preformed. In such an embodiment, a slight improvement in the detection and correction of data errors which occur during recording is achieved and, more significantly, the need to include a Reed-Solomon decoder chip in the tuner module which is coupled to or included in the VTR is avoided.

Forward error correction is performed by the tuner module 204 to correct as many transmission errors as possible. The tuner module also generates an error signal which indicates that an uncorrectable error was detected while generating the transport data packets. The tuner module 204 has a video/audio data packet output and an error detected signal output which are coupled to corresponding inputs of a transport and priority decoder module 208 and a digital VTR port 206. In this manner, the transport data packet stream and the error detected signal output by the tuner module 204 are supplied to the VTR port 206 and the transport priority decoder 208.

Alternatively, a packet error may be indicated by an appropriate error signal inserted into the transport data stream with the tuner module 204 outputting a single transport data packet stream, including error detected signals.

The VTR port 206 serves as a bi-directional interface between a digital VTR and the receiver 200. Via the port 206, the video/audio transport data packet stream and the error detected signal output by the tuner module 204 are supplied to the VTR. Thus, the VTR can record the video and audio signals received by the receiver 200.

The port 206 has a video/audio data packet output terminal which is coupled to a VTR transport data packet input terminal of the transport and priority decoder module 208. A VCR command terminal of the VTR port is also coupled to a corresponding terminal of the decoder module 208 and an error concealment circuit 220. Thus, during playback operation, the VTR supplies transport data packets and command, e.g., handshaking, signals to the receiver 200 via the port 206. The VTR can receive acknowledgement and other signals from the receiver's transport and priority decoder 208 over the same command line which supplies the VTR commands to the transport and priority decoder 208. The VTR command signals may include error signals or commands to the receiver 200 to disable normal error correction operation because the VTR is operating in trick play mode.

The receiver's transport and priority decoder 208 comprises a demultiplexer 210, a video transport depacketizer 212 and a priority decoder module 214. The video transport depacketizer 212 and the priority decoder 214 each have a VTR command signal input coupled to the transport and priority decoder's VTR command signal input terminal. In this manner, the video transport packetizer 212 and the priority decoder 214 receive both error and command signals from the VTR. One function of the priority decoder 214 is to restore the correct order to the codewords after they are removed from the transport data packets so that they can be decoded by the video decoder module 216. This reordering is possible using stored information contained within the priority decoder 214 on the legal order for different priority codewords.

The tuner module transport data packet input of the transport and priority decoder 208 is coupled to a corresponding tuner module transport data packet input of the demultiplexer 210. The error detected input of the decoder 208 is coupled to a corresponding input of the demultiplexer 210, the video transport depacketizer 212 and the priority decoder 214 so that they each receive the error detected signal from the tuner module 204. The demultiplexer 210 also has a VTR transport data packet input coupled to the transport and priority decoder module's VTR transport data packet input.

Via its tuner module transport data packet input and its VTR data packet input, the demultiplexer 210 receives a video/audio transport data packet stream from both the receiver's tuner module 204 and the VTR. A broadcast/VTR input of the demultiplexer is coupled to a select switch. By operating the select switch, it is possible to select between the data stream from the tuner module 204, used for normal receiver operation, and the data stream from the VTR, used during VTR playback operation.

The demultiplexer 210 receives the selected tuner or VTR supplied video/audio transport data packet stream, strips away the header information added by the transmitter's multiplexer 108, and uses the header information to demultiplex the transport data packet stream into a video data packet stream, an audio data packet stream and an auxiliary data packet stream.

The demultiplexer 210 has an audio packet output which is coupled to a corresponding input of an audio decoder 218.

The audio decoder 218 decodes the audio data packets received from the demultiplexer 210 and outputs an audio signal which is supplied to an audio output circuit. Similarly, the demultiplexer 210 has an auxiliary data output which is supplied to an auxiliary data circuit of the receiver 200.

A video packet output of the demultiplexer is coupled to an input of the video transport depacketizer 212. The transport depacketizer 212 receives the video packets output by the demultiplexer 210, the error detected signal output by the tuner module 204 and the VTR command signal output by the VTR. From the VTR command signal, the video transport depacketizer 212 determines if a data packet stream being received from the VTR is a normal play data packet stream which could be depacketized in the same manner as a tuner supplied data packet stream, or whether the VTR is supplying a trick play data packet stream which may require special depacketizing and/or error handling.

The video transport depacketizer 208 removes the payload data from the video packets and decodes the packet headers added by the transmitter's video transport packetizer 106. The video transport depacketizer 208 generates a video codeword data stream, i.e., a stream of transport packet payload data, from the video packet stream. The video transport depacketizer 212 also generates a priority level signal which indicates the assigned priority level of the data in the video codeword data stream, a header information signal which contains information necessary for synchronization such as the entry point, and entry ID data. A packet error signal is used to flag any errors detected during the depacketization process. The video codewords output by the video transport depacketizer 208 may include check bits for additional error detection purposes. A video codeword data stream output, a priority level signal output, a header information signal output, and a packet error signal output of the video transport depacketizer 212 are coupled to corresponding inputs of the priority decoder 214.

The priority decoder 214 receives the VTR command signal output by the VTR and is therefore aware of when it should perform any special decoding or error handling that might be necessary as a result of trick play data being supplied by the VTR. The priority decoder also receives the error detected signal output by the tuner module 204, and the packet error signal output by the video transport depacketizer 212. If any of the signals received by the priority decoder 214 indicate that an error was detected or if the priority decoder 214 detects an error, the priority decoder 214 will perform an error handling procedure and assert an error signal to inform a video decoder module 216 of any uncorrectable errors.

The priority decoder 214 uses the priority level signal, the header information signal, and the other received signals, to perform variable length decoding of the data received from the video transport depacketizer 208. The priority decoder 214 combines the data from various priority levels into a data stream of codewords which the video decoder module 216 can process. While combining the data to form the codeword data stream, the priority decoder 214 maintains data synchronization between the various priority levels. The priority decoder 214 handles the problem of missing or erroneous data by instructing the video decoder module 216 to perform error concealment. VTR commands may also instruct the priority decoder 214 on how to combine different priority data for trick play operation. Accordingly, the priority decoder 214 generates a video codeword data stream which can be understood by the video decoder module 216.

A video codeword data stream output and an error signal output of the priority decoder 214 are coupled to corresponding inputs of the video decoder module 216. The video decoder module 216 also receives the VTR command signal output by the VTR. Thus, the VTR may instruct the video decoder module 216 to do special processing, e.g., during trick play operation. The video decoder module 216 comprises a video decoder circuit 217 and an error concealment circuit 220 which are both coupled to the inputs of the video decoder module 216. Video data and error signals are passed between the video decoder circuit 217 and the error concealment circuit 220 which are coupled together via a pair of data lines. The error concealment circuit 200 and the decoder circuit 217 receive the VTR command signal output by the VTR.

The error concealment circuit 220 performs error concealment operations on the video data during both normal play and trick play operation. For example, in the normal play case, if the video decoder circuit 217 detects that entire frames were missing the error concealment circuit 220 would attempt to conceal this by, for instance, repeating the last good frame, until an I-frame was received. Accordingly, in the normal play case, the receiver 200 would display some image at each frame display time.

In trick play, on the other hand, missing frames are expected. For example, during 3× trick play operation, all I- and P-frames may be received while B-frames might not be received at all. During trick play operation, it is undesirable for the error concealment circuit 220 to fill in something to replace the B-frames which are not received. It is also undesirable for the decoder module 217 to wait until the next I-frame to recover since, during trick play operation, usable P-frames may be received prior to the next I-frame.

Accordingly, when a VTR command indicating that the VTR is operating in trick play mode is received or when the error concealment circuit 220 or the decoder circuit 217 detects that the VTR is operating in trick play mode by, e.g., monitoring the received video data for missing frames indicative of VTR trick play operation, normal play error concealment operation of the error concealment circuit 220 is disabled and trick play error concealment operation is enabled.

Trick play error concealment operation may be enabled, e.g., during 9× trick playback VTR operation when only information for every $N^{th}$ I-frame is received. For example, during 9× trick play operation only every other I-frame may be received. In such a case, it is desirable to display a frame for every missing I-frame so that the missing I-frame can be concealed by an estimation formed by temporally filtering the existing I-frame using the frames which are received in addition to the I-frame, to produce an I-frame which will be displayed in place of the missing I-frame. For example, at 9× trick play speed this may require generating an I-frame to replace a missing 9th frame in an 18 frame series of images comprising two AD HDTV Groups of Pictures which would normally include 2 I-frames.

Both normal play and trick play error concealment operations may include the use of temporal and/or spatial filters to conceal missing portions of a frame or completely missing frames.

The error concealment circuit 220 comprises a spatial filter, e.g., a 2-dimensional spatial filter 222, a temporal filter 224, and processing logic.

While the error concealment circuit 220 is illustrated as being part of the video decoder module 216, the error concealment circuit 220 and the video decoder circuit 217 need not be implemented as a single module.

During trick play operation, the error concealment circuit 220 may use the spatial filter 222 to perform spatial filtering on the video data supplied to it by the video decoder circuit 217. Such filtering reduces the "blockiness" in the video image that results from using primarily dc coefficients to generate an image. The temporal filter 224 may be used in conjunction with, or independently of, the spatial filter 222 to filter the video data from the decoder circuit 217 in a manner that provides improvement in image quality during trick play operation.

The error concealment circuit's processing logic provides further error concealment during trick play operation by performing interpolation or extrapolation of motion vectors as appropriate for the particular trick playback speed being implemented. For example, during trick play operation the error concealment circuit 220 could sum the motion vectors, supplied by the VTR via the video decoder circuit 217, over the number of frames appropriate to the trick play speed-up ratio. Alternatively, the error concealment circuit 220 can multiply the range of the motion vector for one frame to cover the extend range to the next displayed image frame, or segment of a frame, at the selected trick play speed-up ratio. It should be noted that such motion vector processing to generate trick play motion vectors is unnecessary where the transmitter 100 or the VTR already generated trick play motion vectors and the VTR supplies these trick play motion vectors to the receiver 200.

The error concealment circuit 220 accepts commands from the VTR which instruct the error concealment circuit 220 on how to perform error concealment during trick play operation. For example, the VTR may instruct frame skipping during fast forward or the repetition of blocks of data from previous frames to conceal missing data. The error concealment circuit 220 supplies the filtered and processed video data, including trick play motion vectors, to the video decoder circuit 217 for use in generating the video decoder's video output signal.

The video decoder circuit 217 decodes the codeword data stream received from the priority decoder 214 and uses the error concealment signals received from the error concealment circuit 220 to correct for errors or distortions in each video frame.

The video decoder circuit 217 outputs a video signal, through a video decoder module output which is adapted for coupling to a video display circuit. The display circuit converts the video signal into a video image which can be viewed, e.g., on a cathode ray tube or a liquid crystal display device.

Figure 10A:
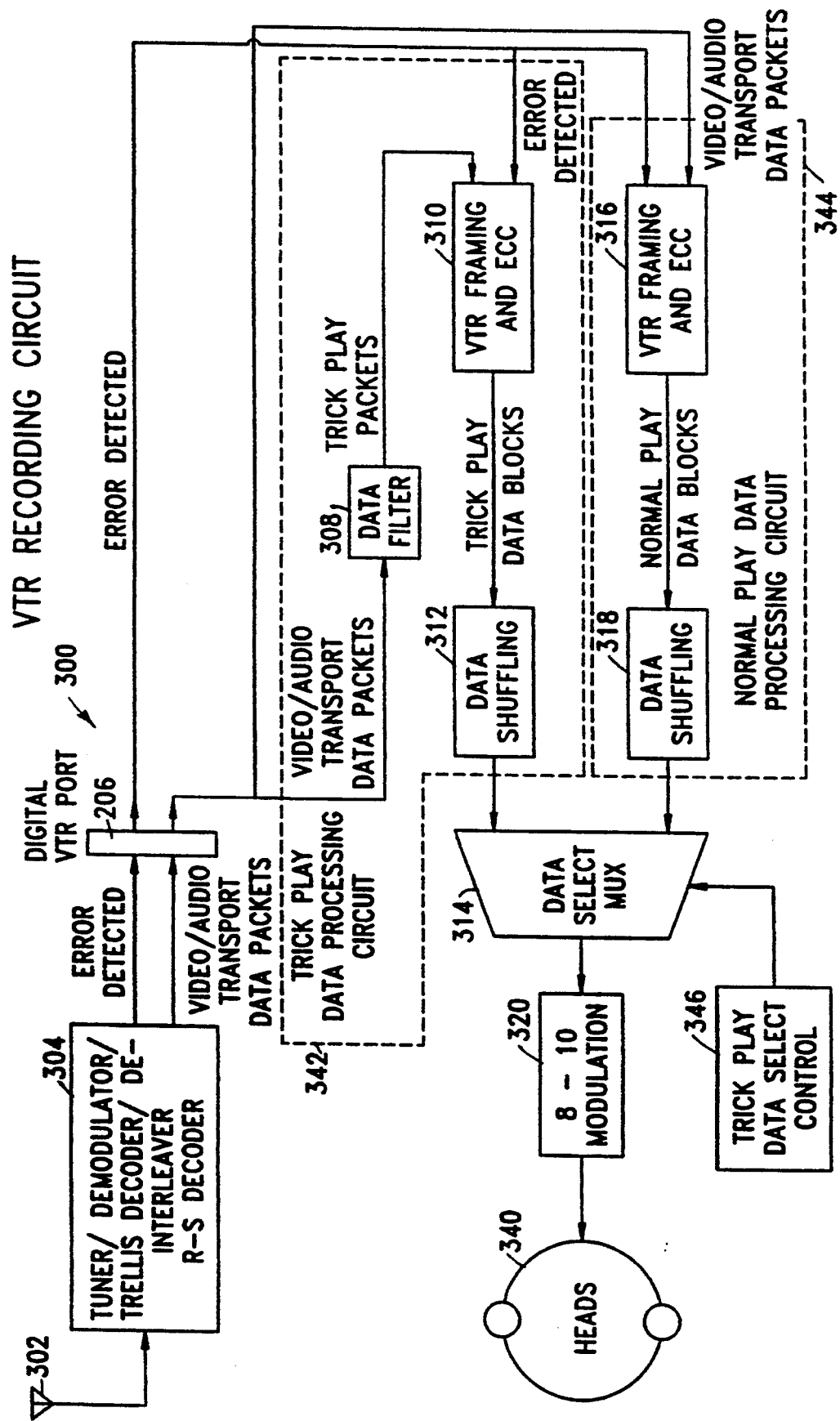
FIG. 10(a), is a block diagram of a VTR recording circuit in accordance with one embodiment of the present invention.

Referring now to FIG. 10, there is illustrated a VTR recording circuit 300 according to one embodiment of the present invention. The VTR recording circuit 300 comprises a trick play data select control circuit 346 and a set of recording heads 340. The trick play data select control circuit 346 monitors the position of the heads relative to individual segments of the tape track and determines, using a map or other stored data indicating the type and placement of fast scan tracks and or multispeed playback tracks supported by a particular VTR, when the heads of the VTR are over a trick play tape segment into which trick play data is to be placed. When the heads are positioned over such a trick play segment, the trick play data select signal asserts a select signal which causes trick play data to be written into the trick play tape segment as will be described below.

The VTR recording circuit 300 supports the recording of trick play data in specific trick play tape segments. The trick play data may comprise a subset of the normal play data, a copy of a subset of the normal play data, or it may comprise data which are not part of the normal play data stream, e.g., trick play motion vectors.

When a subset of the normal play data is being used as trick play data, the trick play data may be read back and used during both normal play and trick play VTR operation, in such a case, it may be said that the subset of normal play data constitutes dual purpose data in that the data is used in both trick play and normal play operation. Accordingly, in such a case, the data segments into which the dual purpose data is written serve as both trick play segments and normal play segments. By recording subsets of the normal play data so that it can be read and used during both normal and trick play operation, tape storage capability is maximized.

As described above, during trick play, the VTR's heads trace a different path over the tape than during normal playback operation. During normal playback operation, the VTR's heads trace over a single normal play track with each pass of a head across the width of the tape. However, during trick play operation, the heads may pass over segments of several normal play tracks during each pass of a head across the width of the tape because of the difference in tape speed and/or direction of tape motion. Accordingly, during trick play operation it is often the case that the heads will not pass over the full area of the normal play tape tracks. As described above, when data is encoded using interframe coding and then recorded, not necessarily in the same sequence in which the data is to be displayed, it becomes difficult to generate recognizable images from the incomplete pieces of video data read by a VTR during trick play operation. This situation results from the lack of available reference information, i.e. intracoded frame information, that can result from failing to read all the recorded intra-frame coded data.

The amount of trick play data that can be read from a given length of tape during trick play operation is only a fraction of the amount of data that can be read from the same length of tape during normal play. As described above, the reduced data recovery rate in trick play operation is a direct function of the decrease in the overall percentage of tape area covered by the heads during trick play operation. As tape speed increases the percentage of the tape's area that the heads cover decreases proportionately. Accordingly, during 9× fast forward playback, the amount of data which can be read for a given track length is approximately $1/9^{th}$ the amount of data that can be read during normal playback operation, and approximately $\frac{1}{3}^{rd}$ the amount of data that can be read from the same length of track using the same number of heads at, e.g., 3× trick play operation.

In one embodiment of the present invention, the VTR recording circuit 300 records enough selected trick play data in each trick play segment so that a recognizable image or portion of an image can be produced from the data recorded in each particular trick play segment. In addition, these trick play segments are arranged on the tape so that enough data can be read from the trick play segments at several tape speeds to generate an acceptable number of recognizable images or portions of images during trick play operation at the various playback speeds. Trick play segments which are arranged in accordance with this embodiment form what is refered to as a multi-speed playback track.

In another embodiment of the present invention, the VTR recording circuit 300 records trick play data in trick play segments which are arranged for optimal recovery of trick play data during specific trick play speeds and directions of operation, e.g., at 9× fast forward trick play operation. Trick play segments arranged in accordance with this embodiment of the present invention form fast scan tracks.

In yet another embodiment of the present invention, the VTR recording circuit 300, combines the above first two approaches to record selected trick play data in trick play segments located on a tape so that a sufficient amount of trick play data, to produce recognizable images, is read at several speeds of trick play operation, and so that an optimum amount of trick play data can be read at pre-selected trick play speeds and directions. In this embodiment, trick play segments are arranged on a tape to form fast scan tracks and one or more multi-speed playback tracks.

Generally, as data is retrieved from the tape during trick play operation small parts of an entire frame are decoded. It is these decodable portions of a frame, i.e., portions of a picture or image, that are recorded in the trick play segments. In the case of AD HDTV, the smallest block of data that can be fully decoded is a slice. If the start of a slice, i.e., the slice header is retrieved, the data for that slice can be decoded. A partial slice can be decoded for data continuous from the start of the slice. If enough data is recovered to decode an entire slice then the portion of the image which, in the case of AD HDTV, comprises a long horizontal region of 16 pixels high by 176 pixels wide will be generated and placed into a frame buffer for displaying at the location on the screen which corresponds to the address of the slice.

The slices which may be stored in the trick play segments need not correspond to contiguous areas on the screen and data for all regions of each individual frame need not be stored in the trick play segments. As will be described below, error concealment may be used to conceal missing sections or areas of a frame. For example, to conceal a missing section the data for the missing section may be repeated from the previous frame. Thus, at the start of each frame display time, the frame buffer may contain newly decoded data recently read from the tape and possibly repeated data from the previous frame which was just displayed.

In the case of a multi-speed playback track, the data stored in the trick play segments may comprise scattered slices of video data corresponding to generally scattered areas of the screen. Each trick play segment may not contain enough data to generate an entire frame. Thus, the resulting image from data read from a multi-speed playback track may include many areas of the image which are from previous frames and some which are from the most recently read and decoded trick play data blocks. Over a series of frames the old data may span back many frames. Accordingly, the resulting image sequence may not have a temporally coherent frame, i.e., the frame being displayed may not be made up of data which belongs only to that frame. Thus, an image generated from a multi-speed playback track may include disjointed parts of frames from different points in time joined together to form a complete image. In some cases, the slices of such a trick play image may be of full resolution or nearly full resolution. Despite the lack of temporal coherency and low image quality, the generated image during trick play operation is usually recognizable.

In the case of a fast scan track, in one embodiment, a set of data sufficient to generate a complete frame, is recorded in the plurality of trick play segments which comprise each fast scan track. During trick playback operation the data in each fast scan track may be read and decoded to generate a complete image. To remain within the data constraints imposed by the data storage capability of a fast scan track, the resolution of an image may have to be reduced for storing in a fast scan track. Controlled sectioning of a frame may be used if a fast scan track does not have sufficient data capability to support the storing of full images in the fast scan track.

For example, large portions of a frame, e.g., the top or bottom half, can be stored in fast scan tracks in a temporally coherent manner with the size of the temporally coherent contiguous sections of a frame being an important factor in determining image quality. In other embodiments, the data necessary to generate a complete frame can be recorded in the trick play segments of several fast scan tracks or the data necessary to generate a recognizable portion of an image can be recorded in one or more trick play segments of a fast scan track.

Figure 12A:
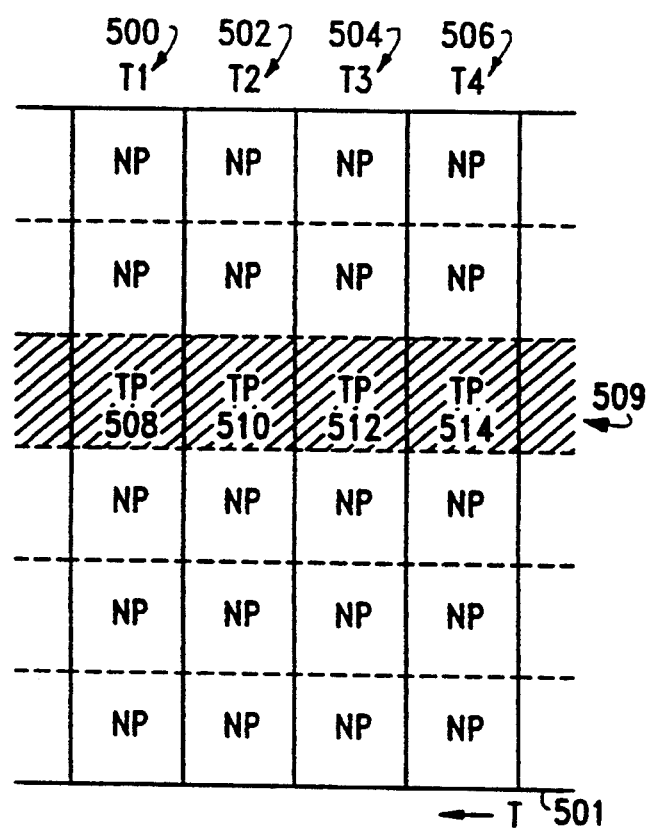
FIG. 12(a) illustrates a portion of a tape containing a plurality of trick play tape segments arranged to form a multi-speed playback track in accordance with the present invention.

Referring now to FIG. 12(a), there is illustrated a portion of a magnetic tape 501. Tracks T1 500, T2 502, T3 504 and T4 506 are illustrated as being perpendicular to the length of the tape 501, however, it is to be understood that these tracks are actually on a diagonal as described previously with regard to normal play tape tracks. In accordance with one embodiment of the present invention, the VTR recording circuit 300 records sufficient data to generate a recognizable image into each trick play tape segment. It then records the trick play segments in such a manner that the geometric arrangement, formed by the trick play segments of the tape, insures that at least some of the data in the trick play segments will be read during VTR trick play operation. Such an arrangement insures that a sufficient amount of trick play data will be read to produce at least a minimal series of trick play images or portions of images, over a wide range of playback speeds regardless of the direction of tape motion.

One way for the VTR to achieve such a geometric arrangement of trick play segments on a tape is to position a series of contiguous or near contiguous trick play segments parallel to the length of the tape. Such an arrangement of trick play segments is illustrated in FIG. 12(a) wherein trick play segments (TP) 508, 510, 512, 514 are illustrated as being located contiguous to one another, forming a series of trick play segments 508, 510, 512, 514 that runs parallel to the length of the tape. Normal play segments, indicated by the letter NP in FIG. 12(a), may be located in the area not used by the trick play segments 508, 510, 512, 514. By recording trick play data in trick play segments arranged in such a manner, i.e., parallel to the length of the tape, a multi-speed playback track 509 is created down the length of the tape 501. The shaded region in FIG. 12(a), comprising trick play segments 508, 510, 512, 514 forms such a multi-speed playback track 509. While the multi-speed playback track can be recorded at any position relative to the tape's width, one suitable position is in the center of the tape where tape contact with the VTR's heads is the most uniform and thus optimum data recording and reading is possible.

When trick play blocks are arranged in such a manner to form a multi-speed playback track, the playback heads of a VTR will always pass over some of the trick play blocks recorded in the trick play segments 508, 510, 512, 514 during trick play operation each time the heads traverse the width of the tape 501. Accordingly, as the heads rotate during trick play operation, they are guaranteed to pass over some trick play segments which contain enough trick play data to generate a recognizable image of portion of an image, regardless of the speed or direction of trick play operation. From the data in the trick play segments which are read, the VTR will be able to produce at least some recognizable images or portions of images regardless of the trick play speed or direction of playback operation.

Figure 12B:
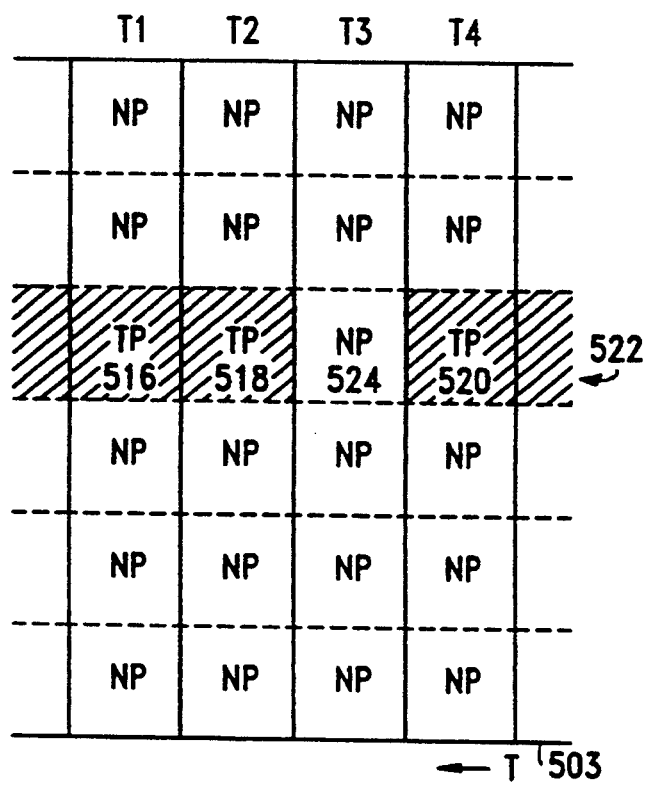
FIG. 12(b) illustrates a portion of a tape containing a plurality of trick play tape segments arranged to form a multi-speed playback track in accordance with one embodiment of the present invention.
Figure 12C:
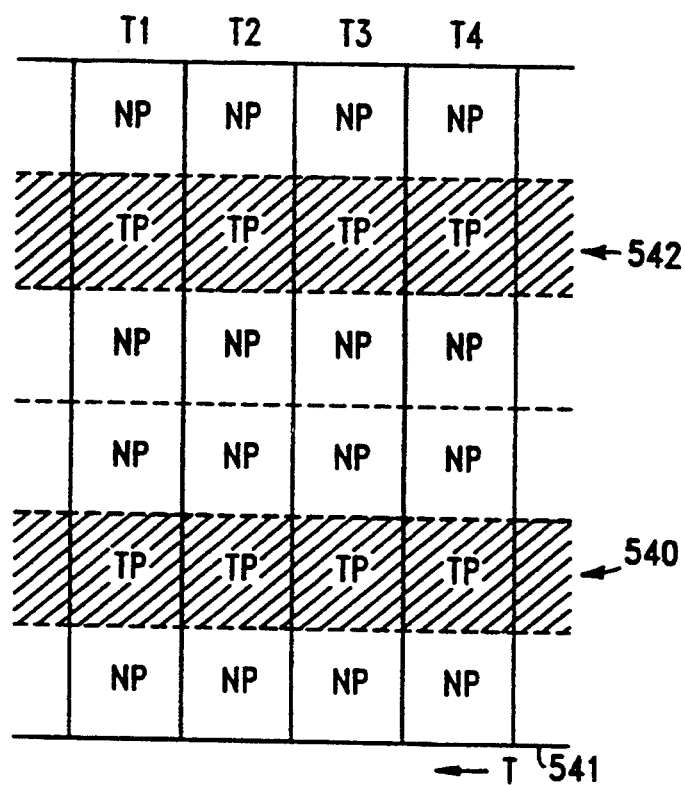
FIG. 12(c) illustrates a portion of a tape including a plurality of multi-speed playback tracks in accordance with one embodiment of the present invention.
Figure 12D:
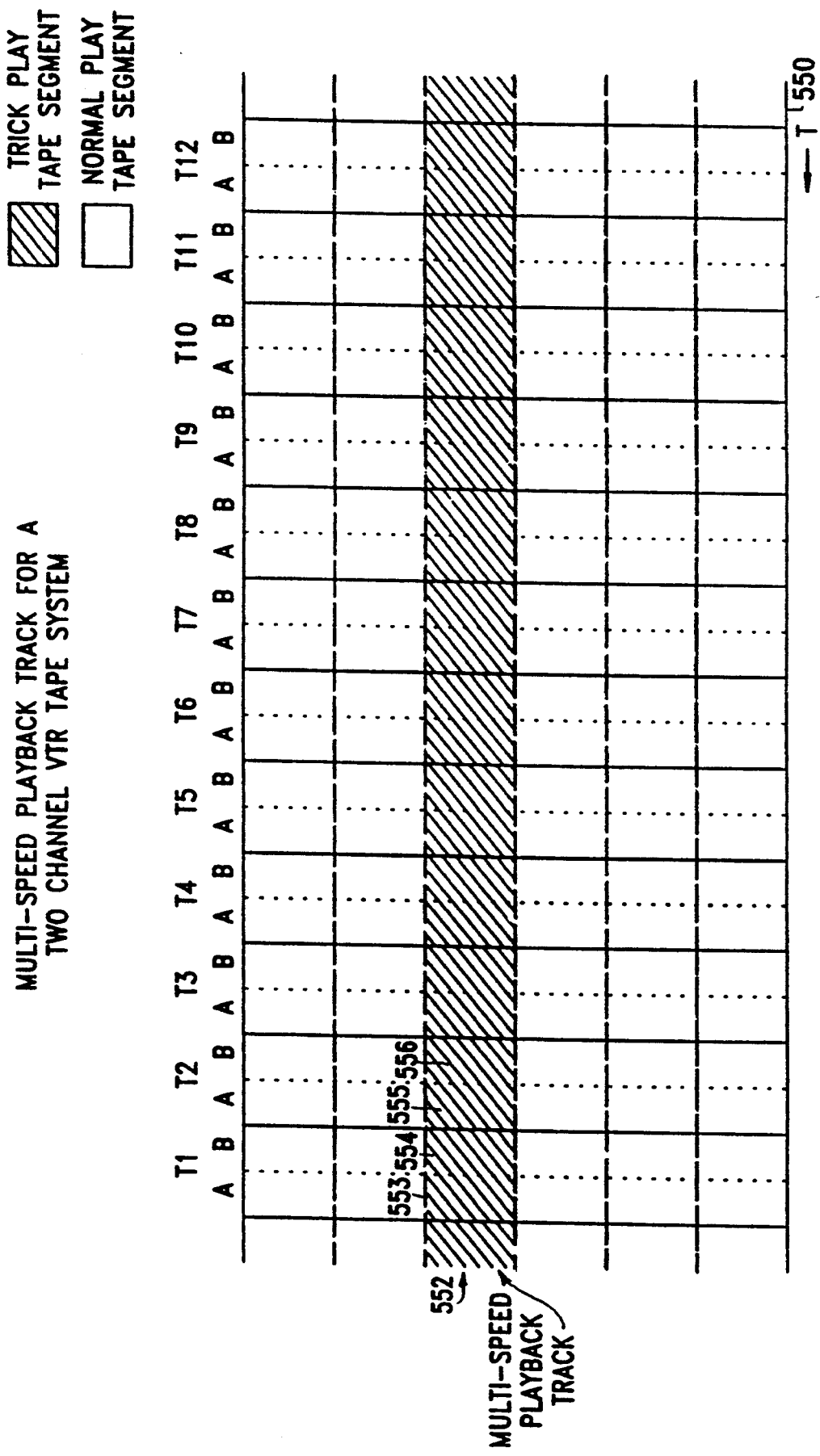
FIG. 12(d) illustrates a portion of a tape including a multi-speed playback track arrangement which is implemented for a VTR system using two data channels per track.

Various additional embodiments of such a multi-speed playback track arrangement are illustrated in FIGS. 12(b) through 12(d).

As illustrated in FIG. 12(b) the multi-speed playback track 522 may contain some non-trick play segments, e.g., normal play segment 524. As illustrated, the trick play segments on tape 503 need not be completely contiguous to form an acceptable multi-speed playback track 522. However, the number of discontinuities in the fast scan track 522 should be kept low enough that the number of trick play segments 516, 518, 520, that will be read during trick play operation, is sufficient to maintain an acceptable display rate of trick play images over the range of trick play speeds implemented by a VTR. Accordingly, because the number of trick play segments for a given capacity of tape that are read during relatively low fast forward and reverse speeds of trick play operation is greater than at higher speeds of trick play operation, the amount of discontinuity in the location of trick play segments which form a multi-speed playback track intended to support only low fast forward and reverse speeds, can be greater than the amount of discontinuity in a multi-speed playback track intended to support both high and low speed fast forward and reverse playback operations.

As illustrated in FIG. 12(c), a plurality of multi-speed playback tracks 540, 542 may be recorded on a single tape 541. As illustrated in FIG. 12(c) trick play segments comprising each of the multi-speed playback tracks 542, 540 are recorded parallel to the length of the tape as in the case of a tape with a single multi-speed playback track.

In such an embodiment, the use of multiple multi-speed playback tracks 540, 542 results in an increase in the number of trick play segments which will be read during trick play operation. However, as the number of multi-speed tracks and thus trick play segments is increased for a given tape area, the amount of space available for normal play data decreases resulting in increased tape area requirements. By using dual purpose data blocks, i.e. blocks of data which are used during normal play and trick play operation, the additional tape burdens imposed by increased numbers of trick play data blocks can be minimized.

As described above, two channel VTR systems are capable of handling higher data rates than single channel systems because two heads read data simultaneously from the tape. Accordingly, VTR systems which support two data channels are particularly well suited for handling the higher data rates required by the various proposed HDTV systems.

FIG. 12(d) illustrates a multi-speed playback track arrangement which is implemented for a VTR system having two data channels per track. As illustrated in FIG. 12(d), a tape 550 comprises a series of normal play tracks T1 through T12. As illustrated each track T1 through T12 comprises a first and second channel, channel A and channel B, respectively. A multi-speed playback track 552, indicated by the shaded region, is located near the center of the tape and runs parallel to the length of the tape 550. Normal play tape segments are located above and below the trick play tape segments comprising the multi-speed playback track 552. In such a two-channel system, each data channel of a tape track comprises a series of tape segments. As with segments of an ordinary track, these segments can be either fast scan or normal play segments. Accordingly, as illustrated, the multi-speed playback track 552 comprises a series of contiguous or near contiguous trick play segments, e.g. trick play segments 553, 554, 555, 556 belonging to each data channel of each track, the contiguous trick play segments being arranged parallel to the length of the tape 550.

In such an embodiment, the trick play data written into the trick play segments of each channel of a particular track may be selected to compliment the data in the other trick play segments of the other channel. For example, while it may be possible to record sufficient trick play data in each trick play segment 553, 554 of track 1 to produce, e.g., a very low quality image, it may be desirable to select and record data in each of the segments 553, 554 so a low quality image can be reproduced from either segment alone or a higher quality image can be produced when the data in both segments of a particular track are read during trick play. In one embodiment of the present invention, the VTR recording circuit 300 records multiple copies of the same fast scan track data into several trick play data segments which comprise a multi-speed playback track. In this manner, the VTR may obtain enough trick play data to fill all trick play segments in a multi-speed playback track without having to generate unique data for all trick play segments. In a case where there is only a limited amount of very useful trick play data available, copying the data into more than one trick play segment of a multi-speed play back track increases the probability that data will be read during trick play operation. Accordingly, in such a case, it may be better to repeat the same trick play data in several trick play segments than to put lower quality trick play data into some of the trick play segments comprising the multi-speed fast scan track.

As described above, in accordance with one embodiment of the present invention, the VTR locates trick play data segments on a tape in a geometric arrangement designed to maximize the amount of data recovered during trick play operation at a particular trick play speed and direction. As described above, during trick play operation, a VTR's heads may pass over several tracks during each pass across the width of the tape. The angle at which the heads will pass over the tracks is predictable for any given tape speed and direction. The VTR of the present invention takes advantage of this fact by locating trick play segments, for a particular trick play speed and direction, e.g. 9× fast forward, along the diagonal located at the specific angle the VTR's heads will cross the tape's tracks, during trick play operation at a particular speed and direction. As described above, the trick play segments passed over by the VTR's tape heads during each pass across the width of the tape during trick play operation form a fast scan track corresponding to a particular speed and direction of operation.

To insure that the VTR's heads pass over the fast scan tracks comprised of a plurality of trick play segments, the VTR must employ a separate tracking servo control circuit 422 for each speed and direction of fast scan track operation which is supported. Alternatively, a single servo control circuit capable of controlling tracking at multiple speeds and directions may be employed. Such a fast scan tracking servo control circuit 422 is required in addition to the tracking servo control circuit 420 used during normal trick play operation. For example, for a VTR implementing fast scan track for 3× fast forward and 9× fast forward trick play operation, the VTR would require a normal play tracking servo control circuit, a 3× fast forward tracking servo control circuit and a 9× fast forward tracking servo control circuit.

Accordingly, to read data from a fast scan track, a servo mechanism such as the servo control module 414 which can maintain accurate tracking during trick play operation is required. The servo control module 414 includes the trick play servo control circuit 422 which includes circuitry similar to the normal play servo control circuit 420 but also includes additional circuitry to facilitate fast scan tracking through the use of data signals refered to as data aids. The fast scan tracking servo control circuit 422 is coupled to the playback packet filter 406 and receives data signals used for controlling the fast scan tracking as will be described.

Standard techniques for tracking in digital tape recorders use a linear control track recorded along the edge of the tape. This control track includes a pulse code which indicates the start of a track. Recovering this pulse code can be used to accurately control the tape speed to maintain alignment between the heads and tracks during normal play. In trick play, the control track can still be read but, in accordance with the present invention, the feedback loop which controls tape speed is changed to allow closed loop control of the speed during trick play operation.

In addition to the control track, there is data written with each packet onto the tape which identifies, e.g., the track, channel, block, and playback data stream of a particular packet. The playback packet filter 406 reads this data from the retrieved data stream and generates a signal to the trick play servo control circuit 422 indicating to the trick play servo control circuit 422 where the heads are located over the tape relative to the normal play and fast scan tracks. This information is then used to finely adjust the tape speed to optimize fast scan tracking. For example, if the identifying data indicated that the head was switching tracks too early and reading packets from the normal play segment preceding a trick play segment, then the tape speed which is controlled by the trick play servo control circuit 422, during trick play operation, could be adjusted by briefly slowing the tape speed to correctly position the head 440 over the selected fast scan track.

Such a data aided search scheme is used to locate a particular fast scan track for a selected speed and direction of VTR operation after the transients of switching into trick play operation have settled. The data being recovered from the tape once in trick play operation is used to adjust the location of the heads over the tape. Using a stored map of trick play and normal play segments, a trajectory for moving the heads to the fast scan track can be plotted. This trajectory is used to command the tape speed. Once the heads have reached the fast scan track, the trick play servo control circuit 422 maintains control of the tape speed to insure that the heads remain positioned so that they pass over the fast scan tracks for a selected speed and direction.

The use of a data aided servo mechanism makes it possible to improve tracking performance in the presence of track non-linearities. Because the heads cross several tracks in trick play operation, track non-linearities are manifested as differences in position over tape segments and the data blocks recorded in such segments when the tracks are crossed. This information could be used to plot how the track shape changes relative to an ideal linear track. In one embodiment of the present invention, the control circuit 422 operates as an adaptive servomechanism which adjusts to these non-linearities and continually adjusts the tape speed or moves the heads on a floating head mechanism during each pass of a head 440 across the width of the tape in order to minimize head tracking errors.

Figure 13A:
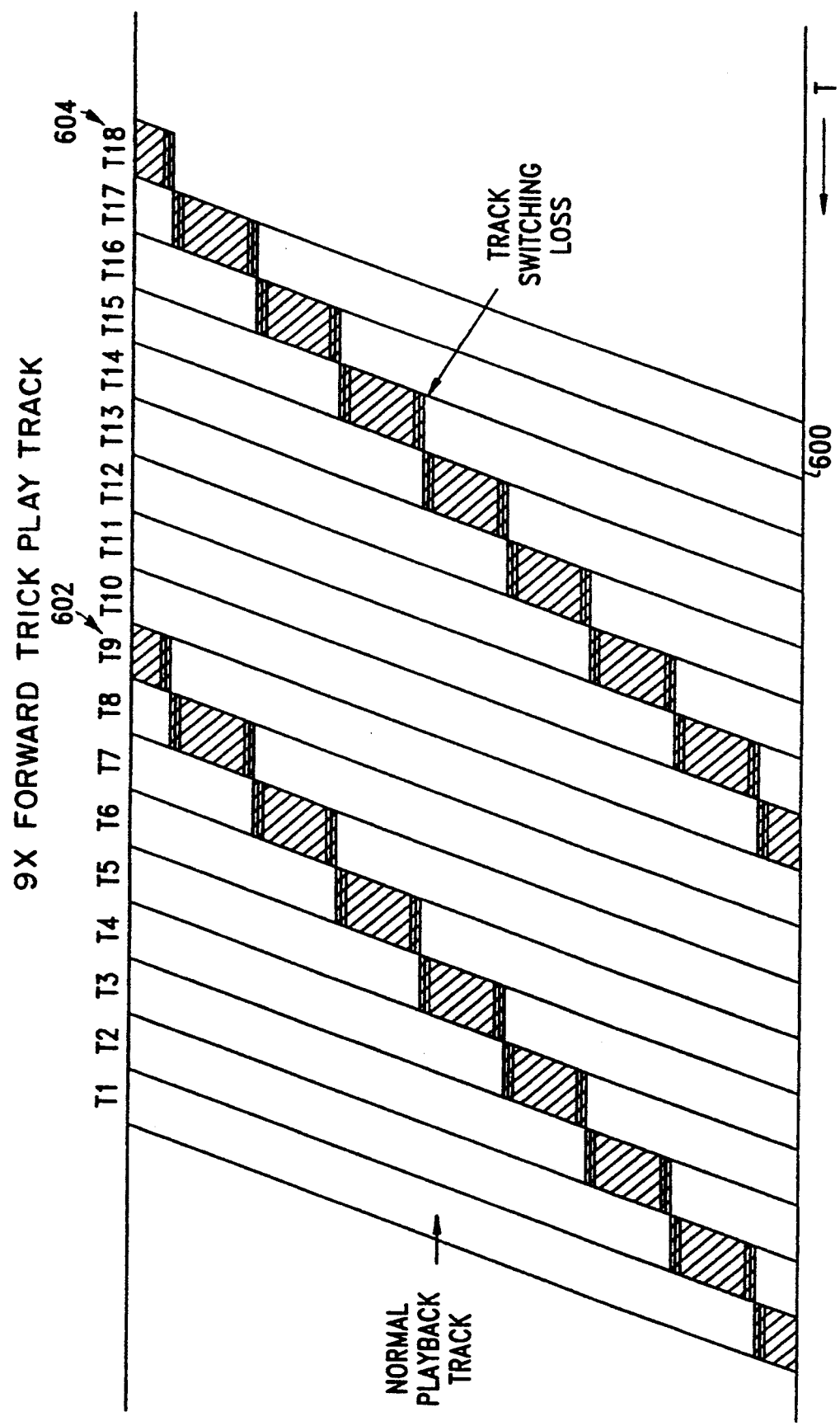
FIG. 13(a) illustrates the portions of trick play segments of a fast scan track from which data may not be recovered during trick play operation due to track switching loss.

Referring now to FIG. 13a, there is illustrated a fast scan track arrangement for 9× fast forward speed. As illustrated, a tape 600 comprises a series of normal play tracks T1 through T18. Each normal play track T1 through T18 contains both normal play segments indicated by the white areas and trick play segments indicated by the shaded areas.

During 9× fast forward trick play operation, the VTR's heads pass over segments of 9 normal play tracks. In accordance with the present invention, trick play data are placed in these tape segments to form 9× fast scan tracks 602, 604. Thus, using this approach, it is possible to read approximately 1/9th of the data that is recorded on a tape during 9× trick play speed if co-located heads are used to permit the reading of all the data which the heads pass over. Alternatively, without the use of co-located heads, it will be possible to read only about half of the data passed over by the VTR's heads during trick play mode because of the alternating azimuths at which the data in the tracks are written. Accordingly, without the use of co-located heads only about one half of the data in each fast scan track can be recovered. Thus, without using co-located heads, it would be possible to read approximately 1/18th of the data recorded on a tape during 9× fast forward trick play operation.

A small amount of data in each trick play segment will be unreadable because of track switching and/or tracking errors. The area from which data can not be recovered due to track switching loss is illustrated in FIG. 13(a) by the black portions located at the edges of each trick play segment of fast scan tracks 602, 604.

Figure 13B:
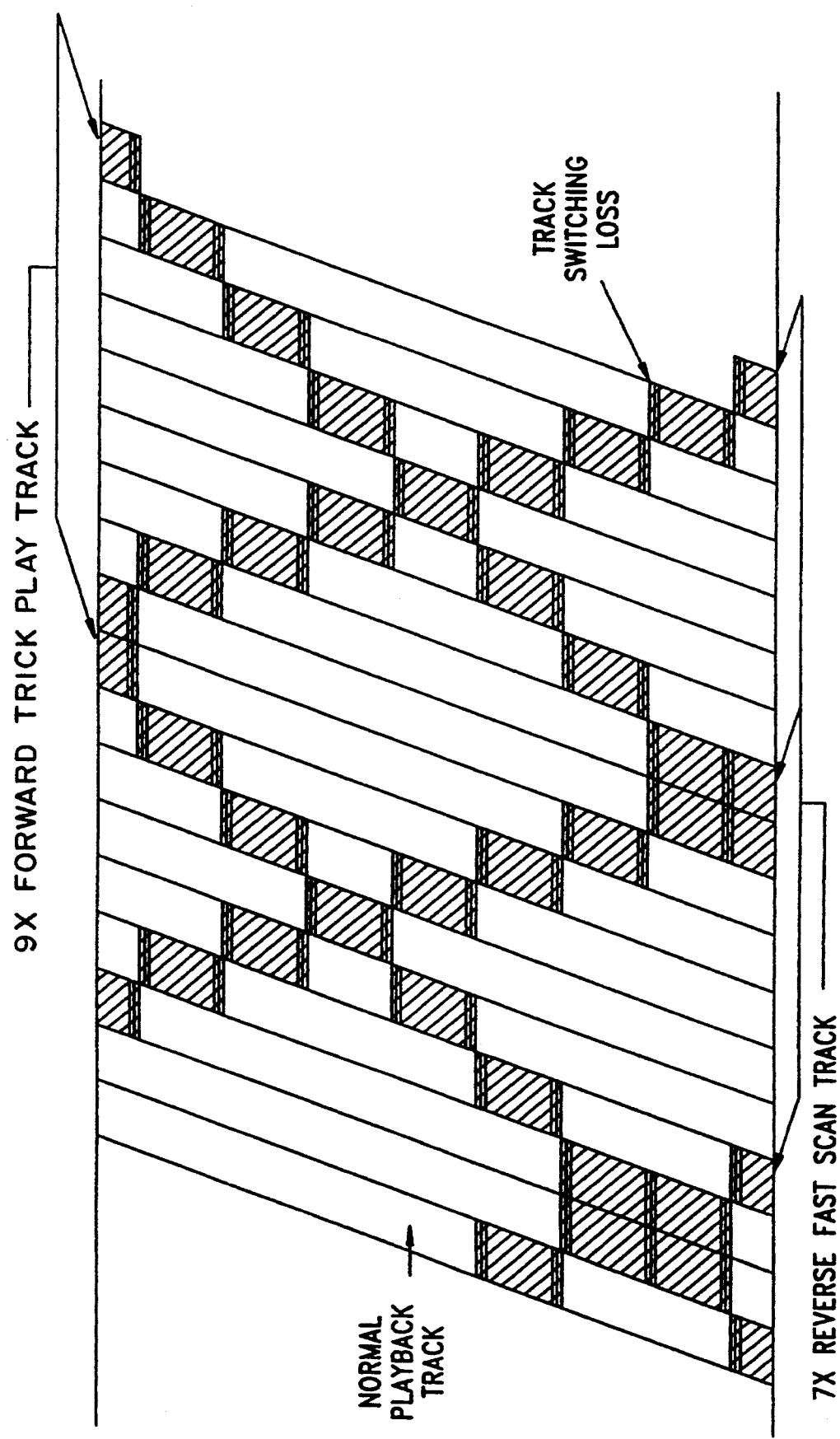
FIG. 13(b) illustrates a portion of a tape with both 7× reverse fast scan tracks and 9× fast forward fast scan tracks recorded on the tape in accordance with one embodiment of the present invention.

Referring now to FIG. 13(b), there is illustrated a tape with both 7× reverse fast scan tracks and 9× fast forward fast scan tracks recorded on the tape in accordance with the present invention. As illustrated, the 7× reverse fast scan track is sloped in the opposite direction from the 9× fast forward fast scan track. Furthermore, it is located at a steeper angle corresponding to the angle that the VTR's heads will pass over the track during 7× reverse trick play operation. It should be noted that during Nx fast forward speed, the heads pass over N normal play tracks each time the heads pass over the width of the tape and thus, a fast scan track for Nx fast forward speed normally comprises N trick play segments per track. However, during Nx reverse speed trick play operation, the heads pass over N+2 normal play track segments. Accordingly, a reverse fast scan track normally comprises N+2 trick play segments. Thus, as illustrated in FIG. 13(b), each 7× reverse fast scan track comprises 9 trick play segments.

Figure 13C:
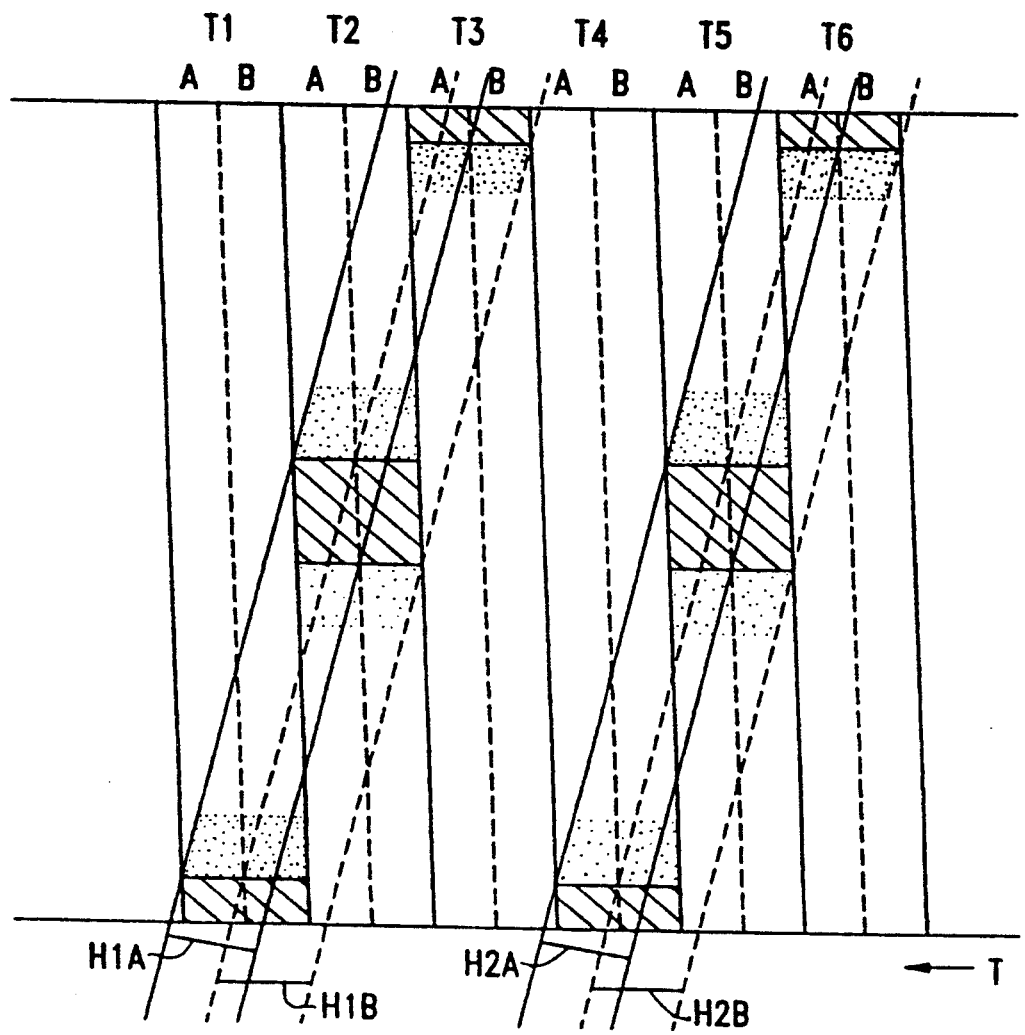
FIG. 13(c) illustrates the trick play tape segments of 3× fast scan tracks which a 4 head, 2 channel VTR can read during trick play operation.

Referring now to FIG. 13(c), there is illustrated the fast scan track pattern for 3× fast scan tracks which a 4 head, 2 channel VTR can read. As described above, a 2 channel VTR comprises a minimum of 4 heads, H1A, H1B, H2A, H2b of FIG. 13(c), with at least one pair of heads having mutually different azimuths being mounted 180° apart on the VTR's rotary head cylinder.

As illustrated, each one of the pair of heads (H1A, H1B) and (H2A, H2B) trace over a different one third portion of each normal play track. However, because the heads can only read data contained in channels written by a head of the same azimuth, only one half of the data passed over by the heads can be read. The area of the tape which can be read during 3× fast forward speed, and which therefore comprises the 3× fast forward fast scan track is indicated by the shaded areas. Note that the lightly shaded areas indicate areas where data recovery is uncertain due to possible track switching and/or, tracking errors, while the dark shade region indicates areas where data recovery is always possible during trick play operation.

Figure 13D:
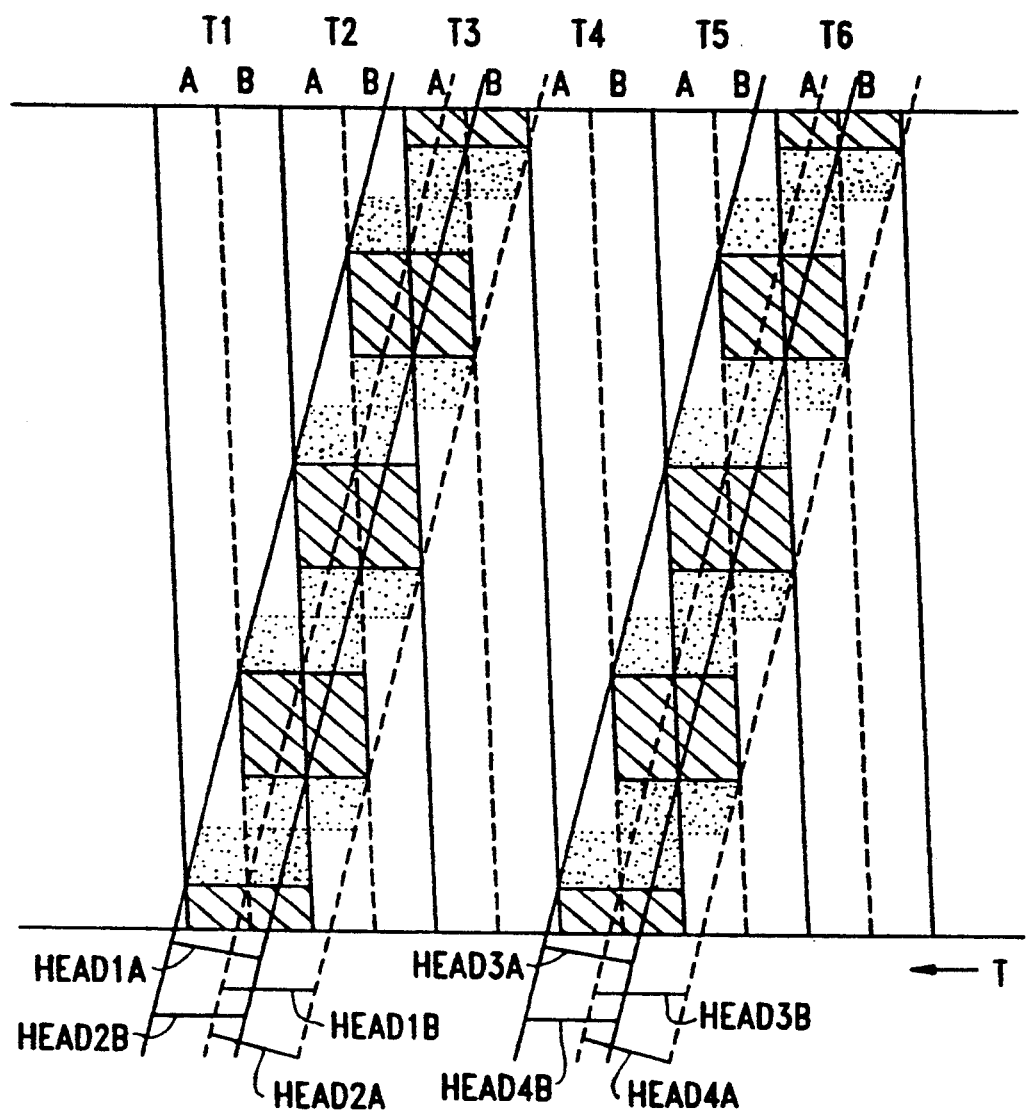
FIG. 13(d) illustrates the trick play tape segments of 3× fast scan tracks which an 8 head, 2 channel VTR with co-located heads can read during trick play operation.

FIG. 13(d) is similar to FIG. 13(c) in that both figures illustrate 3× fast scan track patterns for 2 channel VTRs. However, FIG. 13(d) illustrates the data that can be recovered by an 8 head VTR which includes co-located heads which permit the reading of all tape areas passed over by the VTR's heads. Accordingly, an 8 head, 2 channel VTR can read all the data that can be written in a 3× fast forward fast scan track while a 4 head, 2 channel VTR can only read one half of the trick play data. By adding additional heads data recovery during trick play operation can be increased. For example, a 16 head, 2 channel VTR with dual-azimuth co-located heads could recover twice as much data as an 8 head VTR when operating in 3× fast forward trick play operation.

By defining tape formats so that fast scan tracks are defined to include all areas that are passed over by a VTR's heads, during a particular speed and direction of trick play operation, it is possible to maintain compatibility between VTR's with co-located heads and those without. However, VTR's without co-located heads will be limited to reading only one half the data a VTR with co-located heads will be capable of reading from a fast scan track. Accordingly, VTR's with co-located heads will be able to produce more images and/or images of higher quality than a VTR without co-located heads will be able to produce during trick play operation.

To be useful, fast scan tracks must be able to store enough data, that can be read during trick play mode, to support a reasonable image rate during trick play operation. Accordingly, recording data to optimize fast scan track data capacity is important so that a sufficient number of images and/or portions of images of sufficient image quality will be produced during trick play operation. One way to optimize trick play data capacity is to write the most important trick play data of each trick play segment in the center of the trick play segment where it is most likely to be read.

An additional approach to optimizing data recovery during trick play operation using fast scan tracks is to write a duplicate copy of trick play data above and below the center portion of each trick play tape segment of a fast scan track so that one copy of the duplicated data will be read during trick play operation regardless of tracking errors. This approach will now be discussed in greater detail.

The amount of data that a VTR can read from a fast scan track is a function of tracking accuracy which controls how accurately the VTR's heads will pass over a fast scan track when recording to or reading from the track.

Each VTR's linearity head tolerances determine how accurate the tracks are written by a given machine. The tracks must meet a minimum level of linearity for tapes to be interchangeable between VTRs. That is, the shape of the tracks must be similar enough to those of another VTR so that either VTR can read the track.

Figure 14A:
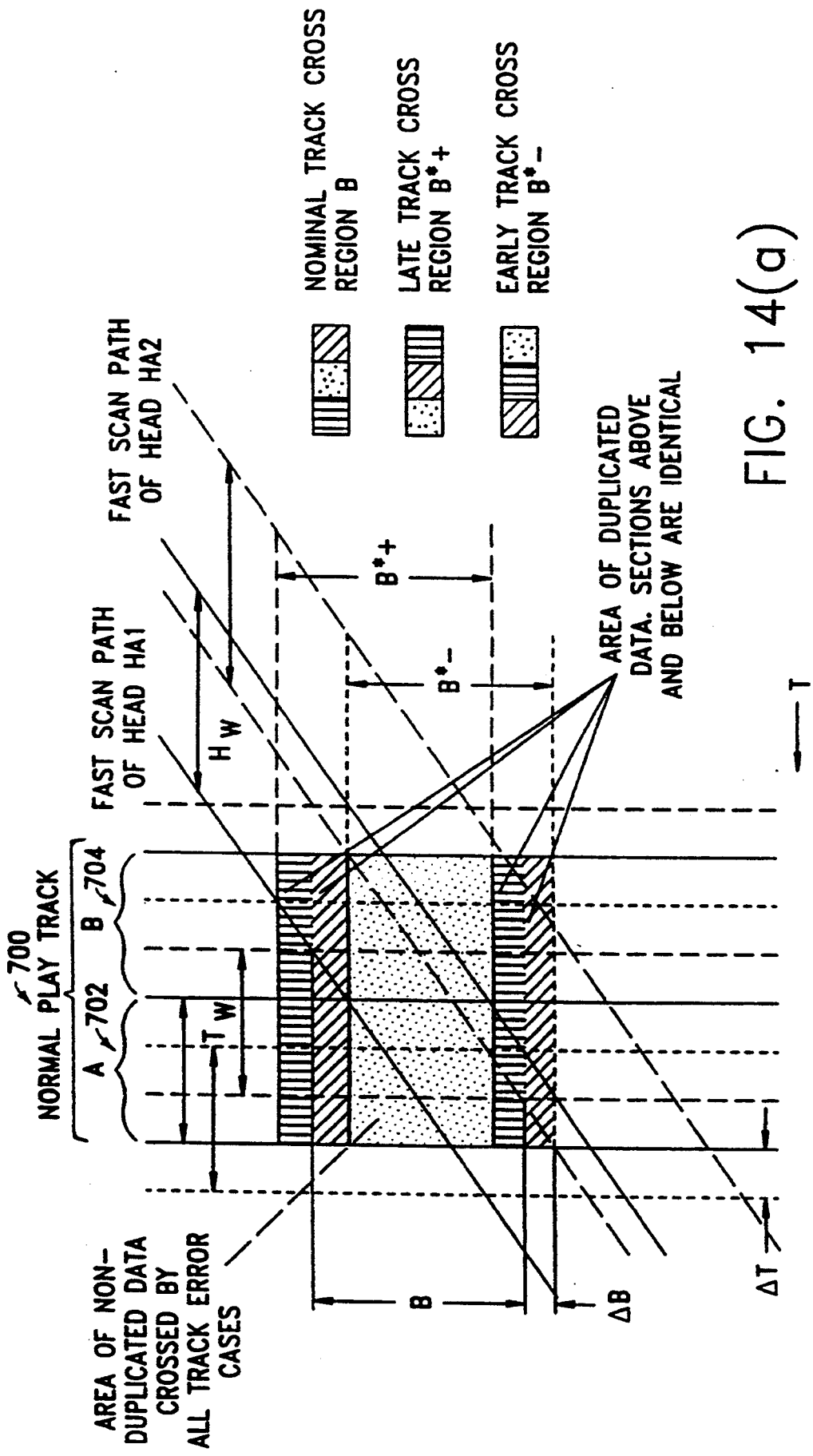
FIG. 14(a) illustrates the range of areas, of a 2 channel track, the heads of a 2 channel VTR may pass over during trick play operation given expected tracking errors.

Tape linearity affects the amount of data that can be recovered during trick play operation from fast scan tracks because different VTRs may be required to read fast scan tracks written by another VTR. Referring now to FIG. 14(a) there is illustrated a tape section with one normal play track 700 which comprises two channels, channel A 702 and channel B 704. Solid vertical lines are used to indicate the nominal position of the track on the tape. Dotted and dashed vertical lines are used to indicate possible track displacement from the nominal position due to linearity errors at recording time. Solid diagonal lines are used to indicate the path head HA1 that a 4 head, 2-channel VTR will trace over the track 700 during 3× fast forward trick play operation. Dashed diagonal lines are used to indicate the path head HB1 of a 4 head 2 channel VTR will trace over the track 700 during 3× fast forward trick play.

As illustrated in FIG. 14(a), the width of the path traced by each of the heads HA1, HB1 is 1.5 times the width of the recorded data channels A and B. Furthermore, it should be noted that a VTR head must pass over, at a minimum, about ¾ of a recorded channel's width to be able to read the recorded data in the particular channel.

A track being off linear may be thought of as being displaced left or right of the desired track position by an amount $\Delta T$, as illustrated in FIG. 14(a). When a head is scanning across several tracks in trick play mode, it intersects and passes over the offset track at a position either offset in a direction above or below the nominal intersection position that would have resulted if the track were located at the nominal track position. A perfectly linear track would produce the data in region B, i.e., the normal track cross area, of FIG. 14(a) when read in trick play. The offset track would return the data in region B*+, i.e., the late track cross region, or in region B*−, i.e., the early track cross region, depending on whether the track 700 was offset right or left.

As illustrated, a track offset $\Delta T$ to the right results in heads HA1 and HB1 passing over the trick play segment at a position slightly offset, in an upward direction, from the nominal track cross region B. This results in the heads HA1 and HA2 reading the data in the late track cross region B*+. However, a track offset $\Delta T$ to the left results in heads HA1 and HB1 passing over the trick play segment at a position slightly offset, in a downward direction, from the nominal region B. This results in the heads HA1 and HA2 reading the data in the early track cross region B*−.

It is evident from FIG. 14(a) that there are small regions, just above and below the solid and dashed slanted lines indicating the path of heads HA1 and HB1, that are not common to all of the 3 possible tracking cases, while the slant region in the center, illustrated by the black rectangular area, will always fall within the tracking tolerances, and be read during trick play operation.

To insure that the same data is recovered regardless of the different possible tracking error cases described above, data can be written into the track region which is common in all of the above described tracking cases. In addition, data can be duplicated and recorded, as will be described below, into the regions just above and below the central trick play segment region which is read during all three of the above described tracking cases. Such duplication of data maximizes the amount of data that can be consistently recovered during trick play mode while reducing storage efficiency because of the need to duplicate some of the trick play data.

Figure 14B:
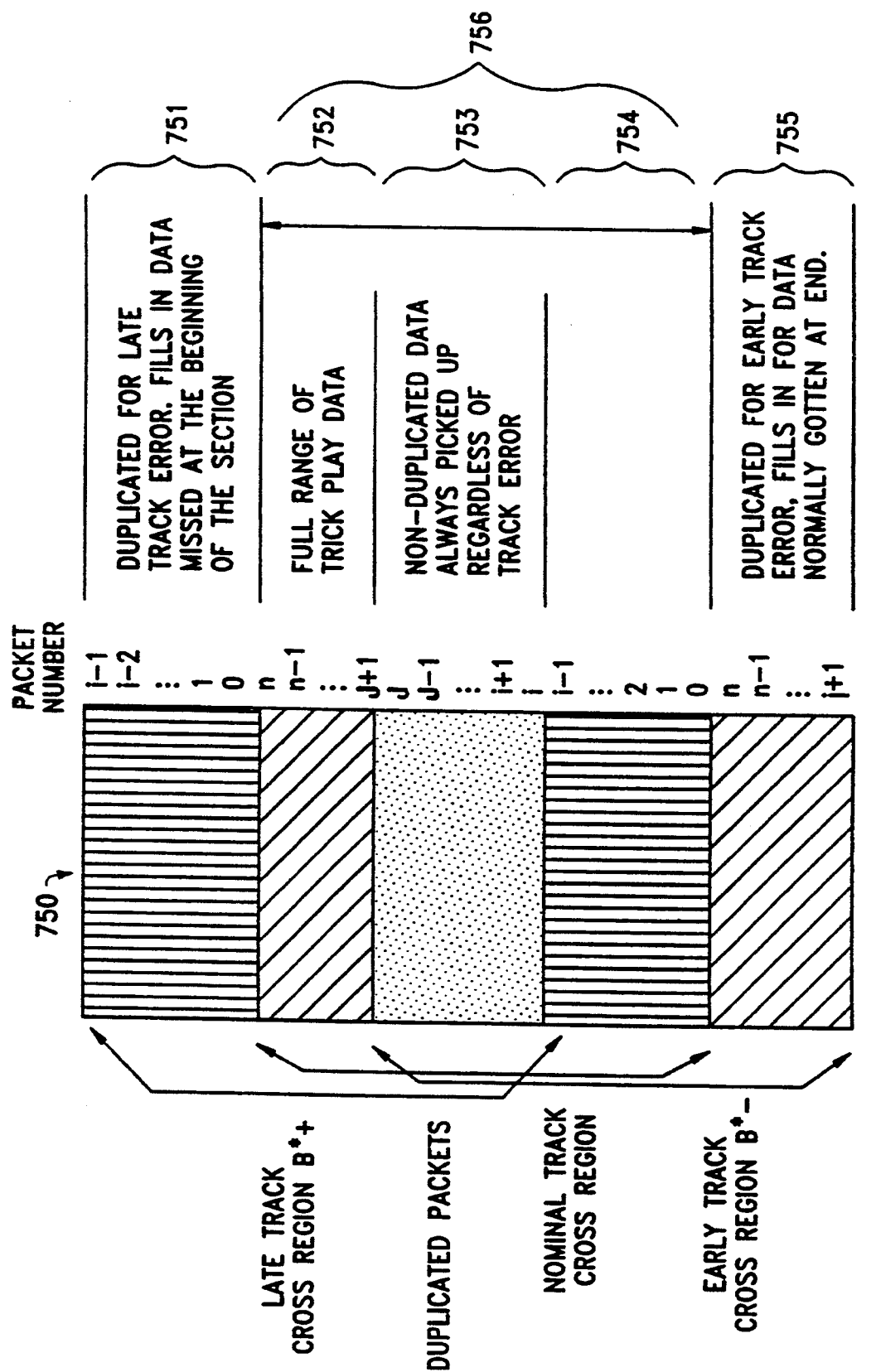
FIG. 14(b) is an illustration of a tape segment and the various possible regions of the tape segment that may be passed over by a head of a VTR during trick play operation in view of expected tracking errors.

The various data regions, i.e., the normal, late and early track cross regions, B, B*+, and B*−, respectively, of a trick play segment, are illustrated in greater detail in FIG. 14(b). As illustrated, a trick play segment 750, can be thought of as comprising 5 data regions for fast scan track purposes, a central region 753, an inner upper region 752, an inner lower region 754, an outer upper region 751 and an outer lower region 755. The inner upper region 752 is located adjacent to but just above the central region 753 while the inner lower region is located adjacent but just beneath the central region 753. The outside upper region 751 is located adjacent to and above the inner upper region 752 while the outer lower region 755 is located adjacent to and below the inner lower region 754.

As described above, the data within the central region 753 will be read in all three tracking cases because it is within tracking tolerances. Accordingly, data packets i though j which are recorded in this region need not be duplicated. The data in the regions 751, 752, 754, 755 may or may not be read depending on the degree of tracking error. Accordingly, the data in these regions are duplicated to take into account the possible regions a VTR head may pass over during trick play due to tape tracking errors.

In accordance with the present invention, data packets 0 through i−1 which are recorded in the inner lower trick play tape segment region 754 are duplicated in the outer upper trick play segment region 751 in case they are missed because of a tracking error which results from the VTR's heads passing over the trick play segment at a position offset vertically above the nominal head tracking path, e.g. as in the case of a late start in the heads passing over the trick play segment 750. In addition, data packets j+1 through n, which are recorded in the inner upper region 752, are duplicated in the outer lower region 755 in case the VTR's heads fail to pass over the upper inner fast scan track segment region 752 because a tracking error has resulted from the heads being offset in a downward direction, e.g. in the case of an early start in the heads passing over the trick play segment 750.

By duplicating the data in the fast scan track regions 751, 752, 754, 755, surrounding the center region 753 of a fast scan track segment, in the above described manner, it is possible to maximize the amount of data that can be reliably recovered from a trick play segment during trick play operation. For example, while only data packets i through j of the trick play segment 750, illustrated in FIG. 14(b), could be reliably read without duplication of trick play data, duplicating trick play data packets 0 through i, and j+1 through n, contained in the trick play segment 750, in the above described manner, will permit these data packets to be reliably read as well.

In accordance with another embodiment of the present invention, the use of multi-speed playback tracks and fast scan tracks is combined. In such an embodiment, the VTR is capable of generating some images from the use of the multi-speed playback track over a wide range of trick playback speeds and directions of operation. In addition, fast scan tracks provide better quality and/or more recognizable images during particular pre-selected trick play speeds and directions of operation.

Figure 15:
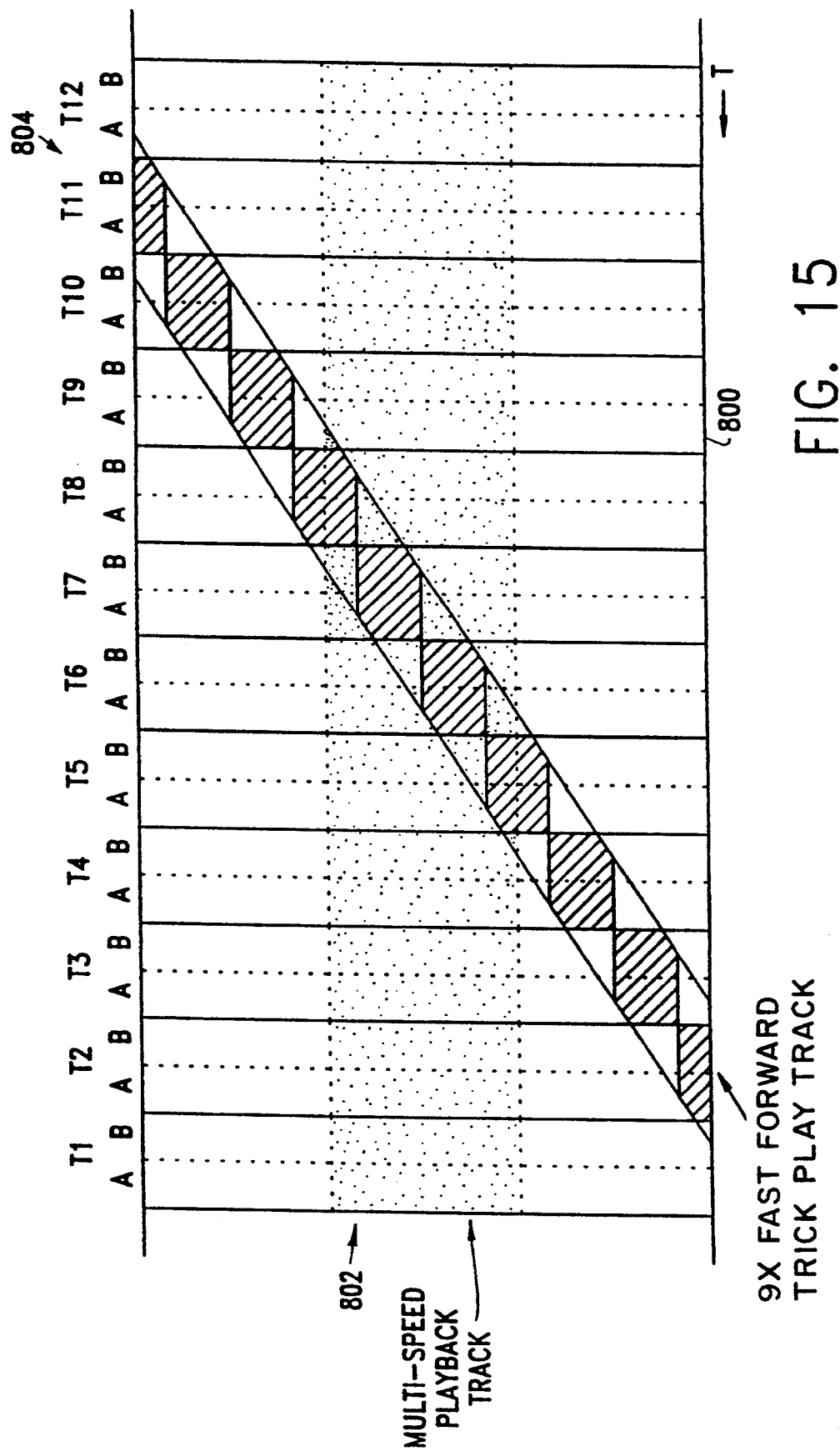
FIG. 15 is an illustration of a tape segment including both a 9× fast forward fast scan track and a multi-speed playback track.

For example, as illustrated in FIG. 15, a tape 800 may include both a 9× fast forward fast scan track 804 and a multi-speed playback track 802. Various other combinations of the numerous fast scan and multi-speed playback tracks are possible, e.g., a multi-speed playback track, a 3× fast forward fast scan track and a 9× fast forward fast scan track.

When implementing special purpose tracks such as multi-speed playback tracks, fast scan tracks, or any combination of them, minimizing the amount of additional tape required as a result of the use of such special purpose tracks is an important consideration.

One way to reduce the amount of tape required to implement such tracks is to use as many dual or multi-purpose data blocks as possible. For example, it may be possible to place a data block which can be used at one or more playback speeds, i.e., a multi-purpose data block, at a location where two or more special play tracks intersect. Another alternative is to locate the normal play data on the tape in such a manner that a subset of the data which can be used for trick play operation, i.e. dual purpose data, is located in tape segments which are trick play segments. By doing this, it is possible to record one fast scan or multi-speed playback track on the tape without duplicating any data. The dual purpose data in the trick play segments will then be used for both normal and trick play operation.

As described above, low speed fast forward fast scan tracks contain more data than high speed fast scan tracks and therefore occupy more tape space. Accordingly, when implementing both high and low speed fast scan tracks on a single tape, it is preferably to implement the low speed fast scan track, e.g., a 3× fast forward fast scan track, by arranging the normal play data so that the dual purpose data can be used for the low speed fast scan track. In this manner, the low speed fast scan track does not require duplication of data and doesn't require the use of any additional tape. The high speed fast scan track implemented on the same tape may then be recorded using a sub-set of the normal play data which is duplicated and recorded in the 9× fast scan track segments. Accordingly, since the trick play data that is duplicated is for the high speed fast scan track, e.g., a 9× trick play speed, the amount of duplicated data will be less than the amount of data that would have had to been duplicated for a slower speed fast scan track.

Thus, tape space is used in a more efficient manner than if the low speed fast scan track had been implemented using duplicate data.

Various data may be selected for recording in each trick play segment of a fast scan track. For example, each trick play segment may be filled with enough information to generate an image during trick play, or the data from several trick play segments may be used to generate a higher quality image than is possible with the limited amount of data that can be recovered in a single fast scan track segment. Furthermore, a single trick play segment located, e.g., at an intersection of fast scan tracks, may contain data packets useful for each one of the fast scan tracks which intersect at the particular trick play segment. Such data packets are identified by their headers for use at a particular trick play speed and direction. Accordingly, while a single fast scan track segment may contain data packets for multiple trick play speeds of operation, only ones designated for use at the actual playback speed will be used. In addition, particular individual data packets may be designated for use at several different playback speeds as is appropriate because of the particular data packet's contents.

The VTR recording circuit 300 may further comprise an antenna 302 coupled to a tuner module 304. The tuner module 304 is the same as, or similar to, the tuner module 204 of FIG. 9. The antenna 302 and tuner module 304 may be directly incorporated into the VTR, in which case no digital VTR port is required to connect them to the recording circuit 300 or, alternatively, they may be part of a digital VTR compatible receiver circuit such as the one illustrated in FIG. 9. When the tuner module 304 is part of the receiver circuit 200, it is coupled to the VTR recording circuit via a digital VTR port as illustrated in FIGS. 9 and 10.

The VTR recording circuit 300 of the present invention further comprises a trick play data processing circuit 342, a normal play data processing circuit 344, a trick play data select control circuit 346, a data select multiplexer (MUX) 314, a modulation circuit 320, and recording heads 340. The trick play data processing circuit 342 selects and processes data from the video/audio transport data packet stream for recording in fast scan track segments while the normal play data processing circuit 344 receives and processes data in the video/audio data packet stream for recording in track segments which are read from during normal playback operation.

The normal play data processing circuit 344 comprises a VTR framing and error correction code (ECC) circuit 316 and a data shuffling circuit 318. An error detected signal output and a video/audio transport data packet output of the tuner module 304 are coupled to the corresponding inputs of the VTR framing and ECC circuit 316. The VTR framing and ECC circuit 316 receives the video/audio transport data packets from the tuner module 304 and adds additional header information to each packet which identifies the information pertinent to retrieval during VTR playback operation. The framing and ECC circuit 316 is also responsible for arranging the data packets into data blocks and adding ECC information to each data block. The ECC information is recorded with each block of data and is used for correcting data errors when reading the data packets from a recorded data block.

The framing and ECC circuit 316 has a data block output which is coupled to a corresponding input of the data shuffling circuit 318. The data shuffling circuit 318 receives the data blocks output by the framing and ECC circuit 316 and shuffles the data bytes within the individual data blocks, each of which is protected from errors by a separate set of ECC bits, to allow for dispersal of short burst errors throughout the data so that the maximum amount of data, in any particular sequence, that is effected by the burst error, is small enough that the error can be corrected using the data block's ECC bits.

The data shuffling circuit 318 outputs blocks of data via a data block output which is coupled to a normal play data block input of the data select MUX 314.

The trick play data processing circuit 318 comprises a data filter 308, a VTR framing and ECC circuit 310 and a data shuffling circuit 312. The data filter 308 receives the video/audio transport data packets output by the tuner module 304 via a video/audio transport data packet input which is coupled to the corresponding output of the tuner module 304.

The data filter 308 examines the headers contained in each transport data packet. Using the information in the headers, the data filter 308 identifies the priority level, as assigned by the transmitter's prioritizer 104, the type of data contained in each transport data packet and any other information needed to sort the data packets based on their utility for use in generating images during trick play operation. In one embodiment, the data filter 308 includes a variable length decoding circuit for performing variable length decoding on the data so that the data filter 308 can examine the data and information contained in each transport data packet.

The data filter 308 is designed so that it selects the highest priority data available from the transport data packet stream for recording in fast scan track segments on a space available basis, i.e., it selects the amount of data that the particular VTR circuit 300 can record in the limited size trick play segments. The data filter 308 may include a map of the trick play segments and/or a list of fast scan or multi-speed playback tracks supported by the particular VTR. It may use this stored information in determining the amount and type of data to select for recording in the fast scan track segments. The placement and data limitations of such trick play segments will be discussed further below.

In VTRs which receive transport data packets which contain data that was not prioritized for trick play operation prior to transmission, or which are not suitably identified through the use of appropriate headers such as the one illustrated in FIG. 8(a), the data filter 308 may include a decoder circuit, and a prioritizer circuit. The decoder circuit is used to decode the transport data packets to the extent necessary for prioritization. The data filter's prioritizer, which may be the same as or similar to the prioritizer 104 of the present invention, is then used to prioritize the data based on its utility for generating an image during trick play operation. Based on the output of the prioritizer, the data filter 308 proceeds to sort the data as described above in the case of a transport data packet stream containing data that was prioritized before transmission. After sorting the decoded and depacketized data, the data are re-encoded and repacketized using an encoder and a packetizer which may also be incorporated into the data filter 308. By re-encoding and repacketizing the sorted, decoded, and depacketized data, the data filter 308 generates a stream of data packets that will be recognizable to a video decoder.

In the above manner, the data filter 308 selects particular data packets from the video/audio data packet stream for recording in fast scan track segments. The data filter 308 has a trick play data packet output which is coupled to a corresponding input of the VTR framing and ECC circuit 310. The VTR framing and ECC circuit 310 also has an error detected input coupled to the error detected output of the tuner module 304.

In another embodiment of the present invention, the data filter 308, is located outside both the trick play data processing circuit 342 and the normal play data processing circuit 344. The data filter 308 receives the video/audio transport data packets from, e.g., the tuner module 304 and sorts the data into trick play data packets which are supplied to the trick play data processing circuit 342, and into normal play data packets which are supplied to the normal play data processing circuit 344. The trick play data packets output by the data filter 308 may include duplicates of data packets sent to the normal play data processing circuit 344.

The trick play circuit's VTR framing and ECC circuit 310 receives the video/audio transport data packets from the data filter 308 and adds additional header information to each packet which identifies the information pertinent to retrieval during VTR trick play operation. Such header information may include an identifier as to what particular trick play speed of operation, e.g., 9× fast forward, and thus what particular fast scan track, a particular data packet is assigned. The VTR framing and ECC circuit 310 arranges the data packets into trick play data blocks which may be of different sizes depending on the size of the trick play segments into which the trick play data blocks are to be written. For example, in generating trick play data blocks for recording in trick play tape segments of a 9× fast scan track, the VTR framing and ECC circuit 310 may generate trick play data blocks roughly one third the size of trick play data blocks generated for recording in trick play tape segments of a 3× fast scan track. Such adjustments in block size for different fast scan tracks accommodates the different trick play segment sizes which are smaller for higher trick play speeds.

The VTR framing and ECC circuit 310 also generates ECC information which can be added to each trick play data block which it creates from the trick play data packets. Alternatively, ECC information may be generated for a group, e.g. three, trick play data blocks with the ECC information being added to the last trick play data block in the group. The number of data blocks in a group may be selected so that the length of each group of trick play data packets approximates the length of a normal play data block recorded on the tape. Attaching the ECC coding to the last trick play data block in a group of data blocks, approximately equal in size to a normal play data block, permits for simpler VTR playback circuity because a VTR's normal error correction circuity can be used to process the group of data blocks as a single unit. Accordingly, by grouping the trick play data blocks into a group, separate playback error correction circuity need not be required, as may be the case when ECC coding is generated and added, e.g., attached to each trick play data block which may be different in size from normal play data blocks.

Figure 10B:
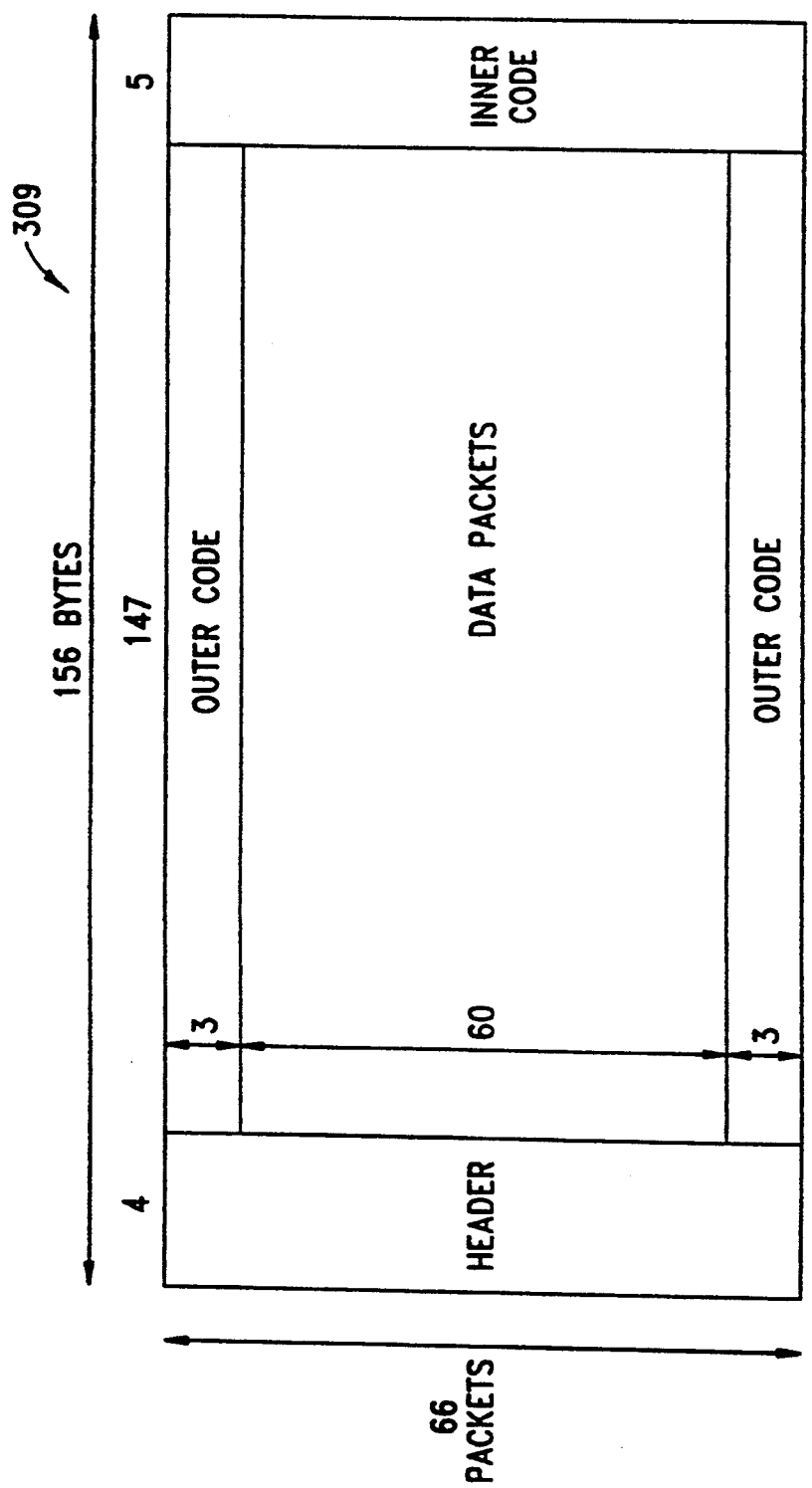
FIG. 10(b) illustrates a data block which is representative of one possible format for a data block which may be generated by the VTR framing and ECC circuits of the recording circuit of FIG. 10(a).

Referring now to FIG. 10b, there is illustrated a data block which is representative of one possible format for a data block which may be generated by the VTR framing and ECC circuit 310 of the present invention. As illustrated in FIG. 10b, a data block 309 may comprise, e.g., 66 data packets. Each data packet may comprise 156 bytes of data including a 4 byte header, 147 bytes of packet data and 5 bytes of inner tape error correction code bits. In the illustrated embodiment of FIG. 10b the tape error correction code is a two dimensional code which is applied to the contents of the data block 309. The first dimension is the inner tape error code comprising 5 bytes of parity data computed on each packet individually and appended to each packet. The second dimension, the outer tape error correction code, is a 6 byte RS code computed down the columns of the block of data packets effectively creating 6 new packets of data which contain only parity data. These 6 packets of parity data are divided into two sets of 3 packets each which form a set of outer tape error correction code bits. In the illustrated embodiment of FIG. 10b, one set of outer error correction code bits is appended to the beginning of the data block 309 and the other set of outer tape error correction code bits is appended to the end of the data block 309.

Generally, the error correction code bits that are generated by the framing and ECC circuit 310 and which are added to each packet and/or block of packets before recording will be a Reed Solomon set of code bits. However, the framing and ECC circuit 310 of the present invention may be implemented using a wide variety of error correction coding schemes and data block formats.

The VTR framing and ECC circuit 310 has a trick play data block output which is coupled to a corresponding input of the data shuffling circuit 312. The data shuffling circuit 312 is the same as, or similar to, the data shuffling circuit 318 of the normal play data processing circuit 318. The data shuffling circuit 312 receives the trick play data blocks output by the VTR framing and ECC circuit 310 and shuffles the data bytes within each trick play data block, or group of trick play data blocks, which is protected by a separate set of ECC bits. This data shuffling operation may include the case where no data shuffling is performed.

The data shuffling circuit 312 outputs trick play data blocks via a trick play data block output which is coupled to a trick play data block input of the data select MUX 214.

The output of the trick play data select control circuit 346 is coupled to a select input of the MUX 314. The trick play data select control circuit 346 monitors head position and is aware of trick play locations on the tape. Accordingly, the trick play data select control circuit 346 asserts the select signal so that the trick play data blocks are selected and output by the MUX 314 when the heads 340 are over trick play tape segments and are recording data. The select signal is deasserted by the trick play data select control circuit 346, when the heads 340 are over normal play tape segments and are recording data. This causes the data select MUX 314 to output normal play data blocks when recording data in normal play tape segments.

A data block output of the data select MUX 314 is coupled to a corresponding input of the modulation circuit 320. The modulation circuit 320 performs 8-10 modulation on the contents of each data block. Thus, 10 bits of data are generated by the modulation circuit 320 for each 8 bits of data in each data block. Alternatively, the modulation circuit 320 performs other types of modulation such as miller squared modulation. The output of the modulation circuit 320 is coupled to the heads 340 providing them with the signal which is actually recorded on the tape.

Figure 11:
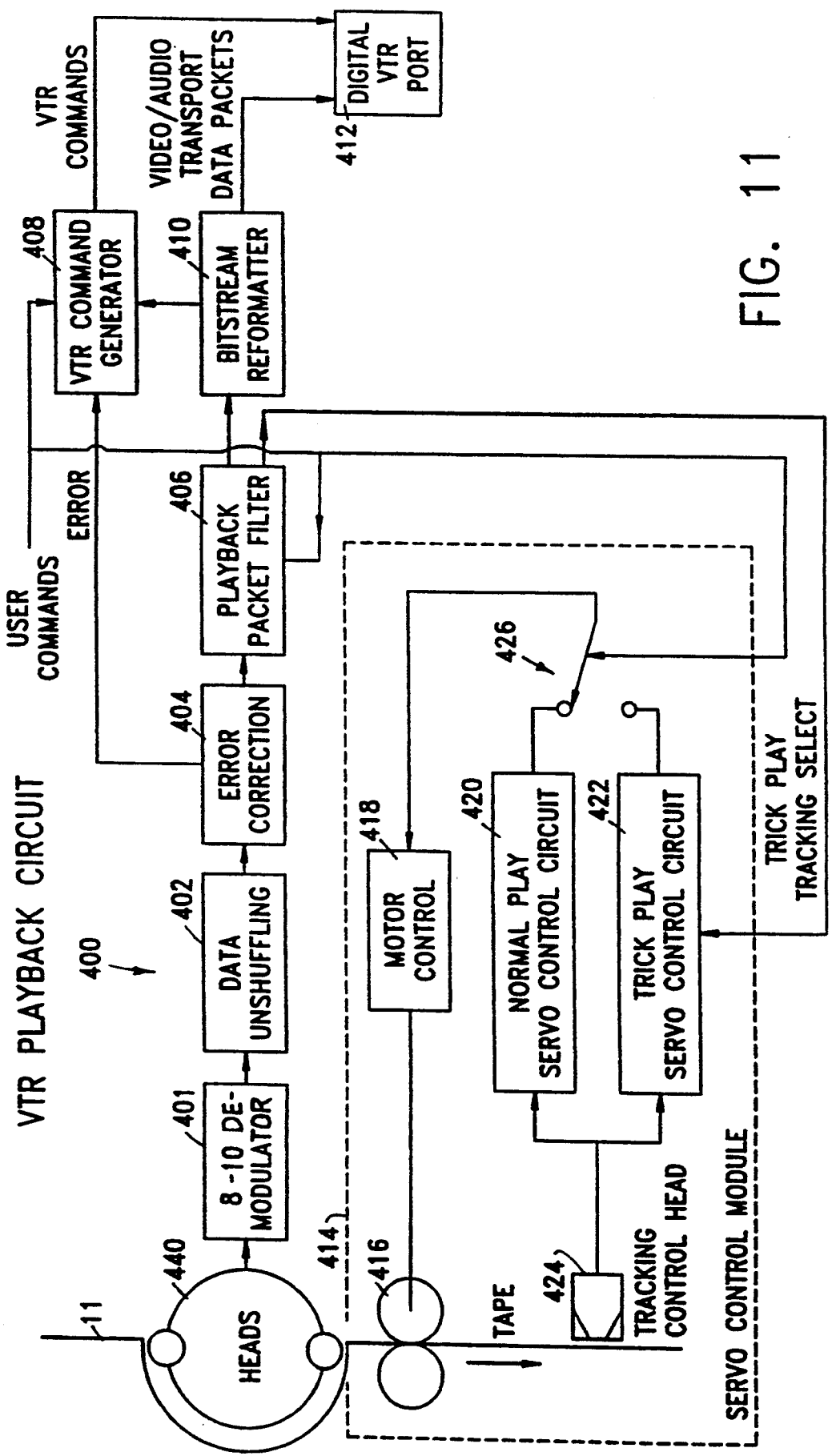
FIG. 11 is a block diagram of a VTR playback circuit in accordance with one embodiment of the present invention.

Referring now to FIG. 11, there is illustrated a VTR playback circuit 400 in accordance with one embodiment of the present invention. The playback circuit 400 comprises playback heads 440, a demodulator circuit 401, a data unshuffling circuit 402, and an error correction circuit 404. The playback circuit 400 further comprises a playback packet filter 406, a VTR command generator 408, a bitstream reformatter 410, and a digital VTR port 412.

The heads 440, which are mounted on a rotary head cylinder, pass over the tape 11 as the head cylinder rotates during VTR playback operation. The heads read the recorded data on the tape 11 as they pass over the various tape segments which comprise the tape's data tracks. A data output of the heads 440 is coupled to the input of a demodulator circuit 410. The demodulator circuit 401 receives the data read by the heads 440 and demodulates the signal in accordance with the 8-10 modulation scheme used prior to recording of the data.

Accordingly, the demodulator 401 generates 8 bits of data for every 10 bits of data received from the heads 440 and outputs this data in the form of a stream of normal and trick play data blocks. The data block output of the demodulator 401 is coupled to the data unshuffling circuit 402 which re-orders the data in the received data blocks to undo the data shuffling which was performed prior to recording the data. By unshuffling the data in the data blocks, any burst errors which occurred when recording data to, or reading data from, the tape 1 will be distributed throughout the data protected by each set of ECC bits.

The error correction circuit 404 has a data block input coupled to a data block output of the data unshuffling circuit 402. The error correction circuit 404 decodes the data block headers and each set of ECC bits that were recorded with each data block or group of data blocks read from the tape 1. The error correction circuit performs error correction on the data contained in each block's data packets before outputting the resulting video/audio transport data packets. If uncorrectable errors are detected, the error correction circuit 404 asserts an error signal.

The error correction circuitry 404 may include special error correction circuity for handling trick play data blocks of smaller size than normal play data blocks. Alternatively, as described above, if the trick play data blocks were processed to form a group of trick play data blocks, the group being of approximately the same size as a normal play data block, the same error correction circuitry that is used to process normal data blocks may be used to process each group of trick play data blocks as a unit, if the set of ECC bits for each group of data blocks is attached to the last data block, or added to any of the data blocks in the group.

A video/audio data packet output of the error correction circuit 404 is coupled to an input of the playback packet filter 406. The playback packet filter 406 examines the headers of each video/audio transport data packet and determines whether the data packet is for use during normal playback operation, trick play operation or both. It also determines what particular playback speed each trick play data packet is to be used with.

A user command input of the playback packet filter 406 is coupled to both a user command input of the servo control mechanism and the user command input of the VTR command generator 408.

Via its user command input, the playback packet filter 406 receives user command signals which indicate whether trick playback or normal playback operation has been selected.

The playback packet filter 406 only outputs data packets which are designated as being for use at the particular playback speed which the VTR is operating at. For example, during normal playback operation the playback packet filter 406 will only output data packets identified for use during normal playback operation. Similarly, during 9× fast forward playback operation, the playback packet filter 406 will only output data packets identified for use during 9× fast forward playback operation.

A data packet output of the playback packet filter 406 is coupled to a corresponding input of the bitstream reformatter 410. The bitstream reformatter 410 arranges the video packets in a manner that is acceptable to a transport and priority decoder such as the transport and priority decoder 208 illustrated in FIG. 9. During normal play, the reformatter 410 may, e.g., interleave packets of different priority levels or added packet headers to form a video/audio transport data packet stream which is acceptable to the transport and priority decoder circuit 208. During trick play mode, the reformatter 410 may perform the additional function of inserting VTR commands into the video/audio transport data packet stream to instruct the transport and priority decoder 208 on how to process trick play data correctly. Alternatively, when a receiver is coupled to the VTR via a separate VTR command line the reformatter 410 may pass such commands to the VTR command generator for outputting over the VTR command line.

The VTR command generator 408 has a decoder command input coupled to a command output of the bitstream reformatter 410, an error signal input coupled to an error signal output of the error correction circuit 404, and the user command input. Accordingly, the VTR command generator receives as input signals an error signal from the error correction circuit 404, user commands from the user command input, e.g., a control panel or, in the case of interactive video on demand services, a user interface for communication via a telephone or cable television link to a remote source, and other commands from the reformatter 410.

The VTR command generator 408 generates error concealment and other decoding commands which are supplied to, e.g., the transport and priority decoder circuit of a receiver. These instructions, i.e., VTR command signals, may be used to indicate to a receiver that the VTR is operating in trick play mode and that particular decoding and/or error concealment should be performed.

A VTR command signal output of the VTR command signal generator 408 and a video/audio transport data packet output of the bit stream reformater 410 are coupled to corresponding inputs of the digital VTR port. In this manner, the digital VTR port 412 receives the video audio transport data packet stream and VTR command signal which it can then supply to, e.g., a receiver which is coupled to the port 412. Alternatively, the receiver may be included within the VTR, in which case the port 412 would not be necessary and the receiver could provide its output directly to a monitor or to the baseband portion of a television receiver.

In another embodiment of the VTR playback circuit of the present invention, the VTR playback circuit 400 further comprises a servo control mechanism 414 which supports VTR trick play operation. The VTR playback circuit's servo control circuit 414 is responsible for positioning the tape so that the heads pass over the tape tracks in such a manner that the heads can read or write data to or from the tracks. Accordingly, the servo control mechanism 414 is responsible for tape tracking control.

The servo control mechanism 414 of the present invention comprises a tracking control head 424 that is distinct from the read heads 440. The tracking control head 424 detects the position of the tape 1 and generates a tracking control signal. A tracking control head signal output is coupled to a control signal input of a normal play servo control circuit 420 and to a control signal input of a trick play servo control circuit 422. The normal play servo control circuit 420 outputs a servo control signal for controlling tracking during VTR normal play operation while the trick play servo control circuit 422 generates a servo control signal for controlling tracking during a particular speed of trick play operation, e.g. at 9× fast forward. A separate trick play servo control circuit 422 may be provided for each particular speed of forward or reverse trick play operation that the VTR play back circuit 400 supports.

A fast scan tracking select switch 426 is used to couple either the output of the normal play control circuit 420 or the trick play servo control circuit 422 to the input of the motor control circuit 418. The fast scan tracking select switch may be operated by, e.g., user commands input via an operator control panel. Such user commands indicate whether fast scan or normal play operation has been selected. For example, during normal VTR playback operation the fast scan tracking select switch 426 would supply the normal play tracking control signal to the motor control circuit 418 but when trick play operation was selected via, e.g. the operator control panel, the output of the trick play servo control circuit 422 would be supplied to the motor control circuit 418. The trick play servo control circuit 422 monitors the signal received from the tracking control head 424 and detects when the head is over a trick play segment of the fast scan track for the selected trick play speed and direction. Once a block of the selected trick play speed and direction is located, the trick play control servo circuit 422 outputs fast scan tracking control signals which are used to insure that proper angle and head position relative to the tape occurs for proper tracking of the selected fast scan track.

In response to the tracking control signal received, the motor control circuit generates a motor control output signal. A motor control signal output of the motor control circuit 418 is coupled to a corresponding input of a tape positioning motor 416 which operates to adjust the tape's position in response to the motor control signal in order to control tracking accuracy.

While the features of the present invention make the recording and playback circuits of the present invention particularly well suited to VTR applications, the use of fast scan tracks and recording and playback circuits which support their use may be applied to other means of digitally storing video data such as laser disk technology. Laser disk technology provides a storage media for digital video similar to tape in that recording and recovering data for normal play may be accomplished in accordance with the present invention, by recording normal play data, e.g. normal play data blocks including data packets, in normal play track segments on a laser disk which comprise normal play tracks. In the context of a laser disk, a series of fast scan track segments may be arranged to form a fast scan track which is distinct from the normal play laser disc tracks. The trick play data in such a laser disc fast scan track may comprise a copy of a sub-set of the normal play data and/or special trick play data such as trick play motion vectors.

In accordance with the present invention, during trick play operation, the media does not change speed, but rather the playback head is moved radially to another track on the disc. In such an embodiment, it is expected that the track switching transients can be quite severe and the playback head will not be able to recover data until tracking is locked onto the new track. For this reason the concept of putting areas of trick play data distributed across tracks and scanning across multiple tracks is not presently suitable in the laser disc context. Thus, there is no present advantage to intermixing normal play and trick play data blocks in a physical track.

Unlike a tape system, a playback head in a laser disk system can change between a large number of tracks relatively quickly. It takes only a fraction of a second to move a large number of tracks. Accordingly, to take advantage of these physical characteristics of a video disc system, the trick play segments which comprise a video disc fast scan track are located in a single physical location on the disc such as one particular physical track or series of adjacent physical tracks.

To record trick play data in such video disc fast scan tracks while simultaneously recording normal play data as it is being received, e.g. from a tuner module, a video recording circuit similar to the recording circuit of FIG. 10 may be used. However, to support the simultaneous recording of normal play and trick play data to two different tracks on a video disc, the trick play data blocks output by the trick play data processing circuit 342 are supplied to a trick play recording head positioned over the fast scan tracks on the video disc while the normal play data processing circuit supplies normal play data blocks to a normal play recording head positioned over a normal play track.

In accordance with the present invention, when trick play is entered, the video disc playback head will move to the laser disk fast scan track region of the disc and position itself for reading over the fast scan frame data corresponding to the first fast scan frame subsequent to the normal frame which the head just completed reading. The fast scan tracks could be indexed and linked to specific frames in the normal data tracks. The head would then trace along the laser disk fast scan tracks recovering trick play data. When trick play operation is terminated, e.g., by a user command, and the device returns to normal scan, the last fast scan frame displayed will serve as the index to reposition the head back in the normal scan region of the disk. While the head motion to enter and exit the trick play data region on the disc is not insignificant, it is only a fraction of a second in which video service is interrupted.

The data stored in the trick play region would be of similar content to the trick play data recorded in the trick play segments of a video tape. Accordingly, a video playback circuit similar to the VTR playback circuit 400 may be used to playback data from a video disc. However, in the video disc context, the heads 440 and the servo control module 414 would be optimized for the particular video disc system being implemented and would therefore differ from the tape tracking servo control module illustrated in FIG. 11.

I claim:

1. A digital video tape recorder (VTR) compatible receiver for receiving a digital video data stream output by a digital VTR, the video data stream including normal play video data output by the digital VTR during normal VTR playback operation, and trick play video data and trick play video data processing commands output by the digital VTR during trick playback operation, each trick play video data processing command including an instruction for processing the trick play video data, the receiver comprising:

a digital VTR port adapted for coupling the receiver to the digital VTR and for receiving from the digital VTR the digital video data stream including the trick play video data and the trick play video data processing commands output by the digital VTR during trick playback operation, the received trick play video data including a subset of the normal play video data; and trick play video data processing means coupled to the digital VTR port, for performing video data processing operations on the trick play video data received from the digital VTR as a function of a received trick play video data processing command, the trick play video processing means processing the subset of normal play video data included in the trick play video data to compensate for normal play video data intentionally omitted by the VTR from the subset of normal play video data.

2. The receiver of claim 1, wherein the trick play video data processing means includes a two dimensional spatial filter for performing spatial filtering of the subset of normal play video data in response to a first trick play command.

3. The receiver of claim 1, wherein the trick play video data processing means includes a temporal filter for performing temporal filtering of the subset of normal play video data in response to a second trick play command.

4. The receiver of claim 1, wherein the trick play video data processing means includes a temporal filter for performing temporal filtering on the subset of normal play data in response to a first trick play command and a spatial filter for performing spatial filtering on the subset of normal play video data in response to a second trick play command.

5. The receiver of claim 1, further comprising a transport and priority decoder circuit that receives the video data and trick play video data processing commands, and performs video transport depacketization and priority decoding on the trick play video data received from the digital VTR to generate video codewords, the transport and priority decoder being responsive to the trick play video data processing commands to enable trick play video transport depacketization and priority decoding.

6. The receiver of claim 5, further comprising a video decoder coupled to the transport and priority decoder circuit, the trick play video data processing means, and adapted for coupling to a display circuit, the video decoder circuit receiving video codewords from the transport and priority decoder circuit and decoding the video codewords, the trick play video processing means performing video data processing on the video codewords received by the video decoder in response to the trick play video data processing commands.

7. The receiver of claim 6, wherein trick play video processing means includes a two dimensional spatial filter for performing spatial filtering of the video codewords in response to a first trick play video data processing command.

8. The receiver of claim 6, wherein the trick play video data processing means includes a temporal filter for performing temporal filtering of the video codewords in response to a second trick play video data processing command.

9. The receiver of claim 6, wherein the trick play video data processing means includes a temporal filter and a spatial filter for performing temporal filtering and spatial filtering, respectively, of the trick play video data in response to trick play video data processing commands.

10. The receiver of claim 5, further comprising a tuner module coupled to the digital VTR port and adapted for receiving a radio frequency signal, the tuner module demodulating, trellis decoding and de-interleaving the received radio frequency signal to generate transport data packets.

11. A digital video tape recorder (VTR) compatible receiver for receiving a video data stream output by a digital VTR, the video data stream including normal play video data output by the digital VTR during normal VTR playback operation, and trick play video data and trick play video data processing commands output by the digital VTR during trick playback operation, the receiver comprising:
 a tuner module adapted for coupling to the digital VTR and for receiving from the digital VTR the trick play video data stream including the trick play video data and the trick play video data processing commands output by the digital VTR during trick playback operation, the trick play video data including a subset of the normal play video data; and
 trick play video data processing means coupled to the tuner module, for performing video data processing operations on the trick play video data received from the digital VTR as a function of a received trick play video data processing command, the video processing means processing the subset of normal play video data included in the trick play video data to compensate for normal play video data intentionally omitted by the VTR from the subset of normal play video data.

12. The receiver of claim 11, wherein the trick play video data processing means includes a spatial filter for performing spatial filtering of the subset of normal play video data received from the digital VTR in response to a first trick play command.

13. The receiver of claim 12, wherein the trick play video data processing means includes a temporal filter for performing temporal filtering of the subset of normal play video data in response to a second trick play video data processing command.

14. A receiver comprising:
 a tuner module adapted for coupling to a video tape recorder (VTR) and for receiving a video data stream from the digital VTR, the video data stream including normal play video data output by the digital VTR during normal VTR playback operation, and trick play video data output by the VTR during trick playback operation, the trick play video data including a subset of the normal play video data; and
 trick play video data processing means coupled to the tuner module, for detecting the receipt of trick play video data from the digital VTR and for performing video data processing operations on the trick play video data received from the digital VTR to compensate for the absence of normal play video data intentionally omitted by the VTR from the subset of normal play video data included in the trick play video data.

15. The receiver of claim 14, wherein the trick play video data processing means includes a spatial filter for performing spatial filtering of the trick play video data received from the VTR.

16. The receiver of claim 15, wherein the trick play video data processing means includes a temporal filter for performing temporal filtering of the video data received from the VTR.

17. A digital video tape recorder (VTR) compatible receiver for receiving a video data stream output by a digital VTR, the video data stream including normal play video data output by the digital VTR during normal VTR playback operation and trick play video data output by the digital VTR during trick playback operation, the trick play video data including a subset of the normal play video data, the receiver comprising:

a digital VTR port adapted for coupling the receiver to the digital VTR and for receiving from the digital VTR the video data stream including normal play video data and trick play video data; and a video decoder including a decoder circuit and a trick play video data processing circuit coupled to the digital VTR port, the video decoder circuit decoding the video data received from the VTR, the trick play video data processing circuit detecting the receipt of trick play video data from the VTR, and processing the subset of normal play video data included in the trick play video data to compensate for normal play video data intentionally omitted by the VTR from the subset of normal play video data.

18. The receiver of claim 17, wherein the trick play video data processing circuit includes a spatial filter for performing spatial filtering of the trick play video data when the receipt of trick play video data is detected.

19. The receiver of claim 17, wherein the trick play video data processing circuit includes a temporal filter for performing temporal filtering of the video data when the receipt of trick play video data is detected.

20. A method of receiving and processing video data output by a digital video tape recorder (VTR), the digital VTR outputting a video data stream including normal play video data during normal playback operation, and trick play video data and a trick play video data processing command during trick play operation, the trick play video data including a subset of the normal play video data, the method comprising the steps of:

receiving the trick play video data including the subset of normal play video data output by the digital VTR during VTR trick playback operation;

receiving the trick play video data processing command output by the digital VTR during VTR trick playback operation; and performing video data processing on the received subset of normal play video data, in response to the received trick play video data processing command to compensate for the intentional omission of normal play video data, by the digital VTR, from the received subset of normal play video data.

21. The method of claim 20, wherein the step of receiving the trick play video data including the subset of normal play video data output by the digital VTR includes the step of coupling a receiver to a digital VTR port.

22. The method of claim 20, wherein the step of receiving the trick play video data including the subset of normal play video data output by the digital VTR includes the steps of:

receiving a radio frequency signal output by the digital VTR; and demodulating, trellis decoding and de-interleaving the received radio frequency signal to generate the subset of normal play video data, the subset of normal play video data including transport data packets.

23. A method of receiving and processing video data output by a digital video tape recorder (VTR) during normal VTR playback operation and VTR trick playback operation, the digital VTR outputting normal play video data during normal VTR playback operation and trick play video data including a subset of normal play video data during VTR trick playback operation, the method comprising the steps of:

receiving digital video data from a digital VTR;

monitoring the received video data to detect the receipt of trick play video data indicative of VTR trick playback operation; and performing, upon the detection of received trick play video data, video data processing operations on the received video data to compensate for normal play video data intentionally omitted by the digital VTR from the subset of normal play video data.

24. The method of claim 23, wherein the step of performing video data processing operations on the received video data includes the step of performing spatial filtering of the received video data.

25. The method of claim 23, wherein the step of performing video data processing operations on the received video data includes the step of performing temporal filtering on the received video data.

26. The method of claim 23, wherein the step of receiving digital video data output by a digital VTR includes the steps of:

receiving a radio frequency signal output by the digital VTR; and demodulating, trellis decoding and de-interleaving the received radio frequency signal to generate video data including transport data packets.

27. A receiver, for receiving a video data stream output by a digital video playback device, the video data stream including normal play video data output by the digital playback device during normal playback operation, and trick play video data and trick play video data processing commands output by the digital playback device during trick playback operation, the trick play video data including a subset of normal play video data, each trick play video data processing command including an instruction for processing the trick play video data, the receiver comprising:

a digital port adapted for coupling the receiver to the digital video playback device and for receiving from the digital playback device the trick play video data and the trick play video processing commands output by the digital video playback device during trick playback operation, the received trick play video data including a subset of the normal play video data; and trick play video data processing means coupled to the digital port, for performinq video data processing operations on the subset of normal play video data received from the digital video playback device as a function of a received trick play video data processing command, the trick play video data processing means processing the subset of normal play video data included in the trick play video data to compensate for normal play video data intentionally omitted by the digital video playback device from the subset of normal playback video data.

* * * * *